United States Patent
Neugebauer et al.

(10) Patent No.: US 9,963,185 B2
(45) Date of Patent: May 8, 2018

(54) ELECTRIC BICYCLE

(71) Applicant: Ford Global Technologies, LLC, Dearborn, MI (US)

(72) Inventors: James Neugebauer, Chelmsford (GB); Bruce Southey, Farnham (GB); James Lloyd, Alderley Edge (GB); Richard Craven, Chelmsford (GB); Torsten Gerhardt, London (GB); Simon Potticary, Basildon (GB); Jonathan Mundy, Brentwood (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 251 days.

(21) Appl. No.: 14/804,907

(22) Filed: Jul. 21, 2015

(65) Prior Publication Data
US 2016/0031517 A1    Feb. 4, 2016

Related U.S. Application Data

(60) Provisional application No. 62/032,173, filed on Aug. 1, 2014.

(51) Int. Cl.
*B62K 15/00* (2006.01)
*B62M 6/90* (2010.01)
(Continued)

(52) U.S. Cl.
CPC .......... *B62K 15/006* (2013.01); *B60L 11/007* (2013.01); *B60L 11/1838* (2013.01);
(Continued)

(58) Field of Classification Search
CPC .... B62K 15/00; B62K 15/006; B62K 15/008; B62K 2015/001; B62M 6/90; E05B 71/00; E05B 67/38; B62H 5/001; B62H 5/003
(Continued)

(56) References Cited

U.S. PATENT DOCUMENTS 3,417,834 A * 12/1968 Smith ................... B62K 11/06
                                                              180/208
3,921,741 A    11/1975 Garfinkle et al.
(Continued)

FOREIGN PATENT DOCUMENTS

CN       2825435 Y    10/2006
CN     102442389 A     5/2012
(Continued)

OTHER PUBLICATIONS

Dent, "Bike of the future removes the need to shift gears, pedal up hills or pack a lock", http://www.engadget.com/2014/07/29/denny-teague-e-bike-oregon-manifest, Jul. 29, 2014, 3 pages.
(Continued)

*Primary Examiner* — Joseph M Rocca
*Assistant Examiner* — Maurice L Williams
(74) *Attorney, Agent, or Firm* — Frank A. MacKenzie; Bejin Bieneman PLC

(57) ABSTRACT

A bicycle includes a frame including first and second segments pivotable relative to each other between a folded position and an unfolded position. The first segment has a first face and the second segment has a second face facing the first face in the unfolded position. A hinge is disposed between the first and second faces. A locking device extends through at least one of the first and second faces.

20 Claims, 43 Drawing Sheets

(51) Int. Cl.
| | |
|---|---|
| *E05B 71/00* | (2006.01) |
| *B62H 5/00* | (2006.01) |
| *B62J 99/00* | (2009.01) |
| *B62J 1/08* | (2006.01) |
| *B62J 6/00* | (2006.01) |
| *B62J 27/00* | (2006.01) |
| *G08G 1/16* | (2006.01) |
| *B62K 3/00* | (2006.01) |
| *G06F 1/16* | (2006.01) |
| *G06F 13/40* | (2006.01) |
| *B62K 3/02* | (2006.01) |
| *B62K 21/16* | (2006.01) |
| *G05D 3/10* | (2006.01) |
| *B60L 15/20* | (2006.01) |
| *B62M 6/50* | (2010.01) |
| *B62J 6/04* | (2006.01) |
| *B60L 11/00* | (2006.01) |
| *B60L 11/18* | (2006.01) |
| *B62H 5/20* | (2006.01) |
| *B62K 25/02* | (2006.01) |

(52) U.S. Cl.
CPC .............. *B60L 15/20* (2013.01); *B62H 5/003* (2013.01); *B62H 5/20* (2013.01); *B62J 1/08* (2013.01); *B62J 6/003* (2013.01); *B62J 6/04* (2013.01); *B62J 27/00* (2013.01); *B62J 99/00* (2013.01); *B62K 3/00* (2013.01); *B62K 3/02* (2013.01); *B62K 15/00* (2013.01); *B62K 15/008* (2013.01); *B62K 21/16* (2013.01); *B62K 25/02* (2013.01); *B62M 6/50* (2013.01); *B62M 6/90* (2013.01); *E05B 71/00* (2013.01); *G05D 3/10* (2013.01); *G06F 1/1632* (2013.01); *G06F 1/1683* (2013.01); *G06F 1/1698* (2013.01); *G06F 13/4081* (2013.01); *G08G 1/165* (2013.01); *G08G 1/166* (2013.01); *B60L 2200/12* (2013.01); *B60L 2250/16* (2013.01); *B60L 2250/20* (2013.01); *B60L 2250/26* (2013.01); *B60L 2260/52* (2013.01); *B60L 2260/54* (2013.01); *B62H 2005/008* (2013.01); *B62J 2099/002* (2013.01); *B62J 2099/0006* (2013.01); *B62J 2099/008* (2013.01); *B62J 2099/0013* (2013.01); *B62J 2099/0026* (2013.01); *B62J 2300/002* (2013.01); *B62J 2300/0013* (2013.01); *B62K 2015/001* (2013.01); *B62K 2015/005* (2013.01); *B62K 2204/00* (2013.01); *Y02T 10/645* (2013.01); *Y02T 10/7005* (2013.01); *Y02T 10/7072* (2013.01); *Y02T 10/72* (2013.01); *Y02T 10/7275* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
USPC .............................................. 701/233, 14, 54
See application file for complete search history.

(56) References Cited

U.S. PATENT DOCUMENTS

| | | | | |
|---|---|---|---|---|
| 3,990,279 | A * | 11/1976 | Brickel | B62H 5/003 70/233 |
| 4,598,923 | A * | 7/1986 | Csizmadia | B62K 15/008 280/212 |
| 5,097,922 | A * | 3/1992 | Stagi | B62K 15/006 180/208 |
| 5,945,794 | A * | 8/1999 | Kitamura | B62H 5/08 318/16 |
| 6,057,657 | A * | 5/2000 | Kitamura | B62H 5/08 318/16 |
| 6,260,649 | B1 | 7/2001 | Carney, Jr. | |
| 6,267,401 | B1 | 7/2001 | De Jong | |
| 6,739,421 | B1 * | 5/2004 | Miya | B62K 15/006 180/206.1 |
| 6,979,013 | B2 | 12/2005 | Chen | |
| 7,077,229 | B2 * | 7/2006 | Lee | B62K 15/008 180/181 |
| 7,104,562 | B2 | 9/2006 | Gingl | |
| 7,314,109 | B2 | 1/2008 | Holland | |
| 7,495,549 | B2 | 2/2009 | Acres | |
| 7,706,935 | B2 | 4/2010 | Dube et al. | |
| 8,364,389 | B2 | 1/2013 | Dorogusker et al. | |
| 8,469,381 | B2 | 6/2013 | Dodman et al. | |
| 8,473,130 | B2 | 6/2013 | Brady et al. | |
| 8,489,278 | B2 | 7/2013 | Song et al. | |
| 8,554,410 | B2 | 10/2013 | Stahlin et al. | |
| 8,587,424 | B2 | 11/2013 | Aberizk | |
| 8,602,149 | B2 | 12/2013 | Krieger et al. | |
| 8,641,073 | B2 | 2/2014 | Lee et al. | |
| 8,651,212 | B2 | 2/2014 | Vincenz | |
| 8,781,690 | B2 | 7/2014 | Hara et al. | |
| 2003/0089144 | A1 * | 5/2003 | Hoffman | B62H 5/003 70/58 |
| 2004/0227340 | A1 * | 11/2004 | Taylor | B62K 15/006 280/781 |
| 2006/0175797 | A1 | 8/2006 | Sanders | |
| 2008/0094174 | A1 * | 4/2008 | Birtwistle | G07C 9/00039 340/5.7 |
| 2010/0175939 | A1 * | 7/2010 | Cheng | B60R 16/04 180/68.5 |
| 2010/0206652 | A1 * | 8/2010 | Kielland | B62J 25/00 180/220 |
| 2011/0254252 | A1 * | 10/2011 | Hsieh | B62K 15/006 280/639 |
| 2013/0062129 | A1 * | 3/2013 | Sunami | B62K 3/10 180/65.1 |
| 2013/0231810 | A1 | 9/2013 | Garcia | |
| 2013/0341884 | A1 * | 12/2013 | Raphael | B62K 5/02 280/259 |
| 2014/0000322 | A1 | 1/2014 | Williams | |
| 2014/0142842 | A1 | 5/2014 | Knobel et al. | |
| 2014/0153270 | A1 | 6/2014 | Lai | |
| 2014/0196970 | A1 * | 7/2014 | Biechele | B62J 99/00 180/206.4 |
| 2014/0236407 | A1 | 8/2014 | Decathlon | |
| 2015/0042065 | A1 * | 2/2015 | Wang | B62K 15/008 280/287 |
| 2015/0274243 | A1 * | 10/2015 | Timonen | E05D 11/1007 280/287 |
| 2016/0016625 | A1 | 1/2016 | Williams | |
| 2016/0036594 | A1 * | 2/2016 | Conrad | H04L 9/3271 713/185 |
| 2016/0137254 | A1 * | 5/2016 | Lee | B62K 11/02 180/208 |
| 2016/0244246 | A1 * | 8/2016 | Gerencser | B65D 85/68 |
| 2016/0257369 | A1 * | 9/2016 | Perkins | B62M 6/90 |
| 2016/0288875 | A1 * | 10/2016 | Fujiwara | B62M 6/90 |

FOREIGN PATENT DOCUMENTS

| | | |
|---|---|---|
| CN | 103192904 A | 7/2013 |
| CN | 203601452 U | 5/2014 |
| DE | 4029738 A1 | 3/1992 |
| DE | 20220513 U1 | 10/2003 |
| DE | 202013009744 U1 | 4/2014 |
| EP | 2176117 B1 | 3/2011 |
| EP | 2423096 A2 | 2/2012 |
| EP | 2617637 A1 | 7/2013 |
| EP | 2644492 A1 | 10/2013 |
| FR | 2904599 A1 | 2/2008 |
| GB | 2446390 A | 8/2008 |
| JP | 5099628 B2 | 12/2012 |
| TW | 200916362 | 4/2009 |

(56) References Cited

FOREIGN PATENT DOCUMENTS

| WO | 2009035261 A2 | 3/2009 |
| WO | 2011072942 A1 | 6/2011 |
| WO | 2013124764 A1 | 8/2013 |
| WO | 2014118504 A1 | 8/2014 |
| WO | 2014153493 A2 | 9/2014 |

OTHER PUBLICATIONS

"Built-in Bicycle Tail Light—LightSKIN", http://lightskin.co.kr/, Oct. 1, 2014, 3 pages.
"Gi—The lightest, safest, folding smart eBike. For people who love the city.", http://www.gibike.com, 6 pages.
"The Bike Design Project", http://oregonmanifest.com, 26 pages.

* cited by examiner

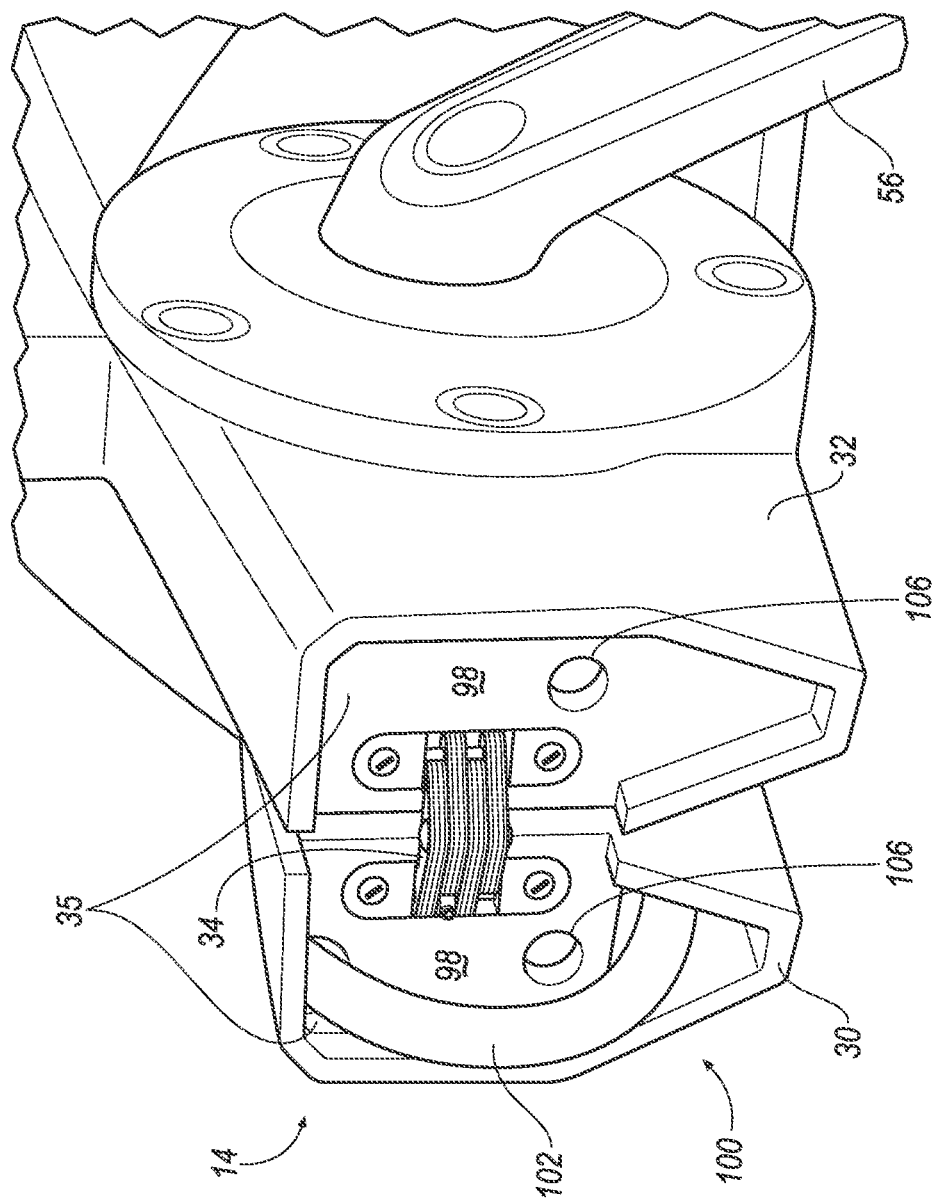

ELECTRIC BICYCLE

CROSS-REFERENCE TO RELATED APPLICATION

This application claims priority to U.S. Provisional Patent Application No. 62/032,173 titled "ELECTRIC BICYCLE" and filed on Aug. 1, 2014, the contents of which are hereby incorporated by reference in its entirety.

BACKGROUND

Vehicles such as automobiles may be used to transport other modes of transportation, such as bicycles, for example. The vehicle may be used to transport the bicycle, for example, for recreational use of the bicycle. As another example, the vehicle may be used to transport the bicycle so that the vehicle and the bicycle provide multi-modal transportation. Multi-modal transportation can include driving the vehicle to a location at which the vehicle may be parked and then driving the bicycle from the vehicle to a final destination. For example, a driver may travel to a work office located in an urban setting congested by commuters by first driving the vehicle to a less congested satellite parking lot remote from the office and driving the bicycle from the vehicle to the office. The bicycle may be more easily and quickly maneuvered in the more congested areas, and at lower cost to the owner and the environment.

The bicycle includes a frame and a pedal assembly for manually pedaling the bicycle. In addition to manual propulsion by pedaling, the bicycle may be an electric bicycle that is propelled electrically, e.g., by battery powered. Accordingly, the driver may selectively pedal the electric bicycle or may ride on the electric bicycle as the electric bicycle is electrically propelled. The pedals may be used, for example, when the driver seeks exercise or when the battery is dead. The electric propulsion may be used, for example, to assist in pedaling when the driver does not want to become heated due to the exercise of pedaling. For example, a driver may use the bicycle with electrical propulsion when the driver is driving to work and does not want to sweat into or wrinkle the clothing of the driver. When electrically propelled, some jurisdictions, e.g., the European Union, requires the driver to constantly provide a certain amount of pedal input to initiate and maintain the electric propulsion. Operation of the electric bicycle such that the electric propulsion of the bicycle only assists manual propulsion, i.e., the electric bicycle may not be operated by only electric propulsion, may be referred to as a pedelec mode.

Packaging bicycles in or on a vehicle during transportation creates difficulties, especially with relatively small vehicles. An interior of a vehicle may be reconfigurable, e.g., seats may be folded, to accommodate a bicycle in the interior of the vehicle. However, the bicycle disadvantageously consumes valuable interior space of the vehicle and can disadvantageously move within the vehicle during unexpected acceleration or deceleration.

Bicycles can alternatively be stored on an exterior of a vehicle during transportation. For example, after-market racks are available for mounting to vehicles and supporting one or more bicycles. However, these after-market racks are expensive to purchase. Assembly of the after-market rack to the vehicle and assembly of the bicycle onto the rack is also disadvantageously time consuming. The rack and the bicycle also disrupts airflow around the vehicle during travel, thereby disadvantageously decreasing fuel economy of the vehicle.

Accordingly, there remains an opportunity to design a device for multi-modal transportation that is easily and compactly integrated with the vehicle.

BRIEF DESCRIPTION OF THE DRAWINGS

FIG. 9 is a perspective view of the frame in the folded position exposing a hinge;

DETAILED DESCRIPTION

With reference to the Figures, wherein like numerals indicate like parts throughout the several views, an electric bicycle 10 is shown. As set forth further below, the electric bicycle 10 is conveniently integrated with a vehicle 12 for multi-modal transportation. In other words, the vehicle 12 may be used to transport the electric bicycle 10 to a desired location at which the electric bicycle 10 may be removed from the vehicle 12 and driven to a final destination.

As one example, a person who has an office in a congested urban setting may drive the vehicle 12 to a parking lot remote from the office and drive the electric bicycle 10 from the vehicle 12 to the office. The electric bicycle 10 may be easier and quicker to maneuver in the crowded urban setting. An occupant, i.e., the driver, may pedal the electric bicycle 10 in a manual mode for exercise and/or in the event that the electric bicycle 10 is out of power. The driver may ride the electric bicycle 10 in a powered mode to conserve body energy and/or to avoid sweating in work clothing.

Figure 1:
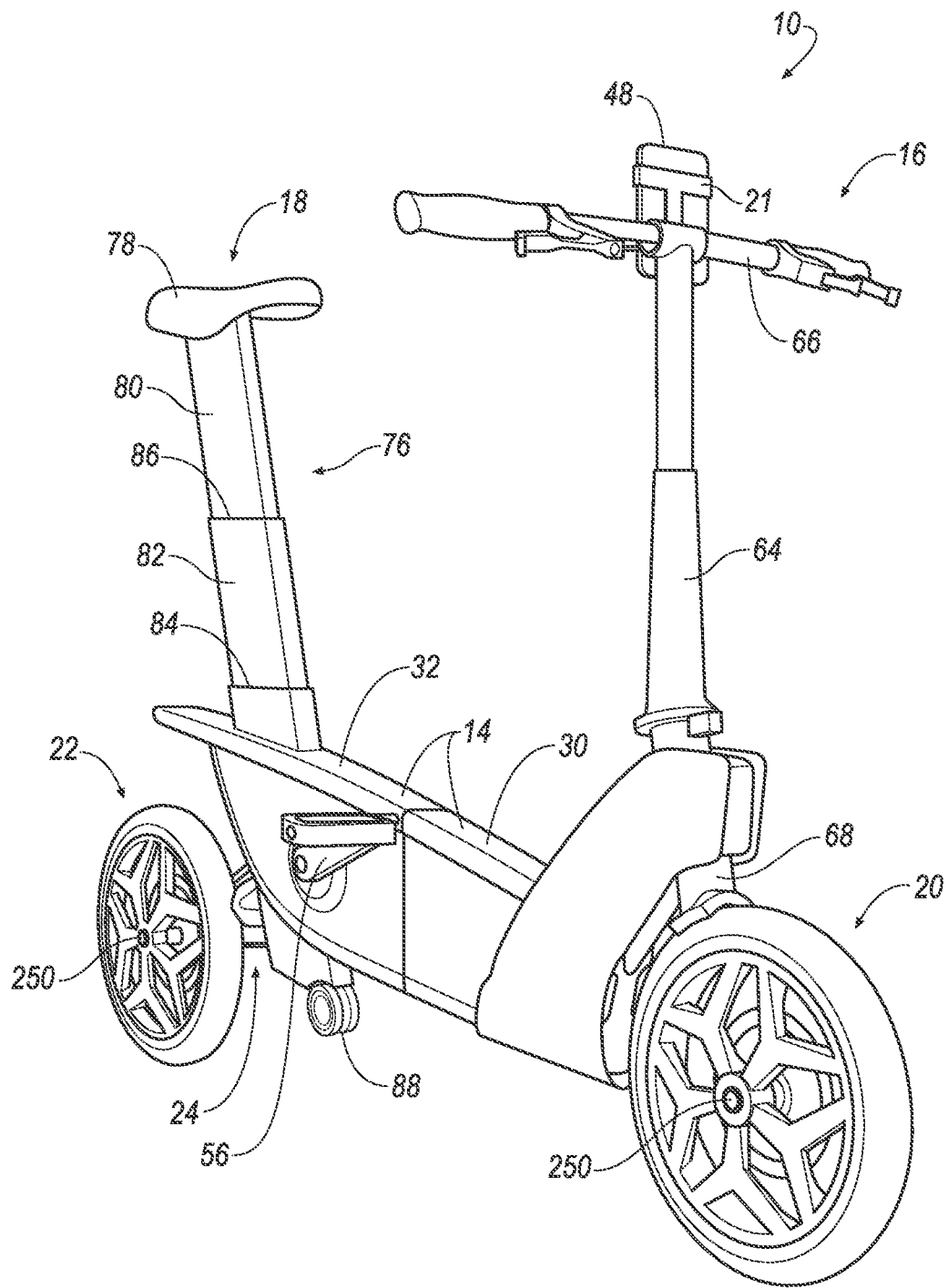
FIG. 1 is a perspective view of an electric bicycle in an unfolded position.

With reference to FIG. 1, the electric bicycle 10 includes a frame 14, a handlebar assembly 16 coupled to the frame 14, and a seat assembly 18 coupled to the frame 14. A front wheel 20 is supported by the frame 14 and may be coupled to the handlebar assembly 16 for steering the front wheel 20. A rear wheel 22 is supported by the frame 14. A drivetrain 24 is connected to at least one of the front wheel 20 and the rear wheel 22 for propelling the electric bicycle 10. A power source, such as a battery 26 (shown in FIGS. 28 and 29), is coupled to the drivetrain 24 for powering the drivetrain 24. The electric bicycle 10 includes a computing device 28 (shown in FIGS. 28 and 29), i.e., a controller, for controlling the drivetrain 24 and/or other features of the electric bicycle 10.

Figure 7:
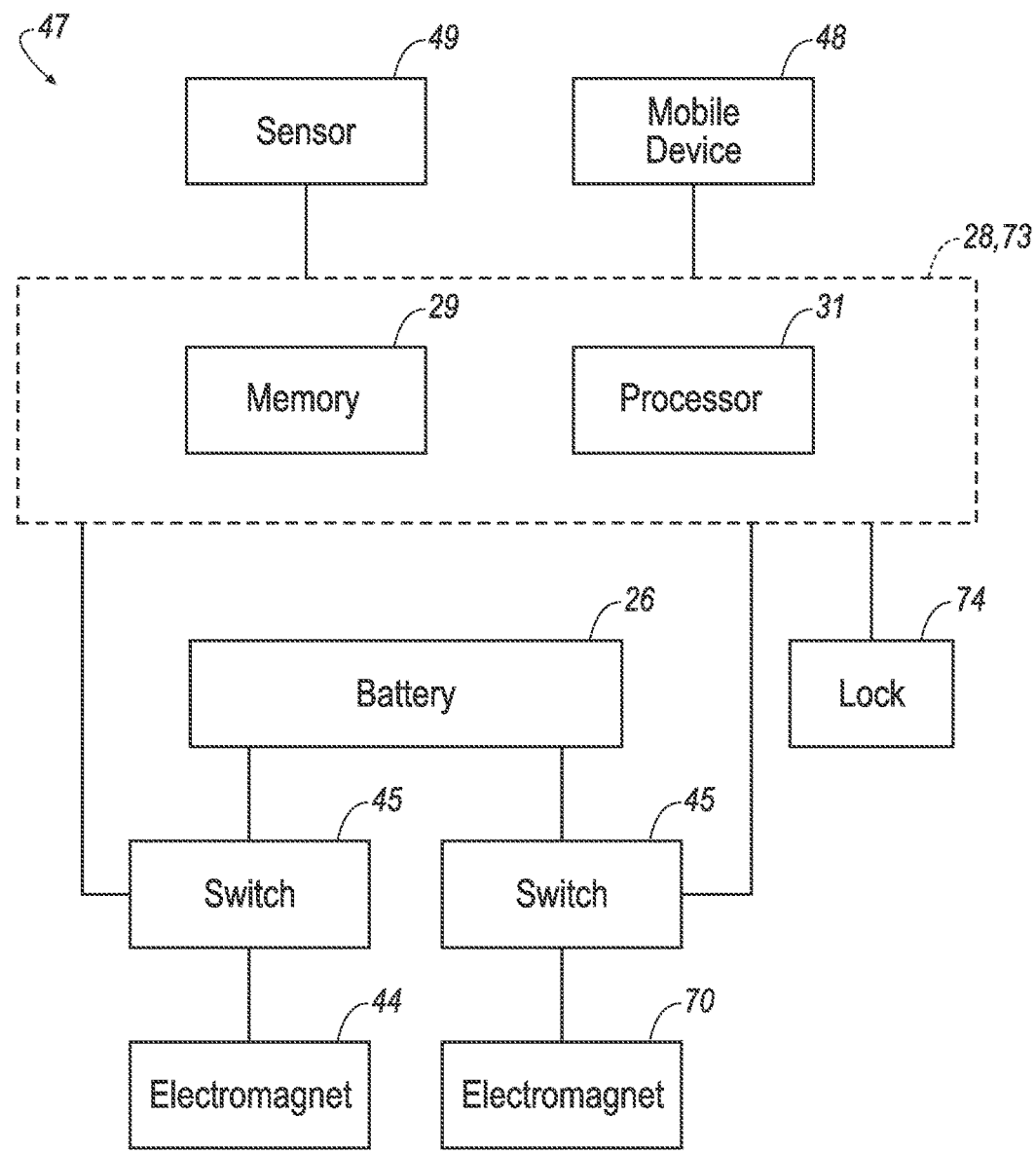
FIG. 7 is a schematic of an unfold assist system.
Figure 28:
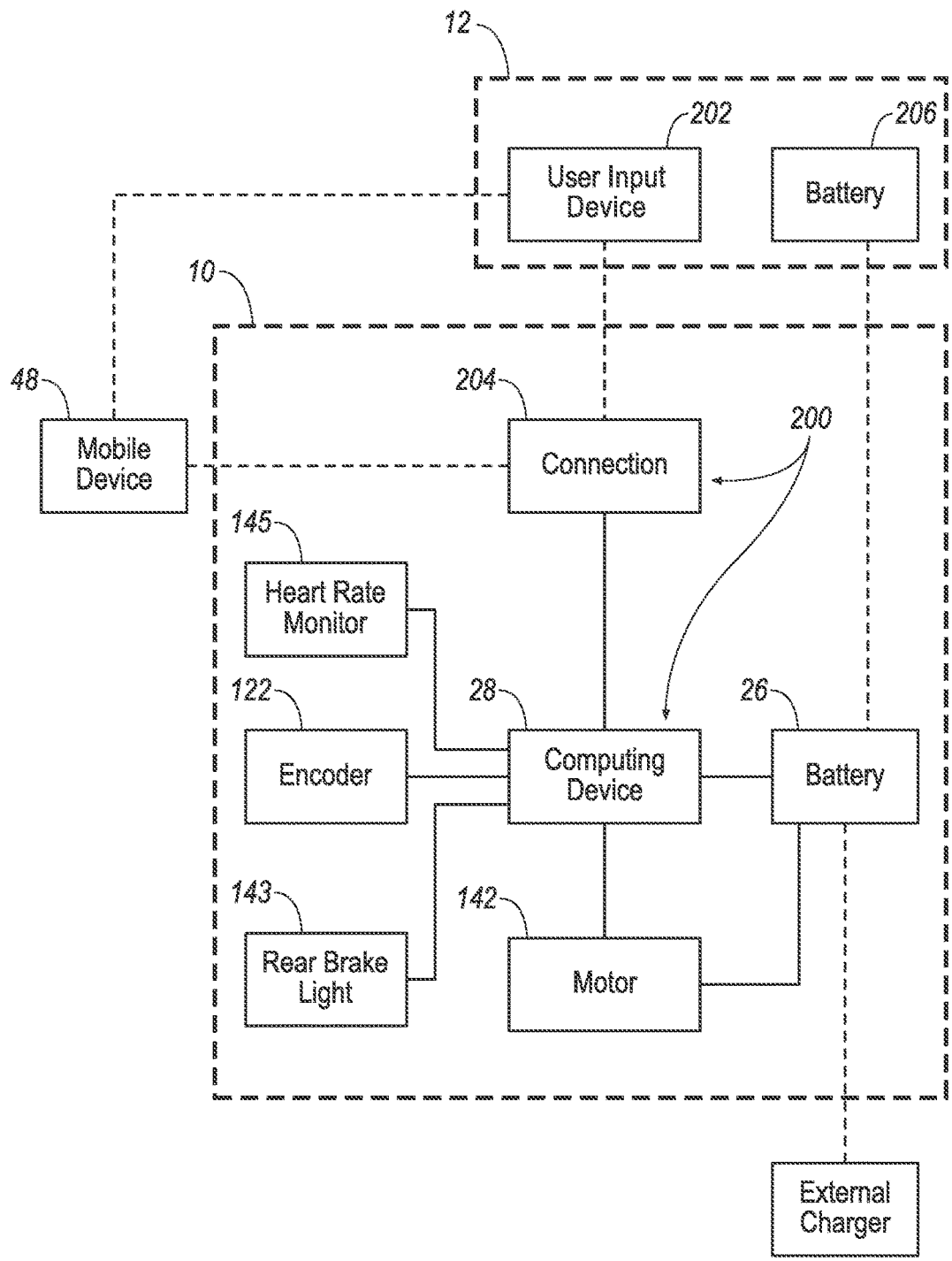
FIG. 28 is a block diagram showing communication between the electric bicycle, a vehicle, and a mobile device.
Figure 29:
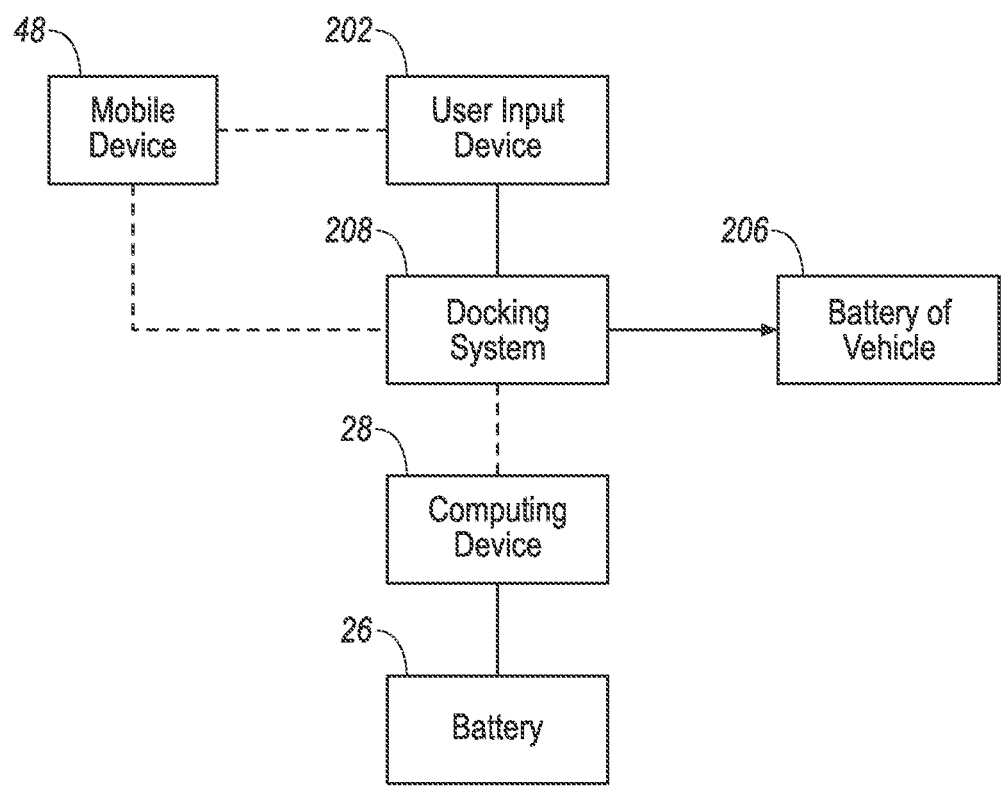
FIG. 29 is a block diagram showing communication between the electric bicycle, the vehicle, and the mobile device through a docking system.

With reference to FIGS. 28 and 29, the computing device 28 may include any suitable components. For example, as shown in FIG. 7, the computing device 28 may include a processor 31, memory 29, etc. With continued reference to FIGS. 28 and 29, a mobile device 48, e.g., a mobile phone, tablet, etc., may be supported by the bicycle 10 and may be in communication with the computing device 28, as set forth further below. The mobile device 48 may be releasably docked to the bicycle 10, for example, with a docking station 21, as shown in FIGS. 1 and 3.

Figure 2:
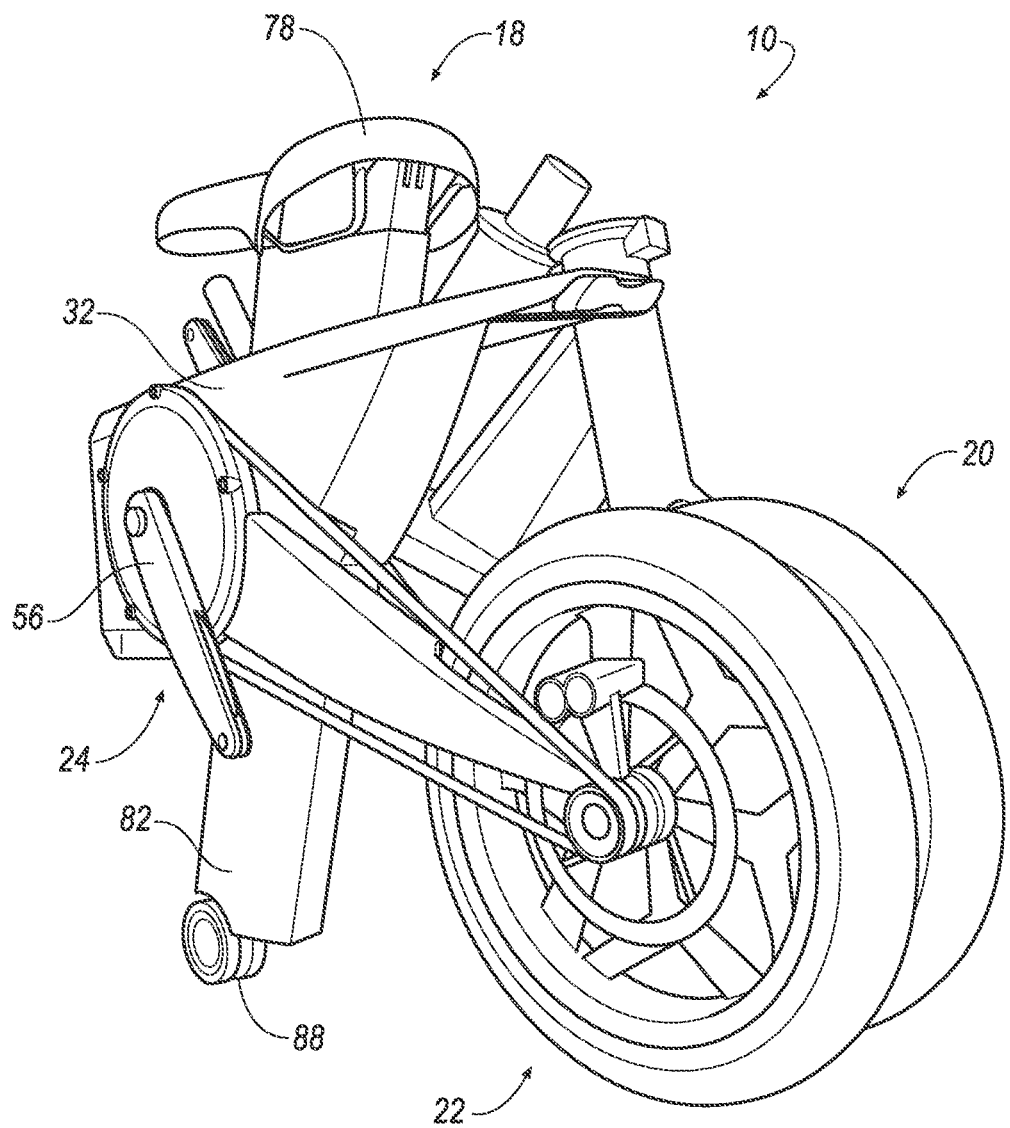
FIG. 2 is a perspective view of the electric bicycle in a folded position.
Figure 3:
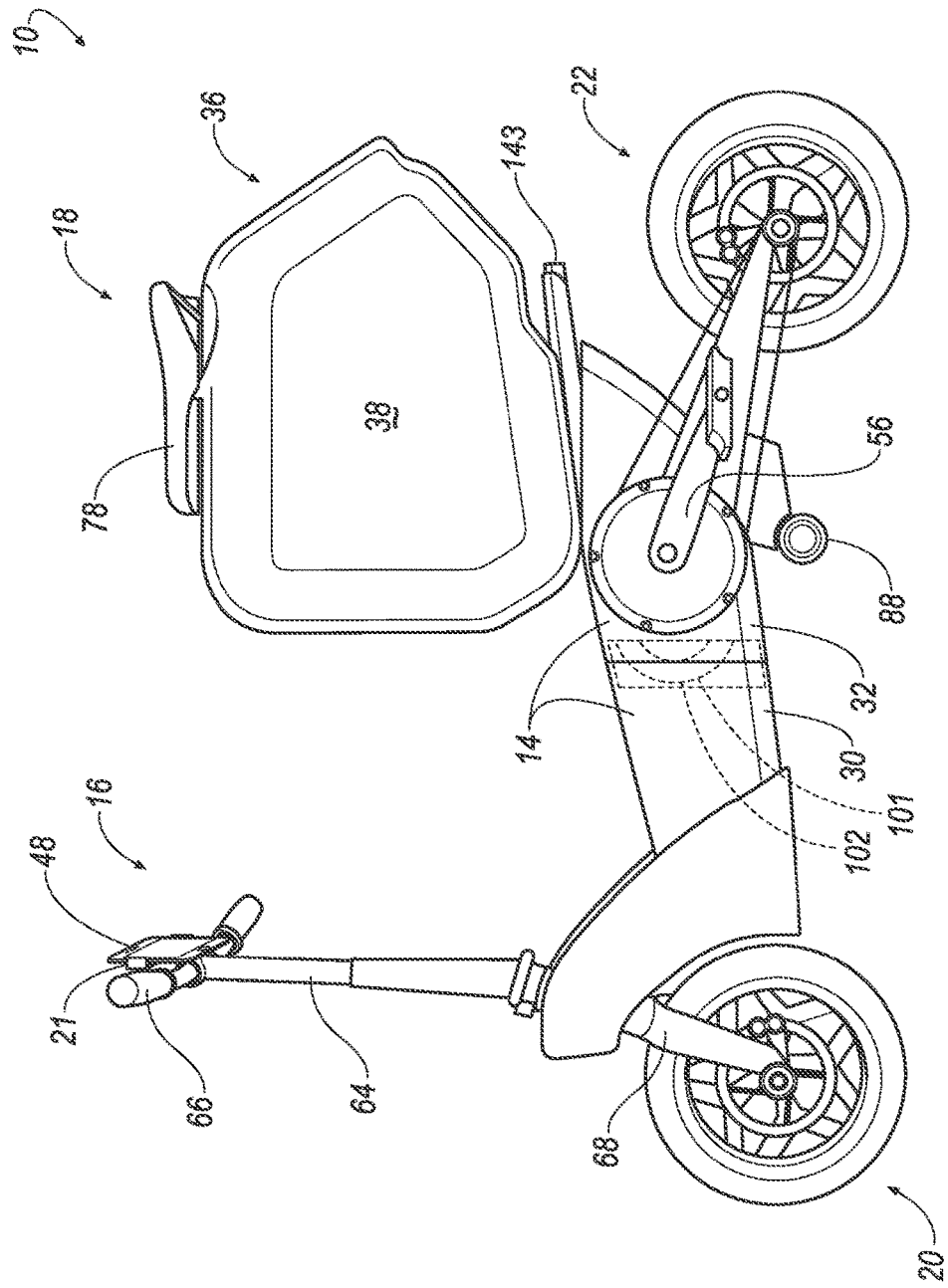
FIG. 3 is a side view of the electric bicycle in the unfolded position and including a shell concealing a seat post.

With reference to FIGS. 1-3, the frame 14 includes a front segment 30, e.g., a first segment 30, and a rear segment 32, e.g., a second segment 32. The front segment 30 supports the handlebar assembly 16 and the rear segment 32 supports the seat assembly 18. The drivetrain 24 may be supported by the rear segment 32.

Figure 6:
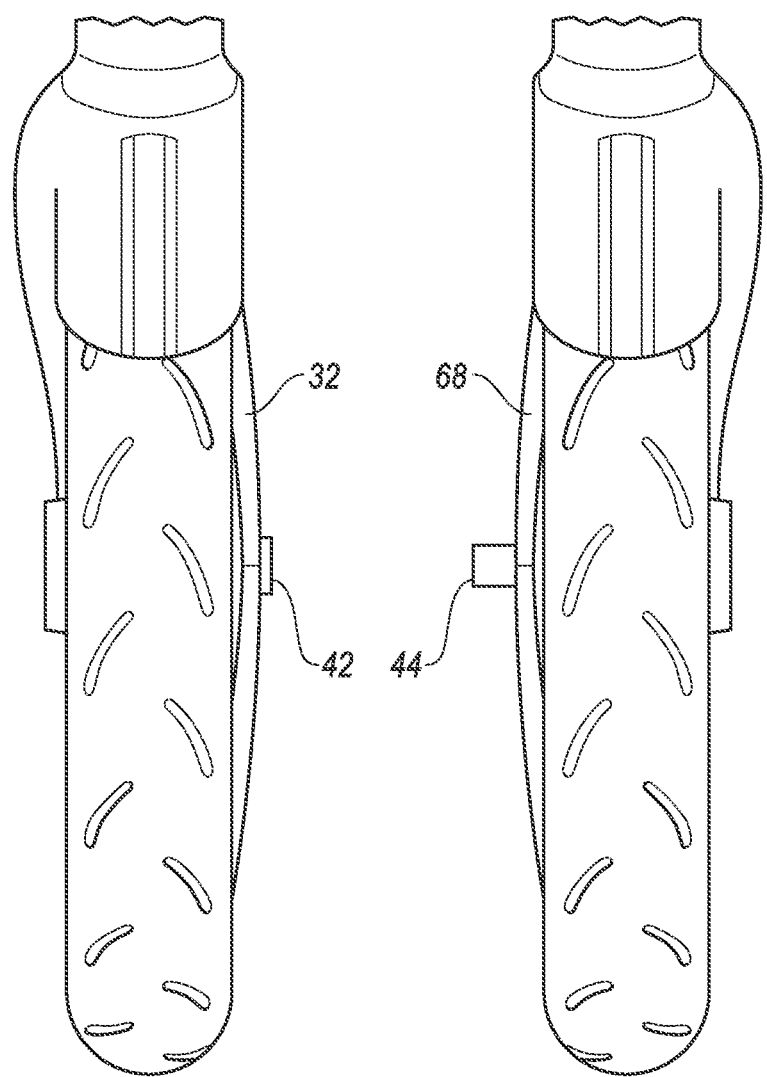
FIG. 6 is a perspective view of a portion of a front wheel and rear wheel of the electric bicycle and an electromagnet and a magnet for locking the frame in the folded position.

The front segment 30 and the rear segment 32 each may, for example, include a wheel support member engaging the front wheel 20 and the rear wheel 22. The wheel support members may be a single bar extending along one side of the front wheel 20/rear wheel 22, as shown in FIG. 1. In such a configuration, the front wheel 20 and rear wheel 22 may be sandwiched between the wheel support members when the frame 14 is in a folded position, as shown in FIGS. 2 and 6. Alternatively, the wheel support members may be a fork extending along both sides of the front wheel 20/rear wheel 22.

Figure 4:
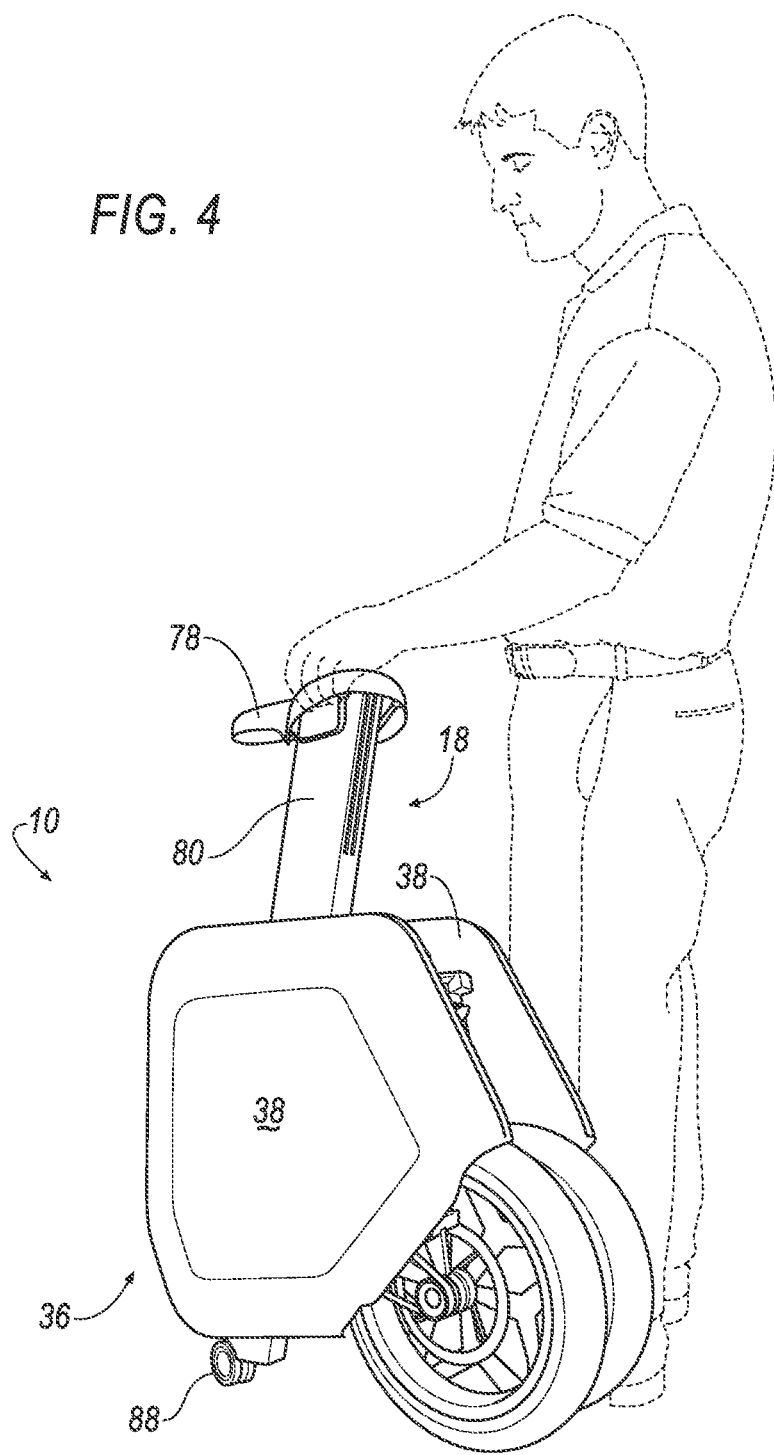
FIG. 4 is a perspective view of the electric bicycle in the folded position with the shell concealing a frame of the electric bicycle.
Figure 5:
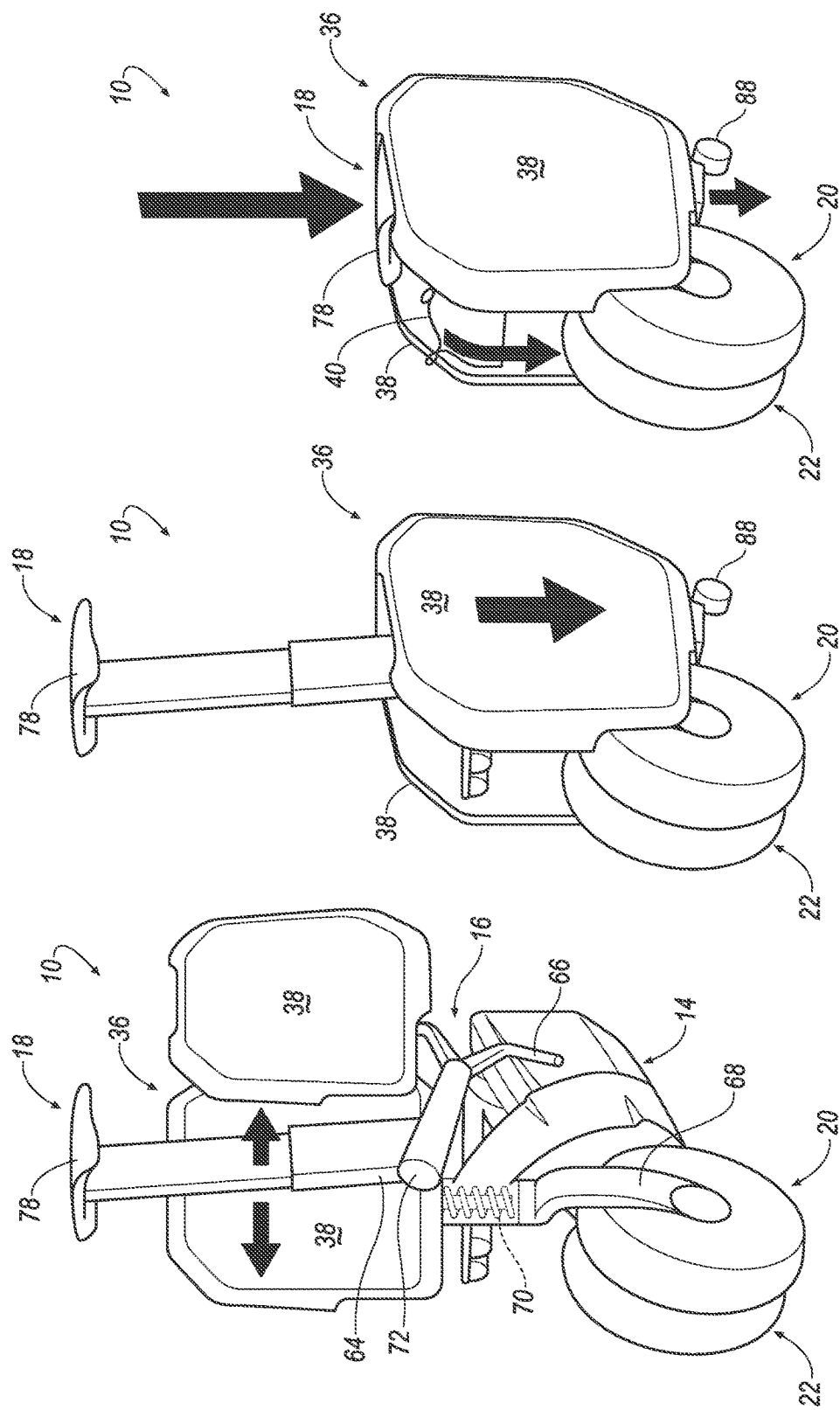
FIG. 5A is a perspective view of the electric bicycle with the frame in the folded position and the case being disengaged.
FIG. 5B is a perspective view of the electric bicycle with the case concealing the frame in the folded position and the seat post extended to operate as a handle.
FIG. 5C is a perspective view of the electric bicycle with the seat post retracted to be concealed in the case.

The frame 14 is foldable, as shown in FIGS. 1-4, for example. Specifically, the frame 14 is foldable, e.g., pivotable, between an unfolded position, as shown in FIGS. 1 and 3, and a folded position, as shown in FIGS. 2 and 4. The front segment 30 and the rear segment 32 may be releasably coupled to each other for movement between the folded and unfolded positions.

As one example, as shown in FIG. 9, a hinge 34 may connect the front segment 30 and the rear segment 32. The hinge 34 is configured to allow the front segment 30 and the rear segment 32 to be rotated about the hinge 34 between the folded position and the unfolded position. The hinge 34 may, for example, allow 180 degrees of rotation between the front segment 30 and the rear segment 32 between the folded position and the unfolded position. However, the front segment 30 and the rear segment 32 may be releasably coupled to each other in any suitable fashion.

The hinge 34 may be a concealed hinge, i.e., the hinge 34 may be concealed between the front segment 30 and the rear segment 32 when the frame 14 is in the unfolded position. The front segment 30 and/or the rear segment 32 may define a pocket 35 for housing the hinge 34 when the frame 14 is in the unfolded position. For example, the hinge 34 may be a Soss hinge as shown in FIG. 9. Alternatively, the hinge 34 may be any suitable type of hinge, such as a butt hinge, pivot hinge, etc.

With reference to FIG. 9, the hinge 34 may include a first bracket 58 connected to the front segment 30 and a second bracket 59 connected to the rear segment 32. The first bracket 58 and the second bracket 59 are connected by a first set 60 of plates and a second set 61 of plates. The first set of plates 60 and the second set of plates 61 are pivotally connected to each other and pivotally connected to the first bracket 58 and the second bracket 59. The first bracket 58 and/or the second bracket 59 may define the pocket 35.

With reference to FIGS. 3-5C, the electric bicycle 10 may include a shell 36 for encasing at least a portion of the frame 14 when the frame 14 is in the folded position. The shell 36 may be supported by the frame 14 when the electric bicycle 10 is in the unfolded position. As shown in the FIG. 3, for example, the shell 36 may receive a portion of the seat assembly 18 when the electric bicycle 10 is in the unfolded position. In such a configuration, the electric bicycle 10 may be operated with the shell 36 on the seat assembly 18.

The shell 36 may include two sides 38, as best shown in FIG. 4. The two sides 38 may engage each other, e.g., by spring loading, snapping, fasteners, etc., to retain the shell 36 on the frame 14. Alternatively, or in addition, the two sides 38 may engage the frame 14 and/or the seat assembly 18 to retain the shell 36 on the frame 14.

As shown in FIGS. 5A-C, the shell 36 is moveable to expose/encase at least a portion of the frame 14. For example, as shown in FIG. 5A, the two sides 38 may be removed from each other and the seat assembly 18, e.g., removed from the rest of the bicycle 10. When the two sides 38 are removed, the frame 14 may be moved to the folded position.

Alternatively, at least one of the two sides 38 may slidably engage a rail (not shown) on the frame 14 and/or the seat assembly 18 for guiding the shell 36 between the position encasing the seat assembly 18, as shown in FIG. 3, and the position encasing the frame 14, as shown in FIG. 4. In such an embodiment, the frame 14 may be moved to the folded position when the two sides 38 are in the position encasing the seat assembly 18 and the two sides 38 may be subsequently moved to the position encasing the frame 14. One of the two sides 38 may be spring mounted to the rail, i.e., configured to be resiliently moved away from the rail while being retained to the rail. The other side 38 may be spring mounted to the side 38 that is spring mounted to the rail.

The two sides 38 may be rigid. For example, the two sides 38 may be formed of a suitable composite such as fiberglass, carbon fiber, etc., and/or may be formed of suitable metal and/or plastic.

With reference to FIG. 5C, the shell 36 may include at least one intermediate member 40 extending between the two sides 38. The intermediate member 40 may be flexible relative to the sides 38. The intermediate member 40, for example, may be formed of neoprene or any other suitable material. The intermediate member 40 may be removably engaged with the sides 38. For example, the intermediate member 40 may be connected to the sides with a zipper, snaps, hook and loop fasteners, etc.

As shown in FIG. 5A, the two sides of the shell 36 are moved away from each other to disengage the two sides from the handle assembly. The two sides may be moved away from each other after the frame 14 is moved to the folded position, as shown in FIG. 5A, or, alternatively, the frame 14 may be moved to the folded position after the two sides encase the frame 14 in the folded position. In another embodiment, the frame 14 may be moved to the folded position after the two sides of the shell 36 are moved to the folded position.

As shown in FIG. 5B, the two sides 38 are moved into position encasing at least a portion of the frame 14 in the folded position. In this position, the two sides 38 may engage the each other and/or the frame 14 to retain the shell 36 relative to the frame 14. As shown in FIG. 5C, the seat assembly 18 may be retracted into the shell 36 and the intermediate member 40 may be deployed between the sides 38.

With reference to FIG. 6, one of the front segment 30 and the rear segment 32 supports, e.g., is fixed relative to, a magnet 42, e.g., a permanent magnet, and the other of the front segment 30 and the rear segment 32 supports, e.g., is fixed relative to, an electromagnet 44 aligned with the magnet 42 when the frame 14 is folded. The magnet 42 and the electromagnet 44 may be fixed to the wheel support members of the front segment 30 and the rear segment 32, and/or may be fixed wheel hubs of the front segment 30 and the rear segment 32.

As shown in FIG. 7, the electromagnet 44 is a component of an unfold assist system 47 that may be configured to unfold the frame 14 from the folded position to the folded position. The electromagnet 44 is coupled to the power source of the electric bicycle 10, e.g., the battery 26, such that power to the electromagnet 44 may be turned on and off. In other words, when power is supplied to the electromagnet 44, the electromagnet 44 emits a repelling magnetic field, and when power is not supplied to the electromagnet 44, the electromagnet 44 does not emit a magnetic field. A switch (shown in FIG. 7), for example, may be in communication with the electromagnet 44 to turn the electromagnet 44 on and off.

The electromagnet 44 includes a core, formed of a ferromagnetic material such as iron, and a wire coiled around the core. When power is supplied to the wire, the electromagnet 44 emits a magnetic field. The magnet 42 and the electromagnet 44 are fixed to the front segment 30 and the rear segment 32 such that the same poles of the magnet 42 and electromagnet 44 face each other when the frame 14 is folded. For example, the north pole of the magnet faces the north pole of the electromagnet 44, or the south pole of the magnet 42 faces the south pole of the electromagnet 44, when the frame 14 is in the folded position.

The electromagnet 44 is disposed in a magnetic field of the magnet 42 when the frame 14 is in the folded position. When the frame 14 is in the folded position and the electromagnet 44 is turned off, the magnet 42 attracts the core of the electromagnet 44 to retain the frame 14 in the folded position. When the frame 14 is in the folded position and the electromagnet 44 is turned on, the electromagnet 44 emits a magnetic field and, since the same poles of the magnet 42 and electromagnet 44 are aligned, the magnet 42 repels the electromagnet 44 to assist in opening the frame 14 to the unfolded position. For example, when the frame 14 is in the folded position, the electromagnet 44 may be turned on initiate the movement to the unfolded position without further manual input from the user.

With continued reference to FIG. 7, a controller 73, e.g., the computing device 28, may be configured to power the electromagnet 44 to repel the magnet 42 to unfold the frame 14. Specifically, the controller 73, e.g., the computing device 28, may be coupled to the power source, e.g., the battery 26, and the controller 73 may selectively connect the power source to the electromagnet 44 to power the electromagnet 44. For example, a switch 45 may be coupled to the power source, e.g. the battery 26, and to the controller 73, e.g., the computing device 28. The controller 73, e.g., the computing device 28, may be programmed to close the switch 45 to power the electromagnet 44.

The supply of power to the electromagnet 44 may be controlled with an authorized security pass. The security pass may be an electronic device, e.g., a mobile device 48 such as a mobile phone, tablet, etc, which communicates with the electric bicycle 10 to identify authorized use. The security pass may be key (not shown), such as a mechanical key or a wireless key, such as an RFID key. The security pass may be operable by a biometric indicator, such as a fingerprint scan, retinal scan, etc. As such, the electromagnet 44 may be operable as a security device to prevent unauthorized use, i.e., the electromagnet 44 may be selectively operable as a security system to prevent the frame 14 from being unfolded by anyone except an authorized user.

The controller may be programmed to prevent supply of power to the electromagnet 44 in the absence of detection of a security pass. For example, the controller 73, e.g., the computing device 28, may be programmed to prevent supply of power to the electromagnet 44 in the absence of detection of a pre-identified mobile device 48, e.g., a mobile phone. As another example, the controller 73, e.g., the computing device 28, may be programmed to prevent supply of power to the electromagnet in the absence of detection of a wireless proximity device, e.g., a wireless proximity identifier in a key fob.

A buffer layer 46 may be mounted to the magnet 42 and/or the electromagnet 44. The buffer layer 46 may be formed of a non-ferromagnetic material, such as plastic. The buffer layer 46 is disposed between the magnet 42 and the electromagnet 44 when the frame 14 is in the folded position. The buffer layer 46 prevents the magnet 42 from fully engaging the core of the electromagnet 44, which would render the repulsion impossible when the electromagnet 44 is powered.

With reference to FIGS. 10A-12, the hinge 34 may be spring-loaded to assist movement of the frame 14 from the folded position to the unfolded position and to retain the frame 14 in the unfolded position while the user locks the frame 14 in the unfolded position. For example, a spring 57 may be configured to bias the frame 14 about the hinge 34 toward the unfolded position.

Specifically, the hinge 34 may include a post 62 connected to the first set 60 of plates and extending from the first set 60 through the first bracket 58 to a cantilevered end 63. A cap 65 may be fixed to the post 62 adjacent the cantilevered end 63. The spring 57 is retained on the post 62 between the cap 65 and the first bracket 58. The cap 65 may be threadedly engaged with the post 62 for adjustment along the post 62 to vary the tension on the spring 57.

With reference to FIGS. 10A-11B, the as the frame 14 moves from the unfolded position to the folded position, the first bracket 58 and the second bracket 59 move toward each other and the first set 60 of plates and second set 61 of plates move relative to each other and relative to the first bracket 58 and second bracket 59. As the first set 60 of plates moves relative to the first bracket 58, the first set 60 of plates pulls the post 62 through the first bracket 58 to compress the spring 57 between the cap 65 and the first bracket 58. The compression of the spring 57 between the cap 65 and the first bracket 58 urges the frame 14, through the first set 60 of plates toward the unfolded position.

Figure 12:
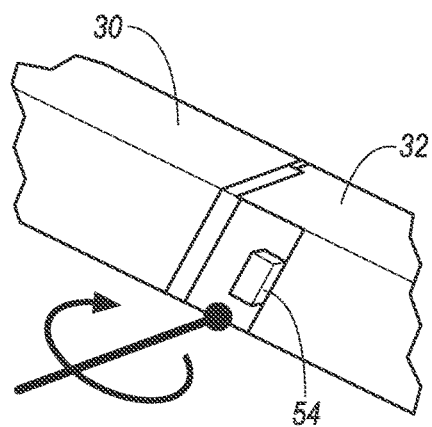
FIG. 12 is a perspective view of the frame including a clasp.

With reference to FIG. 12, a clasp 54 may hold the frame 14 in the folded position. For example, the clasp 54 may selectively lock to both the front segment 30 and the rear segment 32 in the folded position to prevent relative movement between the front segment 30 and the rear segment 32 toward the unfolded position. The unfolding process may occur once the user releases the clasp 54. When the clasp 54 is released, the spring 57 may be configured to initiate the unfold process of the frame 14. Once unfolded, the user may then actuate a clamp (not shown) to constrain the bicycle 10 in the unfolded position. Once the clamp has been actuated, the user may mount the electric bicycle 10.

In another embodiment, a torsion spring (not shown) may connect the front segment 30 and the rear segment 32 for assisting movement between the folded and unfolded positions. Once the frame 14 is in the unfolded position, the torsion spring may be returned to a folded orientation, ready to support with the next unfold process. For example the torsion spring may be configured such that pedaling the crank 56 re-tension the spring. The re-tensioning process may be completed in any suitable manner. For example, an electric motor may return the torsion spring. As another example, a linkage may be coupled to a crank 56. The linkage is configured such that when the user initiates pedaling the crank 56, the torsion spring is automatically repositioned. For example, a half toothed gear may be coupled to the spring and the crank 56 to actuate the half rotation of the torsion spring when unfolded, but is not engaged once the torsion spring has returned to the folded state. Alternatively, the linkage may include a protrusion and the crank 56 may have a corresponding protrusion configured to force the spring back into the folded orientation/.

The handlebar assembly 16 may be pivotably coupled to the front segment 30 between an extended position, as shown in FIGS. 1 and 3, and a retracted position, as shown in FIG. 2. With reference to FIGS. 1 and 3, the handlebar assembly 16 may, for example, include a stem 64 rotatably connected to the front segment 30 of the frame 14. A handlebar 66 is supported on the stem 64 for steering by a driver of the electric bicycle 10. The handlebar assembly 16 may include a fork 68 rotatably supporting the front wheel 20. The front segment 30 of the frame 14 may rotatably support the fork 68 and the stem 64 may be connected to the fork 68 for rotating the fork 68 relative to the front segment 30. The fork 68 may, for example, include a single arm that supports the front wheel 20, as shown in the figures, or alternatively may include two prongs that support opposite sides of the front wheel 20.

With reference to FIG. 5A, the stem 64 may be removably connected to the fork 68. The fork 68 and/or the stem 64 may support at least one magnet 70 for retaining the stem 64 to the fork 68. For example, the fork 68 may support the magnet 70 and the stem 64 may present an end 72 formed of ferromagnetic material. To assemble the stem 64 to the fork 68, the magnet 70 is aligned with the end to magnetically attract the end to the magnet 70. One of the stem 64 and the fork 68 may include a mechanical lock 74, e.g., a mechanical clamp 74 (similar to that shown in FIG. 32) for clamping the stem 64 to the fork 68 once assembled. The magnet 70 may be a permanent magnet. To disassemble the stem 64 from the fork 68, a force greater than the force of the magnetic attraction between the magnet 70 and the end 72 may applied, i.e., applied manually by the user, to disengage the stem 64 from the fork 68. When disengaged from the fork 68, the stem 64 and handlebar 66 may be stored in the shell 36, as shown in FIG. 5A. The magnet 70 may be an electromagnet (identified with element number 70 in FIG. 5A) that may be turned on, i.e., to generate a magnetic field, to retain the stem 64 to the fork 68. The electromagnet 70 may be turned off, i.e., to remove the magnetic field, to allow the stem 64 to be disengaged from the fork 68, as shown in FIG. 5A. For example, the electromagnet 70 may be powered to align the stem 64 with the fork 68, at which time the mechanical clamp 74 may be clamped to fix the stem 64 and the fork 68. After the stem 64 is fixed to the fork 68, the electromagnet 70 may be turned off to allow the stem 64 to be disassembled from the fork 68 after the mechanical clamp is unclamped.

With reference to FIG. 7, the electromagnet 70 may be turned on and/or off manually and/or automatically. For example, a switch may be in communication with the electromagnet 70 to turn the electromagnet on and off. In addition, or in the alternative, the computing device 28 of the electric bicycle 10 may automatically turn on the electromagnet 70. For example, the computing device 28 may power the electromagnet 70 when the frame 14 is unfolded, which may be communicated to the computing device 28 by sensors (not shown). As another example, the computing device 28 may power the electromagnet 70 when the electric bicycle 10 is authorized for use with the authorized security pass, as set forth above. The computing device 28 may automatically turn off the electromagnet 70 when, for example, the mechanical clamp 74 is clamped, which may be communicated to the computing device 28 by sensors (not shown). The bicycle 10 may include a sensor 49 in one of the first segment 30 and the second segment 32 and configured to detect when the frame 14 is in at least one of the folded position and the unfolded position. The sensor 49 may communicate an indication of the frame 14 being in the folded position and/or the unfolded position to the computing device 28.

The mechanical lock 74 may releasably engage the handlebar assembly 66 and the first segment 30 when the handlebar assembly 66 is in the extended position. The mechanical lock 74 may be configured to notify the controller 73, e.g., the computing device 28, when the mechanical lock 74 engages the handlebar assembly 66 and the first segment 30. For example, the mechanical lock 74 may include a sensor configured to detect when the mechanical lock 74 locks the handlebar assembly 66 in the extended position. This sensor may communicate data to the controller 73, e.g., the computing device 28, to identify to the controller 73, e.g., the computing device 28, that the handlebar assembly 66 is locked in the extended position. The controller 73, e.g., the computing device 28, may be configured to provide an instruction to discontinue power to the electromagnet 70 when the mechanical lock 74 identifies to the controller 73 that the handlebar assembly 66 is locked in the extended position. Alternatively, the controller 73 is programmed to power the electromagnet 70 for a predetermined period of time after the electromagnet 70 is initially powered.

Figure 8:
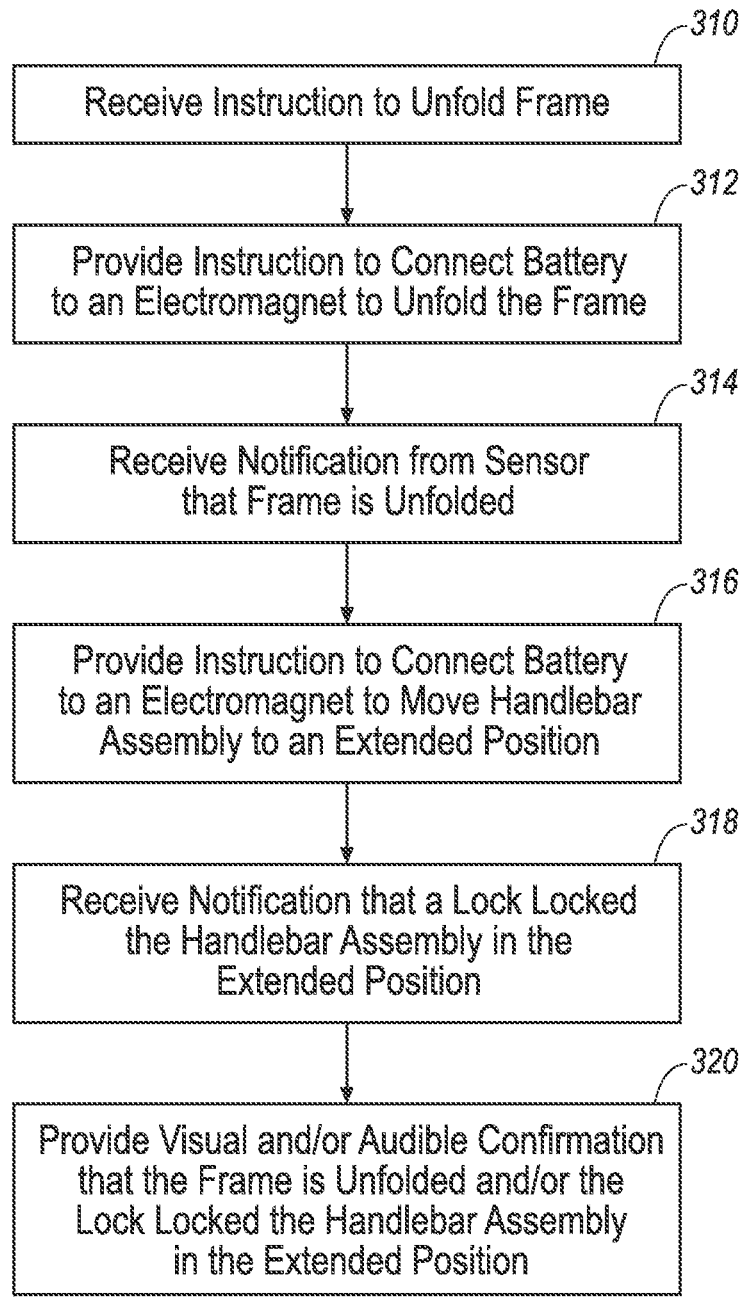
FIG. 8 is a block diagram of a method of operating the unfold assist system.
Figure 10A:
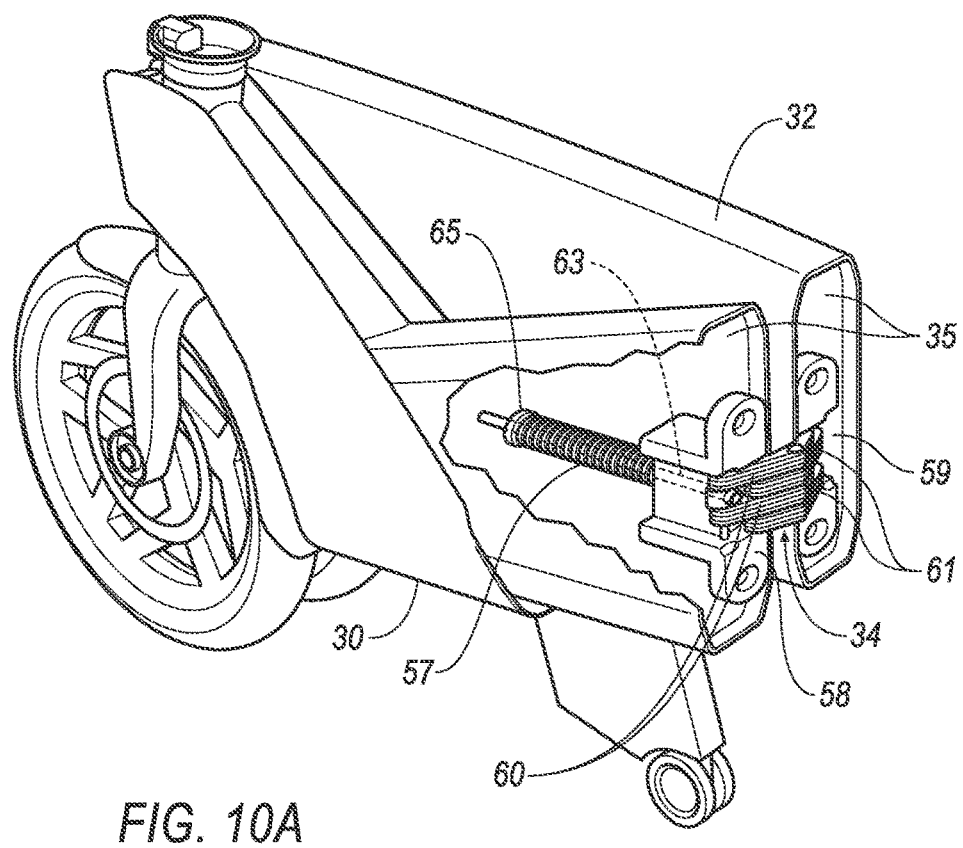
FIG. 10A is a perspective view of the frame in the folded position and partially cut-away to show a spring attached to the hinge.
Figure 10B:
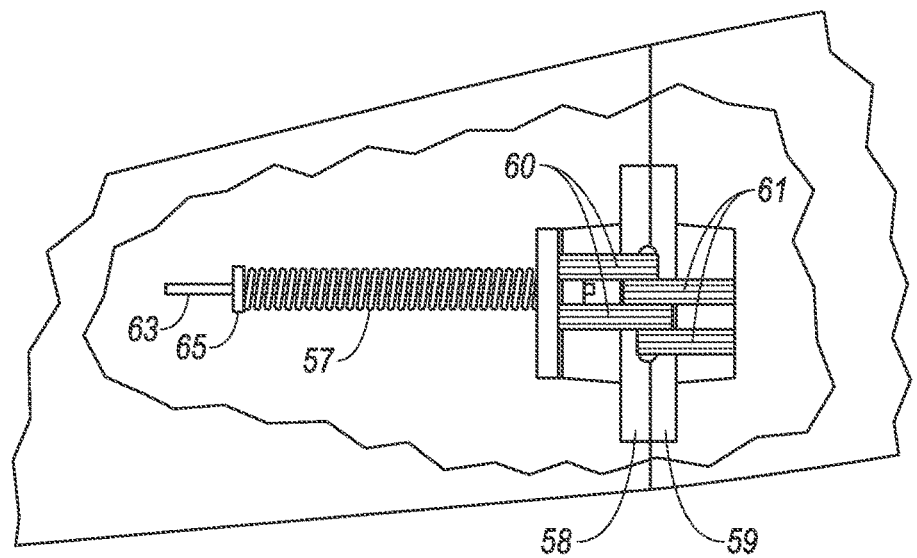
FIG. 10B is a side view of a portion of the frame in the unfolded position with the frame partially cut-away to show the spring.
Figure 11A:
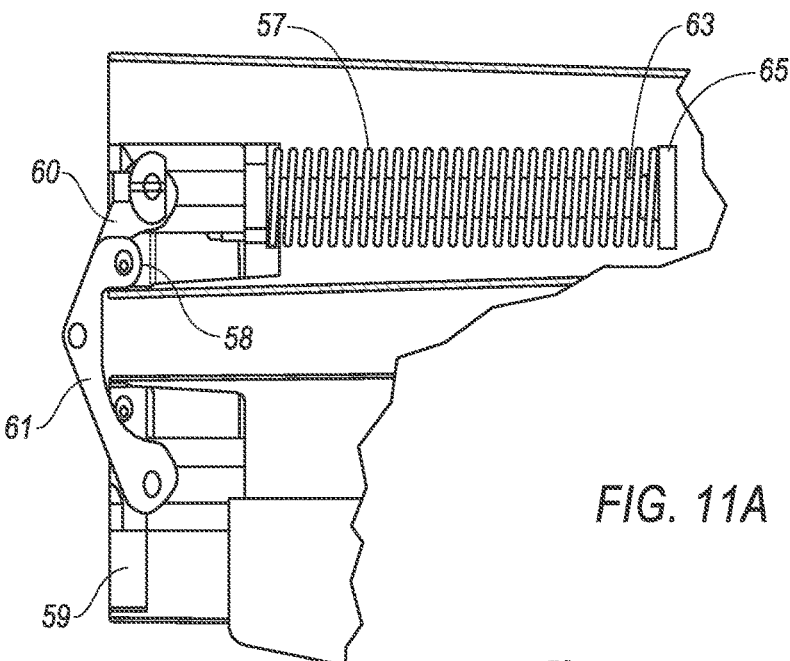
FIG. 11A is a cross-sectional view of a portion of the frame in the folded position with the frame partially cut-away to show the hinge and the spring.
Figure 11B:
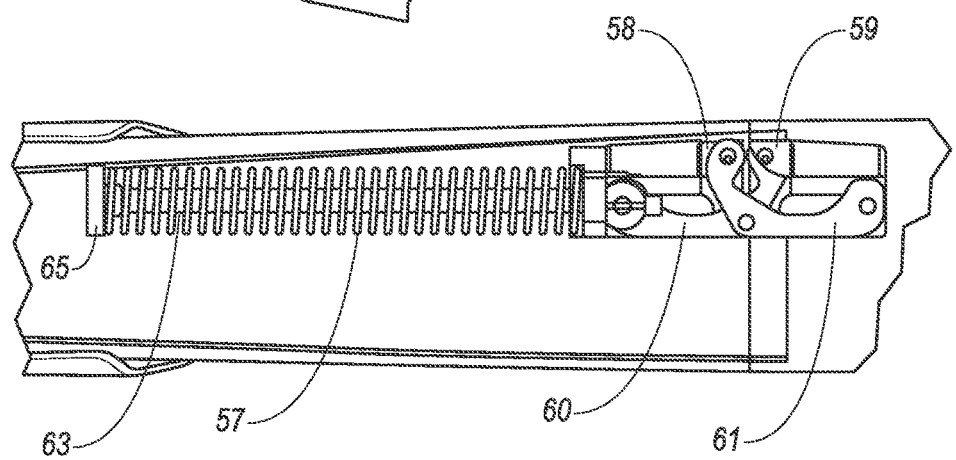
FIG. 11B is a cross-sectional view of a portion of the frame in the unfolded position with the frame partially cut-away to show the hinge and the spring.

As shown in FIG. 7, the unfold-assist system 47 may include the computing device 28. As set forth above, the computing device 28 may include the processor 31 and the memory 29. As shown in block 310 of FIG. 8, the memory 29 may store instructions comprising programming to receive an instruction from an input device to move the first segment 30 and the second segment 32 the frame 14 from a folded position to an unfolded position. The input device may be, for example, a security pass such as a recognized mobile phone, an RFID device, etc., as set forth above. As shown in block 312, the instructions may comprise programming to connect the power source, e.g., the battery 26, to the electromagnet 44 to repel the magnet 42 that is magnetically coupled to the electromagnet 44 when the frame is in the folded position. In other words, the computing device 28 may provide instruction to the electromagnet 44 to open the frame 14 from the folded position to the unfolded position in response by input to the computing device 28. The input to the computing device 28 may be a step taken by the driver, e.g., engaging a mechanical or electronic key, pushing a button, etc., or may be a step automatically taken by the computing device 28 when a security pass is sensed. As shown in block 314, the instructions may comprise programming to receive notification from the sensor 49 that the frame 14 is in the unfolded position.

As shown in block 316, the instructions may include programming to, in response from the instruction from the input device, provide an instruction to connect the power source, e.g., the battery 26, to the electromagnet 70 to repel attract the handlebar assembly 16 into the extended position. As shown in block 318, the instructions may include programming to receive an indication from the mechanical lock 74 that the handlebar assembly 16 is locked in the extended position relative and to provide an instruction to disconnect the power source, e.g., the battery 26, from the electromagnet 70 in response to the indication from the mechanical lock 74.

The instructions may include programming to first power the electromagnet 44 to assist in unfolding the frame 14 from the folded position to the unfolded position, and then to power the electromagnet 70 to assist in locking the handlebar assembly 16 in the extended position. As such, the driver of the bicycle 10 may first unfold the frame 14 and then lock the handlebar assembly 16 to the extended position.

With reference to FIGS. 1-3, the seat assembly 18 may include a seat post 76 engaged with the frame 14, e.g., the rear segment 32, and a saddle 78 connected to the seat post 76. The stem 64 and the seat post 76 are elongated and the frame 14 includes a low profile. This design creates a low step over that allows a driver to easily step over the frame 14 to sit on the electric bicycle 10.

The seat post 76 includes a post 80 and a seat tube 82 coupled to the frame 14 and moveable relative to the frame 14. Specifically, the frame 14 may define a slot 84, i.e., a bore 84, telescopically receiving the seat tube 82 such that the seat tube 82 may selectively slide relative to the frame 14 through the slot 84. The post 80 may be telescopically connected to the seat tube 82 such that the post 80 may be selectively retracted into the seat tube 82. The saddle 78 may be fixed to the seat tube 82.

The slot 84 may extend through the frame 14 from a top of the frame 14 to a bottom of the frame 14. The seat tube 82 may be fixed relative to the frame 14 in the slot 84 in any suitable way. For example, a locking mechanism (not shown) may releasably engage the seat tube 82 in the slot 84 for fixing the seat tube 82 relative to the frame 14. The locking mechanism may be locked and unlocked with a mechanical or electrical button, switch, etc.

The seat tube 82 may define a slot 86 that telescopically receives the post 80. The slot 86 of the seat tube 82 may extend along a common axis as the slot 84 of the frame 14. The post 80 may be fixed to the seat tube 82 in the slot 86 in any suitable way. For example, a locking mechanism (not shown), which may be the same as or different than the locking mechanism that locks the post 80 to the seat tube 82, may releasably interlock the post 80 and the seat tube 82 for fixing post 80 and the seat tube 82 to each other. The locking mechanism may be locked and unlocked with a mechanical or electrical button, switch, etc.

With reference to FIGS. 1-4, the seat post 76 may be moved between an extended position, as shown in FIGS. 1 and 3, and a stowed position, as shown in FIGS. 2 and 4. The seat post 76 may be extended relative to the frame 14 with the seat tube 82 extended upwardly from the frame 14 and the post 80 extended upwardly from the seat tube 82 in the extended position. The seat post 76 may be retracted relative to the frame 14 with the seat tube 82 extended downwardly relative to the frame 14 and the post 80 extended downwardly into the seat tube 82 in the stowed position. Movement of the post 80 and the seat tube 82 between the extended position and the stowed position may be manual, i.e., by the hands of the occupant, and/or may be automated, i.e., motorized.

As shown in FIG. 4, the post 80 may be left extended to operate as a handle for moving the electric bicycle 10. In other words, the seat tube 82 may be moved to the stowed position so that the frame 14 may be folded and the shell 36 may enclose the frame 14. The seat tube 82 may remain in the extended position so that the user, e.g., an occupant, may grip the folded electric bicycle 10 by the extended seat tube 82 and wheel the folded electric bicycle 10. When the user seeks to retract the seat tube 82 to the stowed position, the user may do so to, for example, reduce the space consumption of the electric bicycle 10, e.g., for storage.

As shown in FIG. 2, in the stowed position, the post 80 of the seat post 76 may extend downwardly from the frame 14 to support the frame 14 on the ground. With reference to FIGS. 2 and 4, a caster 88 may be mounted to the seat tube 82 of the seat post 76 for assisting in moving the electric bicycle 10 when the seat post 76 is in the stowed position. Specifically, when the frame 14 is moved to the folded position and the seat post 76 is in the stowed position, the electric bicycle 10 may be rolled on the wheels and caster 88.

The caster 88 may be selectively retracted into the seat tube 82. For example, a gear system (not shown) may be connected between the caster 88 and the hinge 34. The gear system may be configured to extend the caster 88 from the seat tube 82 when the frame 14 is folded and to retract the caster 88 into the seat tube 82 when the frame 14 is unfolded. As such, the extension/retraction of the caster 88 is independent of the movement of the seat post 76 between the extended position and the retracted position.

The battery 26 may be disposed in and supported by the seat post 76. The battery 26 may be, for example, a multiple cell lithium ion battery 26. The battery 26 may have any suitable capacity rating, such as 5-10 Ah.

The portion of the seat post 76 supporting the battery 26 may be removable from the rest of the seat assembly 18. For example, the post 80 of the seat post 76 may support the battery 26 and may be removable from the post 80. The seat tube 82 and the post 80 may have corresponding electrical contacts for connecting the battery 26 to the rest of the electric bicycle 10, e.g., the computing device 28.

By being removable from the rest of the seat assembly 18, the battery 26 may be paired with the computing device 28 to operate as a theft deterrent. When the battery 26 is removed from the rest of the electric bicycle 10, the electric bicycle 10 is not rideable, and, as such, the battery 26 may be removed to act as a theft deterrent.

As set forth further below, the seat tube 82, when removed from the post 80, may be docked with a charging console to recharge the battery 26 remotely from the rest of the electric bicycle 10. The charging console may include an electrical contact in communication with a power source and configured to communicate with the electrical contact of the seat tube 82 for electrically charging the battery 26. As one example, the charging console may be a vehicle charging console 90 integrated into a console of the vehicle 12, as shown in FIG. 26. As another example, the charging console may be an external charging console 91, as shown in FIG. 27, for example, plugged into a wall socket, e.g., a desk charger.

Figure 13:
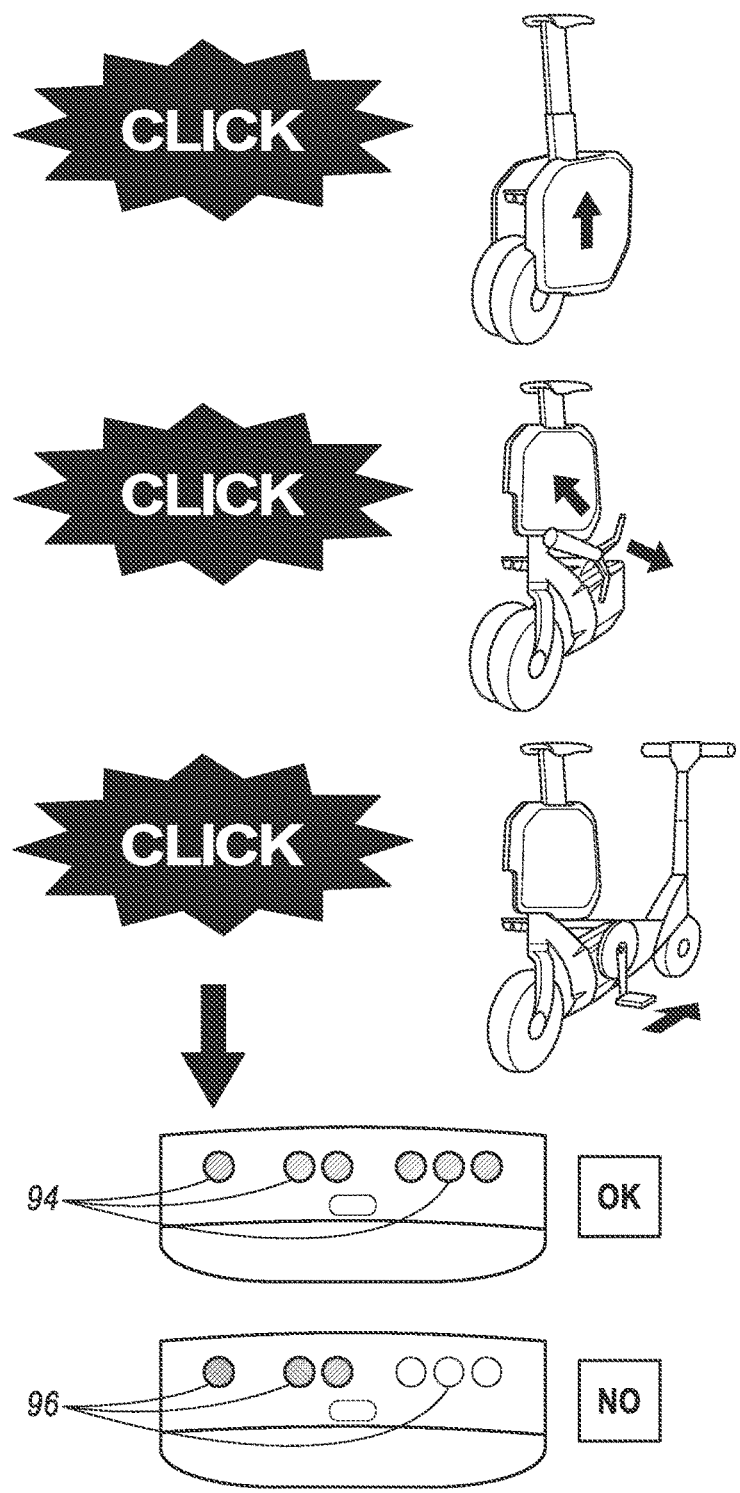
FIG. 13 is a screen shot of an assembly monitoring system.

The electric bicycle 10 may include an assembly monitoring system. For example, the assembly monitoring system includes sensors, e.g., sensor 49, for monitoring the folded/unfolded position of the frame 14, assembly of the stem 64 to the fork 68 of the handlebar assembly 16, the position of the seat assembly 18, and/or the position of the shell 36. The sensors may be proximity sensors to measure position and/or pressure sensors to measuring clamping. For example, as shown in block 320 of FIG. 8, in the unfold-assist system 47, the memory 29 may store instructions comprising programming to provide visual and/or audible confirmation that the frame 14 is unfolded and/or that the mechanical lock 74 locked the handlebar assembly 16 in the extended position With reference to FIG. 13, the assembly monitoring system may include visual and/or audio feedback when the frame 14, handlebar assembly 16, seat assembly 18, and/or shell 36 are properly assembled or not assembled. For example, the assembly monitoring system may include one or more green lights 96 for indicating proper assembly and/or one or more red lights for indicating improper assembly. In addition or in the alternative, the assembly monitoring system may make an audible noise, such as a clicking noise, when one or more components is properly assembled. The assembly monitoring system may include a test button to re-check the proper assembly prior to or during operation of the electric bicycle 10.

With reference to FIG. 9, the front segment 30 and the rear segment 32 of the frame 14 present opposing faces 98 that oppose each other when the frame 14 is in the unfolded position. In the folded position, as shown in FIG. 9, the faces 98 may be parallel to each other. The hinge 34 may be between the faces 98.

Figure 14A:
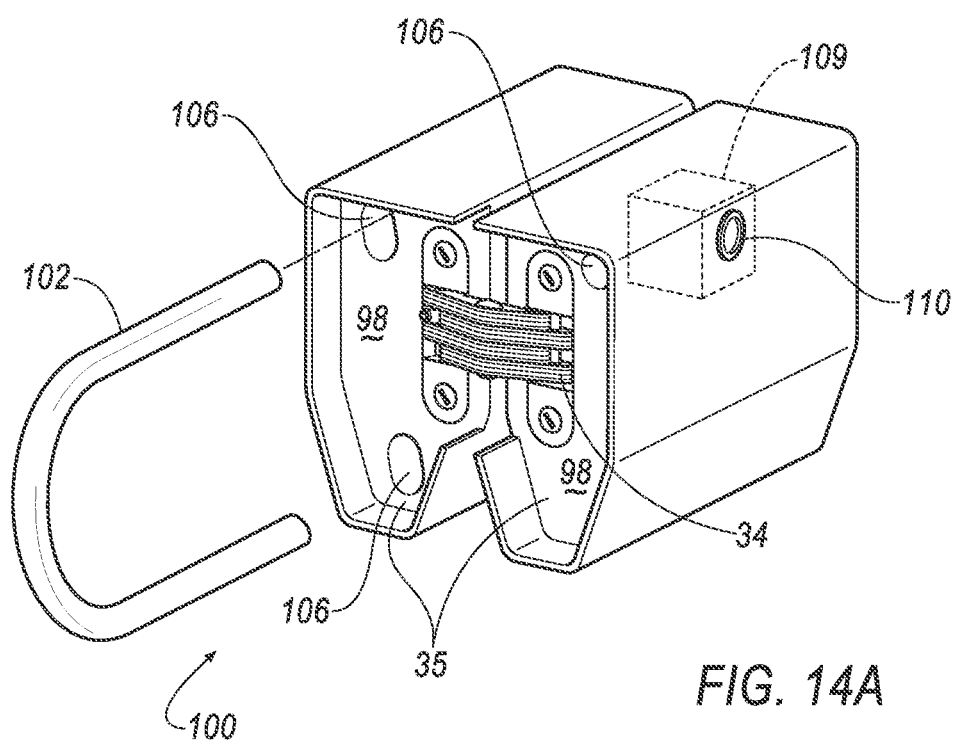
FIG. 14A is a perspective view of a portion of the frame in the folded position and including a locking member.
Figure 14B:
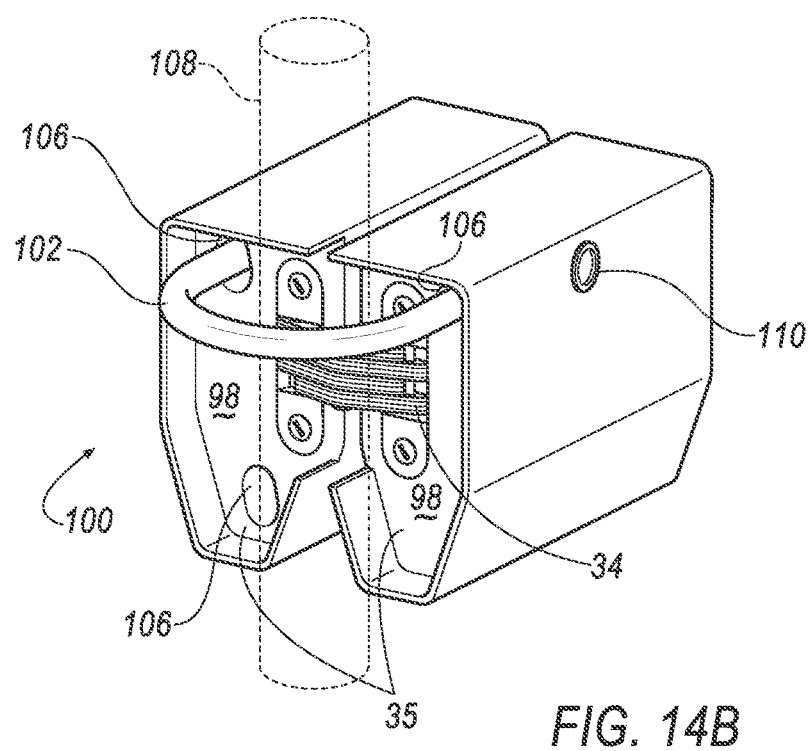
FIG. 14B is a perspective view of FIG. 12A with the locking member engaging the frame.

A locking system 100 may be supported by the faces and may be integrated with the faces 98. With reference to FIGS. 14A and 14B, the locking system 100 may include a locking device extending through at least one of the faces 98. The locking device may be, for example, a locking member 102 releasably engaged with the faces 98. For example, as shown in FIG. 9, the locking member 102 may be U-shaped, i.e., having two parallel ends and a curved portion extending between the parallel portions. The faces 98 may define sockets 106 that receive the parallel ends. The locking member 102 and at least one of the sockets 106 may be configured such that the locking member 102 locks to at least one of the sockets 106. When the parallel ends are received by the sockets 106 on the same face 98, as shown in FIG. 9, the frame 14 may be moved to the unfolded position with the locking member 102 stored in the sockets 106.

The locking member 102 may be disposed between the faces 98 when the first segment 30 and the second segment 32 of the frame 14 are in the unfolded position. The locking member 102 may be stored between the faces 98 and may travel with the bicycle 10 when the bicycle 10 is operated. For example, as shown in FIG. 3, the first segment 30 and the second segment 32 may define a cavity 101 between the faces 98. The locking member 102 is disposed in the cavity 101 when the frame 14 is in the unfolded position.

As shown in FIG. 14A, when the frame 14 is in the folded position, the locking member 102 may be removed from the two sockets 106 on the same face 98 and, as shown in FIG. 14B, inserted into one of the two sockets 106 and into the socket 106 to lock the frame 14 in the folded position to a stationary member 108, such as a bike rack, lamp post, etc. In other words, the locking member 102 traps the stationary member 108 between the locking member 102 and the frame 14.

A lock 109 (schematically shown in FIG. 14A) may releasably lock the locking member 102 in the sockets 106. The lock 109 may be any suitable type and may be disposed in one or both of the sockets 106. The locking member 102 may, for example include a cutout (not shown) that engages the lock 109 in the socket 106. The lock 109 may, for example, include a ratchet system such that the locking member 102 may be locked in the sockets 106 at varying depths to accommodate various stationary members. A release 110, as shown in FIGS. 14A and 14B, may disengage the lock 109 and the locking member 102. The release 110 may, in part, be actuated electronically. The assembly monitoring system, as set forth above, may visually and/or audibly identify when the lock is activated, e.g., when the locking member 102 is properly located in the sockets 106.

Figure 15:
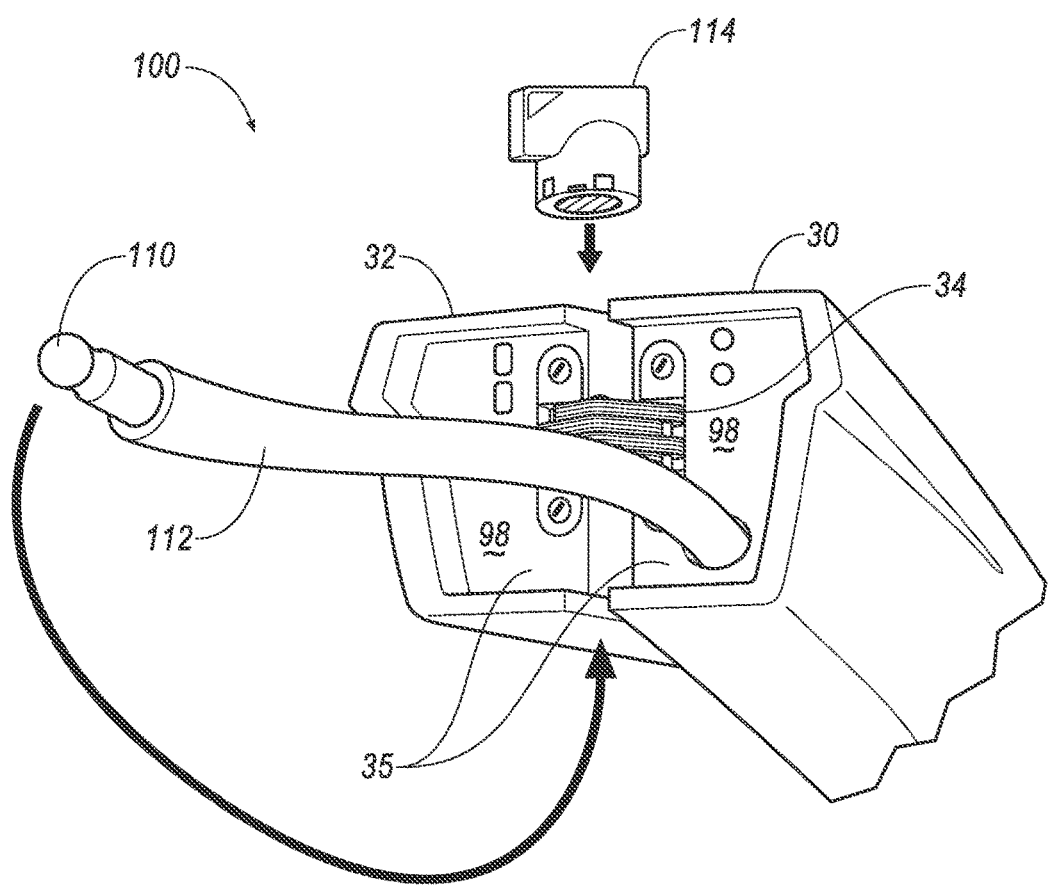
FIG. 15 is a perspective view of a portion of the frame in the folded position and including a flexible cable.

Another embodiment of the locking system 100, as shown in FIG. 15, the locking device is a flexible cable 112 extendable from and retractable into the frame 14 through one of the faces 98. The locking member 102 is fixed to the cable 112 and is releasably lockable to the lock.

Figure 16:
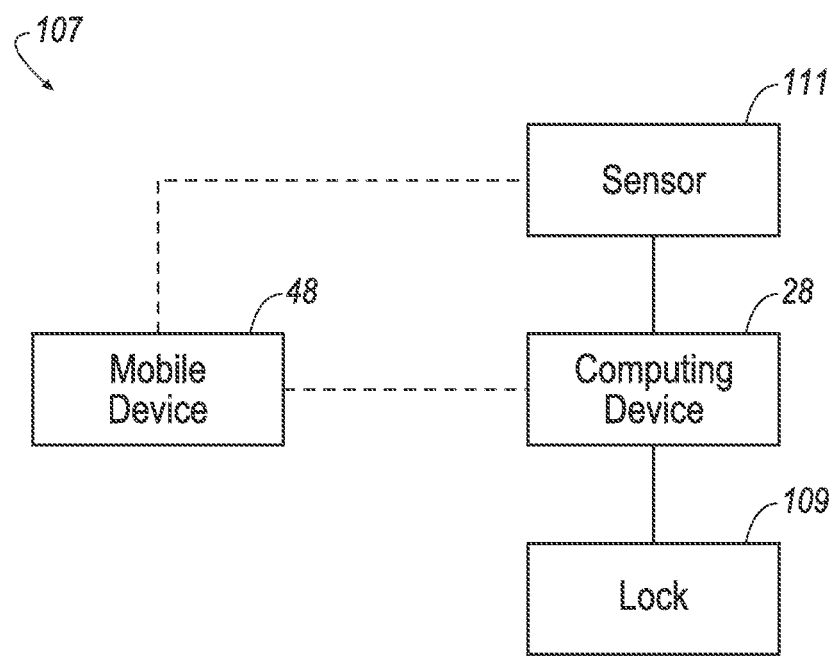
FIG. 16 is a schematic of a keyless lock system.

The lock 109 may be controlled in any suitable fashion. For example, the lock 109 may be actuated mechanically, e.g., with a key, a combination lock, etc. In the alternative or in addition, as shown in FIG. 16, a keyless lock system 107 may actuate the lock 109. The keyless lock system 107 may include a sensor 111, e.g., a proximity sensor that senses an identifier, e.g., a key fob, a mobile device 48 such as a smart cellphone, etc., to automatically unlock the lock 109 when the identifier is within a predetermined range. Similarly, the keyless lock system 107 may automatically lock the lock 109 when the identifier is moved beyond the predetermined distance. With the keyless lock system 107, the lock 109 may still be operable with a key in the event the battery 26 is dead.

As shown in FIG. 16, the keyless lock system 107 may include a controller, e.g., the computing device 28, in communication with the sensor 111 and the lock 109. The identifier, e.g., a mobile device 48, may be in communication with the sensor 111 and/or the computing device 28. For example, as set forth above, the sensor 111 may be configured detect the presence of the identifier, e.g., the mobile device 48, within a predetermined distance from the sensor 111. The sensor 111 is configured to communicate the detection of the identifier, e.g., the mobile device 48, to the computing device 28. The computing device 28 is programmed to unlock the lock 109 when the sensor communicates detection of the identifier, e.g., mobile device 48. Alternatively, for example, the computing device 48 may be programmed to receive instructions directly from the identifier, e.g., the mobile device 48, to unlock the lock 109.

The keyless lock system 107 may include features for sharing the electric bicycle 10. For example, the user may provide to a recipient a code, e.g., supplied in a mobile device code notification and map of the location of the electric bicycle 10. The recipient may, for example, enter the recipient code into a mobile device 48 and the map may be displayed on the mobile device 48. The recipient may then locate the bicycle 10 and using the map and unlock the lock using the code. An application loaded on the mobile device 48 may, for example, communicate the code to the keyless lock system 107 to automatically unlock the lock 109.

The electric bicycle 10 may also include a tampering detection system in communication with the lock 109. The tampering detection system may detect tampering with the lock 109 and send a notification to an occupant's mobile device when tampering is occurring. The tampering detection system may include, for example, an electrical cable through the lock 109, vibrations sensors, etc. For example, an unexpected cut in charging prior to full charge could indicate that the electrical cable has been severed.

Figure 17A:
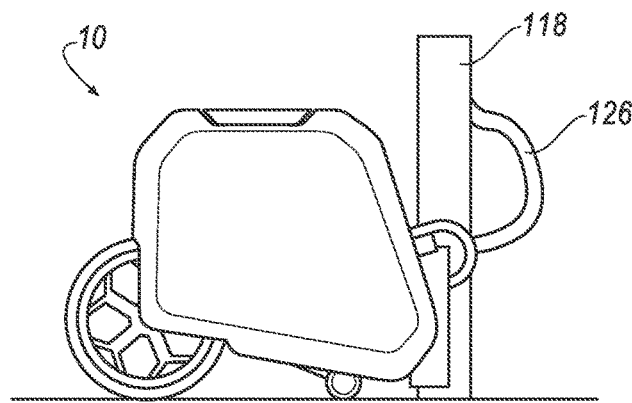
FIG. 17A is a perspective view of the electric bicycle with the frame in the folded position and enclosed by the case, and connected to a charge point through a cable.
Figure 17B:
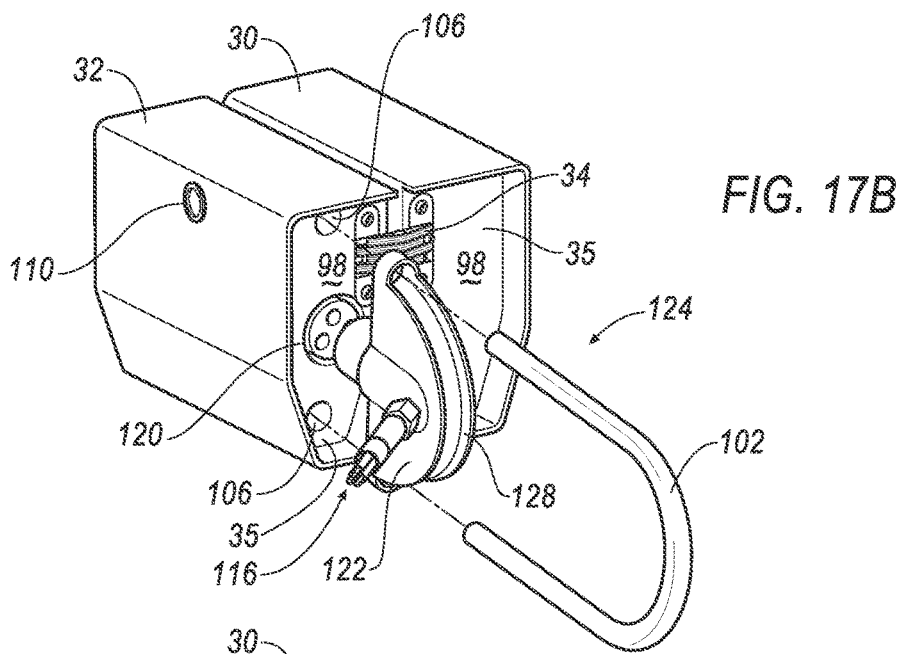
FIG. 17B is a perspective view of a portion of the frame in the folded position and the locking member disengaged with the cable of FIG. 17A.
Figure 17C:
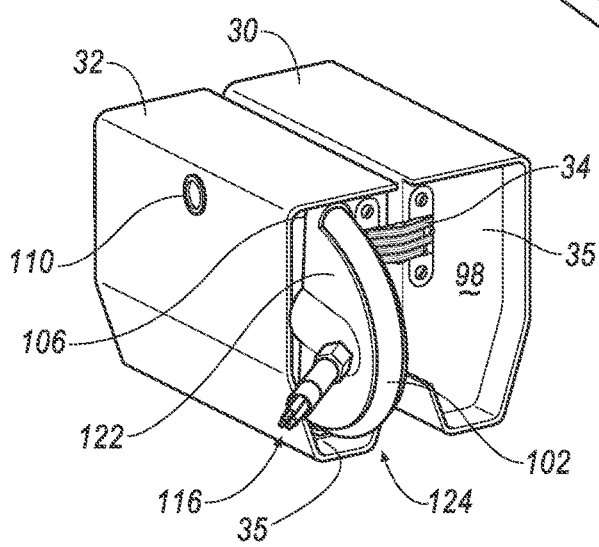
FIG. 17C is a perspective view of a portion of the frame in the folded position with the locking member locking the cable to the frame.
Figure 18A:
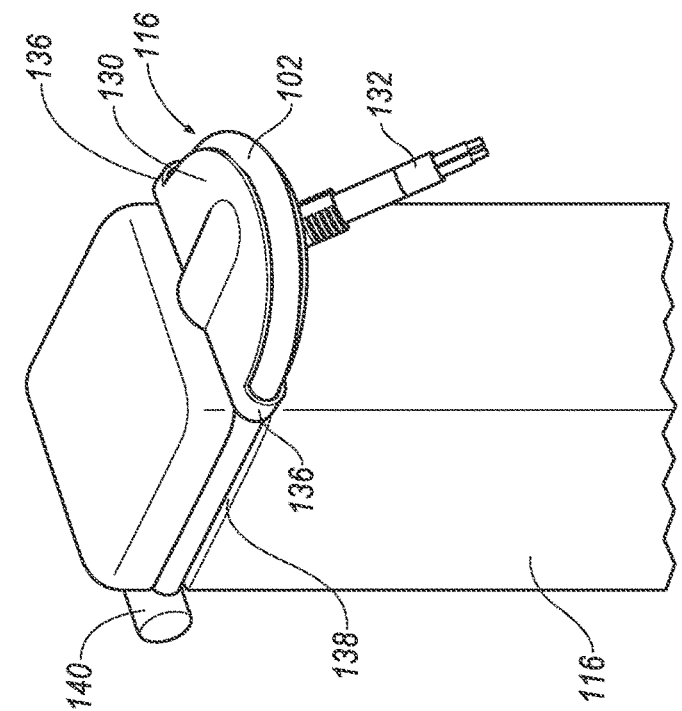
FIG. 18A is a perspective view of a plug of the electric bicycle disengaged from a charging point.
Figure 18B:
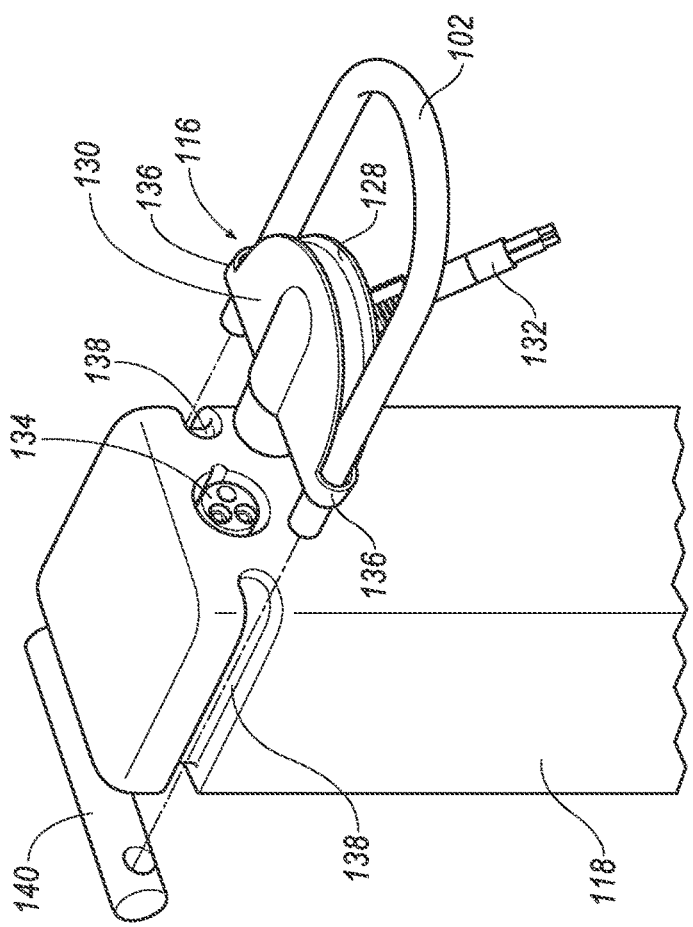
FIG. 18B is a perspective view of the plug of FIG. 15A locked to the charging point.

With reference to FIGS. 17A-18B, the electric bicycle 10 may include a charging system 116 for charging the battery 26 with a power source, such as a publicly available charge point 118. A first embodiment of the charging system is shown in FIGS. 17A-17C and a second embodiment of the charging system is shown in FIGS. 18A-18B.

With reference to FIGS. 17B and 17C, one of the faces 98, e.g., the face 98 on the rear segment 32, may include a charging unit 117 supported by at least one of the faces 98. The charging unit 117 may, for example, include a power socket 120 configured to receive a plug 122 from the charge point 118. The power socket 120 and the plug 122 may be of any suitable configuration. The charging unit 117 is in communication with the battery 26 for charging the battery 26.

The electric bicycle 10 may include a plug lock system 124 for locking the plug 122 to the power socket 124. The plug lock system 124 may operate as a theft deterrent. For example, the plug 122 may be connected to the charge point 118 with a cable 126 that is tamper-resistant, e.g., includes a flexible braided cover. In such a configuration, the tamper resistant cable 126 not only supplies power to the power socket 120 but also operates as a theft deterrent when the plug lock system 124 locks the plug 122 to the frame 14. The plug 122 may be a universal plug that is standardized so that the plug 122 may be available for public use and may be used by any standardized electric bicycle 10. The cable 126 may be retractable into the charging point 118 to reduce slack in the cable 126 when the plug 122 is connected to the power socket 120.

The plug lock system 124 may include the locking member 102 and the locking sockets 106. The locking sockets 106 are disposed on opposite sides of the power socket 120 for receiving the locking member 102. In other words, the power socket 120 is disposed between the locking sockets 106.

The locking member 102 may, for example, be configured to engage the charging plug 122. The plug 122 may define a groove 128 matching the shape and size of the locking member 102 so that the locking member 102 fits within and abuts the groove 128 to lock the plug 122 to the frame 14. The locking member 102 may have a circular cross-section and the groove 128 may have a semi-circular cross-section.

The plug lock system 124 may include a lock (like lock 109 in FIG. 14A) that releasably locks the locking member 102 in the sockets 106. The lock may be any suitable type and may be disposed in one or both of the sockets 106. The locking member 102 may, for example include a cutout that engages the lock in the socket 106. The lock may, for example, include a ratchet system such that the locking member 102 may be locked in the sockets 106 at varying depths to accommodate various sized and shaped plugs. The assembly monitoring system, as set forth above, may visually and/or audibly identify when the lock is activated, e.g., when the locking member 102 is properly located in the sockets 106.

The locking member 102 may be stored in the locking sockets 106 when the power socket 120 is not in use. In this configuration, the frame 14 may be moved to the unfolded position with the locking member 102 in the locking sockets 106. With reference to FIG. 14B, when the frame 14 is in the folded position, the locking member 102 may be removed from the locking sockets 106 so that the plug 122 may be engaged with the power socket 120. Once the plug 122 is engaged with the power socket 120, the locking member 102 may be inserted into the locking sockets 106 and into the groove 128 to lock the plug 122 to the frame 14.

With reference to FIG. 18A, the electric bicycle 10 may include a plug 130 that engages a socket 134 on the charging point 118, and a cord 132 connecting the plug 130 to the frame 14. The cord 132 may extend from one of the faces 98 of the frame 14. The cord 132 may be retractable into the frame 14 through the face 98. The cord 132 may be tamper-resistant, e.g., may include a flexible braided cover.

The locking member 102 may be coupled to the plug 130 for locking to the face 98 and for locking to the charging point 118. The locking member 102 may lock to the locking sockets 106 in the face 98, similar to that of FIGS. 17A-C. In such a configuration, the locking member 102 retains the plug 130 to the face 98 and the frame 14 may be moved to the folded position with the locking member 102 engaged with the face 98.

The plug 130 may include rings 136 that receive the locking member 102 so that the plug 130 and the locking member 102 may be moved as a unit between the frame 14 and the charging point 118. The locking member 102 may slide relative to the plug 130 through the rings 136 to adjust the locking member 102 relative to the plug 130 for proper engagement with the frame 14 and/or the charging point 118.

The charging point 118 may be configured to receive and lock to the locking member 102. For example, the locking member 102 may have a circular cross-section and the charge point 118 may define grooves 138 having a semi-circular cross-section for receiving the locking member 102. The locking member 102 may abut the charge point 118 in the grooves 138. As shown in FIG. 18A, a locking cylinder 140 may lock to the locking member 102 to lock the charge point 118 between the locking cylinder 140 and the locking member 102. The locking cylinder 140 may be stored in any suitable location on the electric bicycle 10 when not in use, e.g., between the faces 98.

The drivetrain 24 includes a crank 56 and a motor 142 both coupled to a rear wheel 22 for propelling the rear wheel 22. The crank 56 and the motor 142 may be coupled to the rear wheel 22 in any suitable fashion. For example, as shown in the FIGS. 19-21, a belt drive 144 couples the crank 56 and the motor 142 to the rear wheel 22. The crank 56 may be manually rotated by a driver, e.g., with the use of the feet of the driver. The motor 142 may be supported about the crank 56 near the midsection of the frame 14. This configuration balances the weight of the electric bicycle 10. The belt drive 144 and the motor 142 may be encased behind a cover.

The belt drive 144 may be of the type referred to in industry as the "Gates belt drive." The belt drive 144 includes a gear 148, i.e., a chain ring, coupled to the crank 56 and to the motor 142 and includes a gear 150 coupled to the rear wheel 22. The gear 148 is a driving gear and the gear 150 is a driven gear. The crank 56 is rotatably connected to the frame 14 with bearings 152. The gear 148 is rotatably connected to the frame 14 with bearings 152.

A belt 154 is engaged with and rides on the gears 148, 150 and transfers rotation from the gear 148 to the gear 150. The belt drive 144 may be a single speed, i.e., fixed gear drive. Alternatively, the gear coupled to the rear wheel 22 may be a fixed epicyclic gear assembly. The fixed epicyclic gear assembly may include gearing, a hub, and a freewheel between the gearing and the hub. Such a configuration may be a 3-5 speed gear assembly.

The crank 56 is coupled to the gear with a free wheel connection 156, i.e., a freewheel 156. The free wheel connection 156 is configured to transfer movement from the crank 56 to the gear 148 when the crank 56 is rotated forwardly faster than the forward rotation of the gear 148 and is configured to freely rotate relative to the crank 56 when the gear 148 rotates forwardly faster than the crank 56. This allows for independent forward movement of the crank 56 and the gear 148, e.g., for selective input from the crank 56 and/or the motor 142. The free wheel connection 156 may be referred to as an overrunning clutch. As known to one skilled in the art, the free wheel connection 156 may, for example, include an outer hub and a spindle. The outer hub may have an internal saw-tooth pattern, and the spindle may include a ratchet or spring-loaded member that allows the outer hub to rotate in one direction relative to the spindle and lock relative to the spindle when rotated in the opposite direction.

The free wheel connection 156 is supported by the crank 56 and/or the gear 148 between the crank 56 and the gear. A bearing 153 is disposed between the gear 148 and a housing 155 that supports the crank 56. The housing 155 may be fixed relative to the frame 14.

Figure 19:
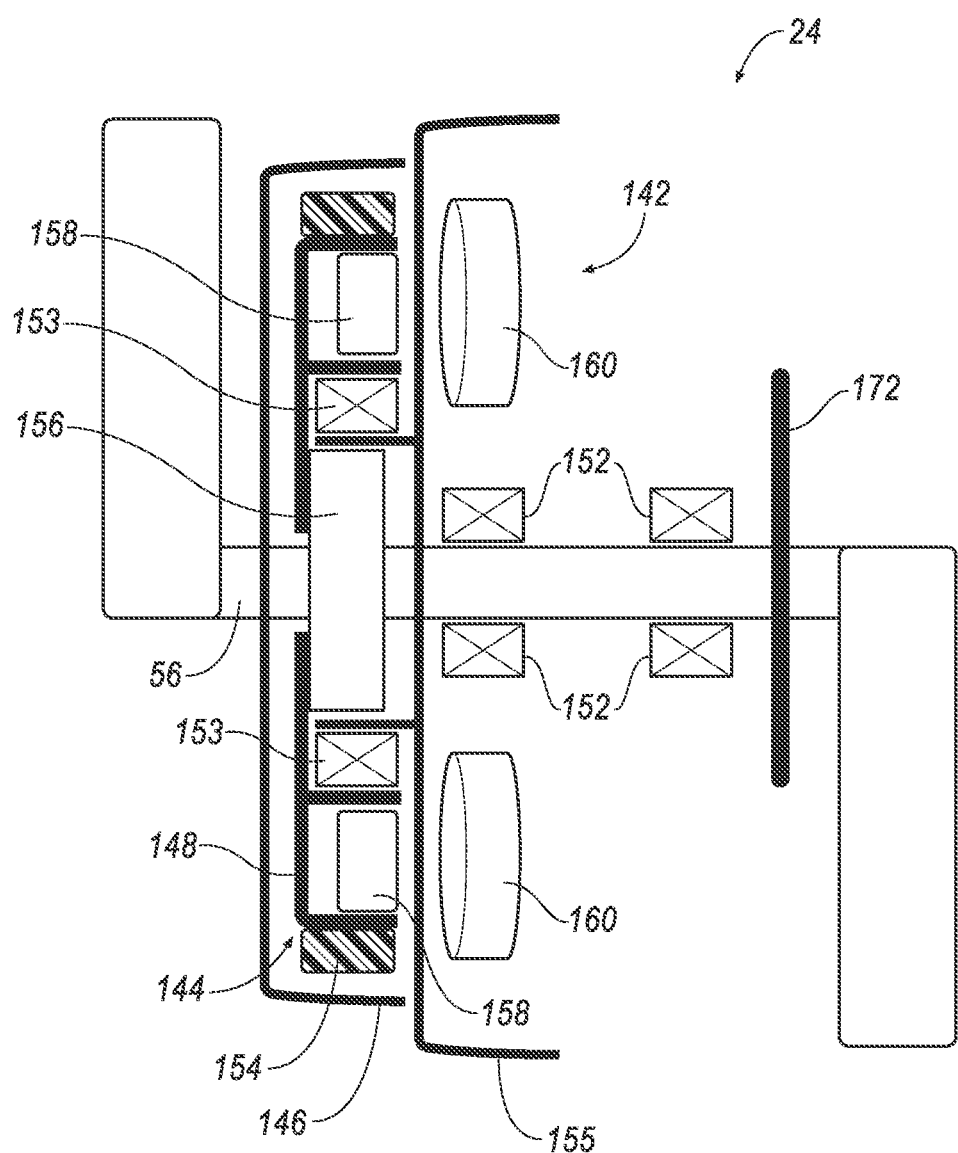
FIG. 19 is a schematic view of a drive train of the electric bicycle.
Figure 20:
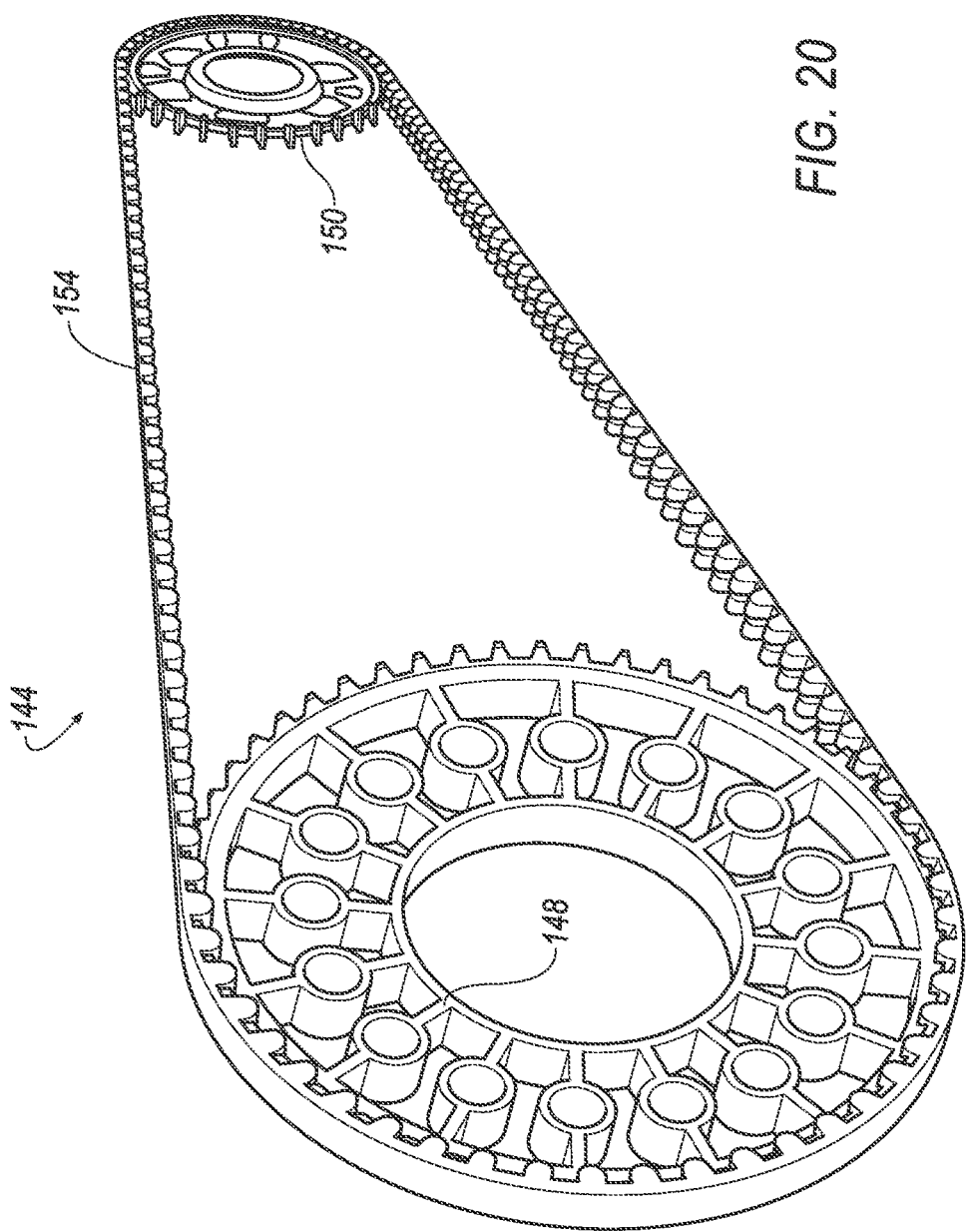
FIG. 20 is a perspective view of a portion of the drive train.
Figure 21:
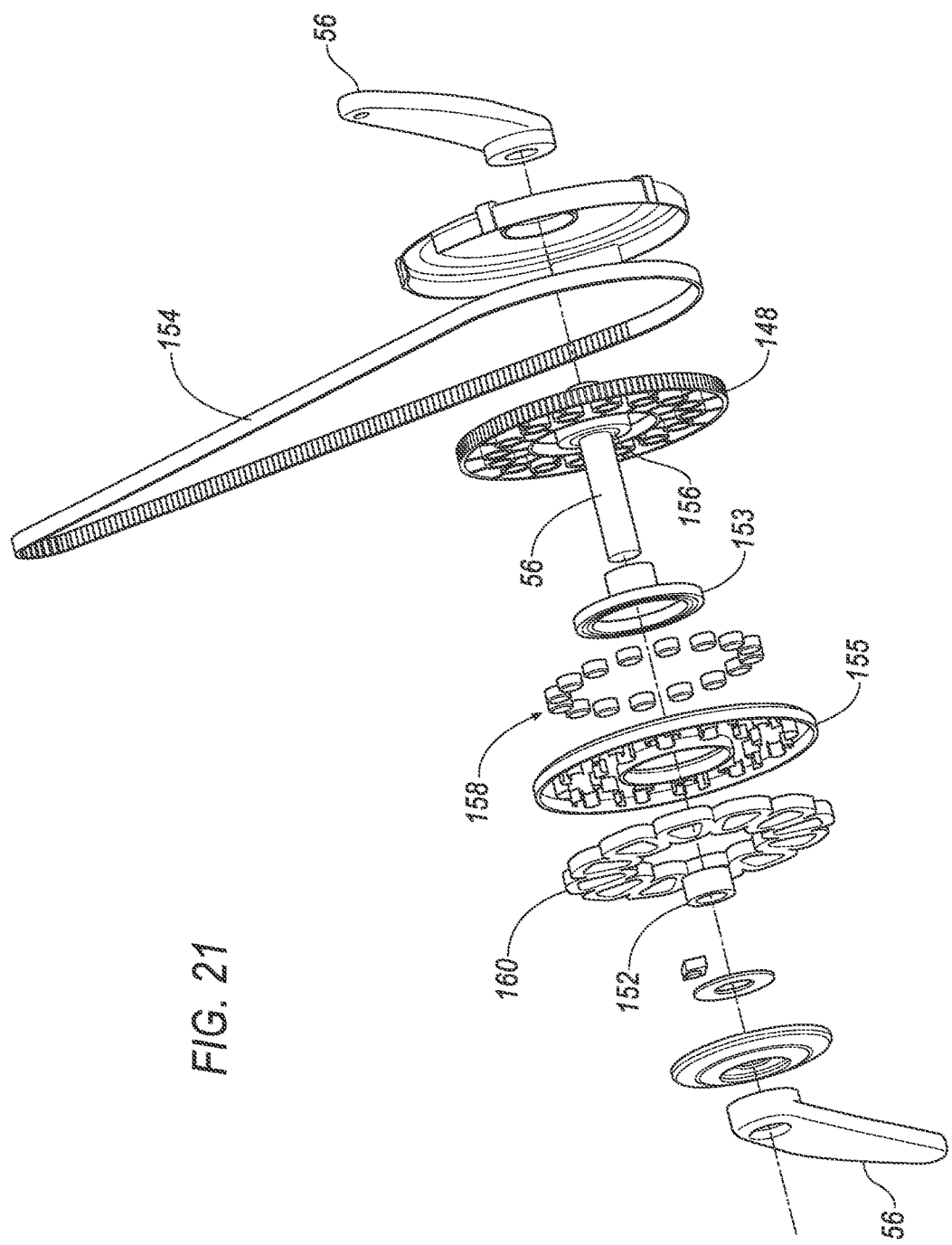
FIG. 21 is an exploded view of the drive train.

With reference to FIGS. 19 and 21, the motor 142 may be an electric motor. For example, the motor 142 may be an axial flux motor. The motor 142 may include magnets 158 supported circumferentially about the gear 148 and phased coils 160 supported in a circumferential pattern on the frame 14. Specifically, the magnets 158 may be fixed to gear 148 and the phased coils 160 may be fixed to the frame 14. The coils 160 generate magnetic fields to drive the magnets 158 to rotate the gear 148. The speed of rotation of the gear 148 may be controlled by an input device, for example a mechanical input supported on the handlebar 66, such as a lever, button, knob, etc. The input device may, alternatively, be the mobile device 48, e.g., through a program or application on the mobile device 48 accessible with a user interface of the mobile device 48, e.g., a touch screen. The input device may be coupled to the computing device 28, which may be coupled to the motor 142 to control the motor 142.

The free wheel connection 156 is disposed between the crank 56 and the gear 148. As shown in FIGS. 19 and 21, at least a portion of the motor is concentric about the free wheel connection 156. For example, the magnets 158 may be spaced from each other concentrically about the free wheel connection 156.

As shown in FIG. 19, the gear 148 may be concentric about at least a portion of the housing 155. The bearing 153 may be disposed between the gear 148 and the housing 155.

The crank 56 and the motor 142 may be used independently or simultaneously. For example, the crank 56 may be used independently to propel the electric bicycle 10 by pedaling the crank 56 in a forward rotational direction without input from the motor 142. In such a use, the crank 56 engages the free wheel connection 156 to drive the gear 148. The motor 142 may be used independently to propel the electric bicycle 10 by rotating the gear 148 in a forward rotational direction with the use of the magnets 158 and coils 160 without input from the crank 56.

The crank 56 and the motor 142 may be used simultaneously with the use of the free wheel connection 156 between the crank 56 and the gear 148. For example, the motor 142 may rotate the gear 148 at a selected speed. During this rotation by the motor 142, if the crank 56 forwardly rotates the free wheel connection 156 slower than the motor 142 forwardly rotates the gear 148, then the motor 142 drives the gear 148 and the free wheel connection 156 allows the gear 148 to rotate forwardly relative to the crank 56. Alternatively, if the crank 56 forwardly rotates the free wheel connection 156 faster than the motor 142 forwardly rotates the gear 148, then the free wheel connection 156 engages the gear 148 and forward rotation from the crank 56 is transmitted to the gear 148. As such, the motor 142 may maintain the rotation of the gear 148 at a minimum speed, i.e., does not allow the gear 148 to rotate below the minimum speed, and the crank 56 may be selectively rotated forwardly faster than the motor 142 to rotate the gear 148 beyond the minimum speed.

The motor 142 may be used to generate electricity when the gear 148 is rotated by the crank 56 and/or during braking of the electric bicycle 10. In other words, as crank 56 rotates the gear 148 forwardly, the magnets 158 move relative to the phased coils 160 and the motor 142 acts as an alternator. The motor 142 may provide electricity to the battery 26 to charge the battery 26 and/or may be connected to other energy storage devices.

Since the gear 150 is fixed to the rear wheel 22, the belt 154 is coupled to the gear 148, and the gear 148 rides on the free wheel connection 156, the gear 148 rotates with the rear wheel 22 via the belt 154. In other words, the gear 148 rotates at all times that the rear wheel 22 rotates. Accordingly, the motor 142 may be operated as an alternator, as set forth above, at any time that the rear wheel 22 rotates. The belt 154 and motor 142 may be developed to provide regenerative braking to the rear wheel 22.

The operation of the motor 142 as an alternator reduces the rotational speed of the gear 148. As such, the motor 142 may be operated as an alternator to, at least in part, brake the electric bicycle 10. The motor 142 may be operated as an alternator, for example, in a workout mode, in which the motor 142 may provide resistance to the crank 56 by operation of the magnets/coils 160. As the driver pedals the crank 56 to overcome the resistance, the driver is rotating the magnets 158 relative to the coils 160 to operate the motor 142 as an alternator.

For kinetic energy recovery, the direct link between the motor 142 and the rear wheel 22 ensures that energy flow can be fully reversed. The free wheel connection 156 at the crank 56 ensures that the rider may coast while the motor 142 is turned by the kinetic energy of the rider and the electric bicycle 10.

As soon as power to the motor 142 is interrupted and/or the occupant stops pedaling, the motor 142 may switch to regeneration mode. This means the electric bicycle 10 slows much faster than if coasting. It is effectively electronically braking and a rear brake light 143 (shown in FIG. 3) is automatically switched on. As the same regeneration effect happens when the occupant applies the brakes (stops pedaling, motor 142 power is cut, regeneration mode kicks in) there is no need for a separate brake contact switch.

The bicycle 10 may include a controller in communication with the motor 142 and the brake light 143. The controller may be configured to illuminate the brake light 143 when the gear 150 drives the belt 154, i.e., when the bicycle 10 coasts. For example, with reference to FIG. 28, the rear brake light 143 may be in communication with the computing device 28 of the bicycle 10. The computing device 28 may be programmed to illuminate the brake light 143 when the gear 150 drives the belt 154. In other words, for example, in the event the driver stops pedaling and the bicycle 10 coasts, the gear 150 drives the belt 154 and motor 142 generates energy for charging the battery 26, in such events, the computing device 28 may detect that the gear 150 is driving the belt 154 and, in response, provides an instruction to illuminate the brake light 143.

Figure 23:
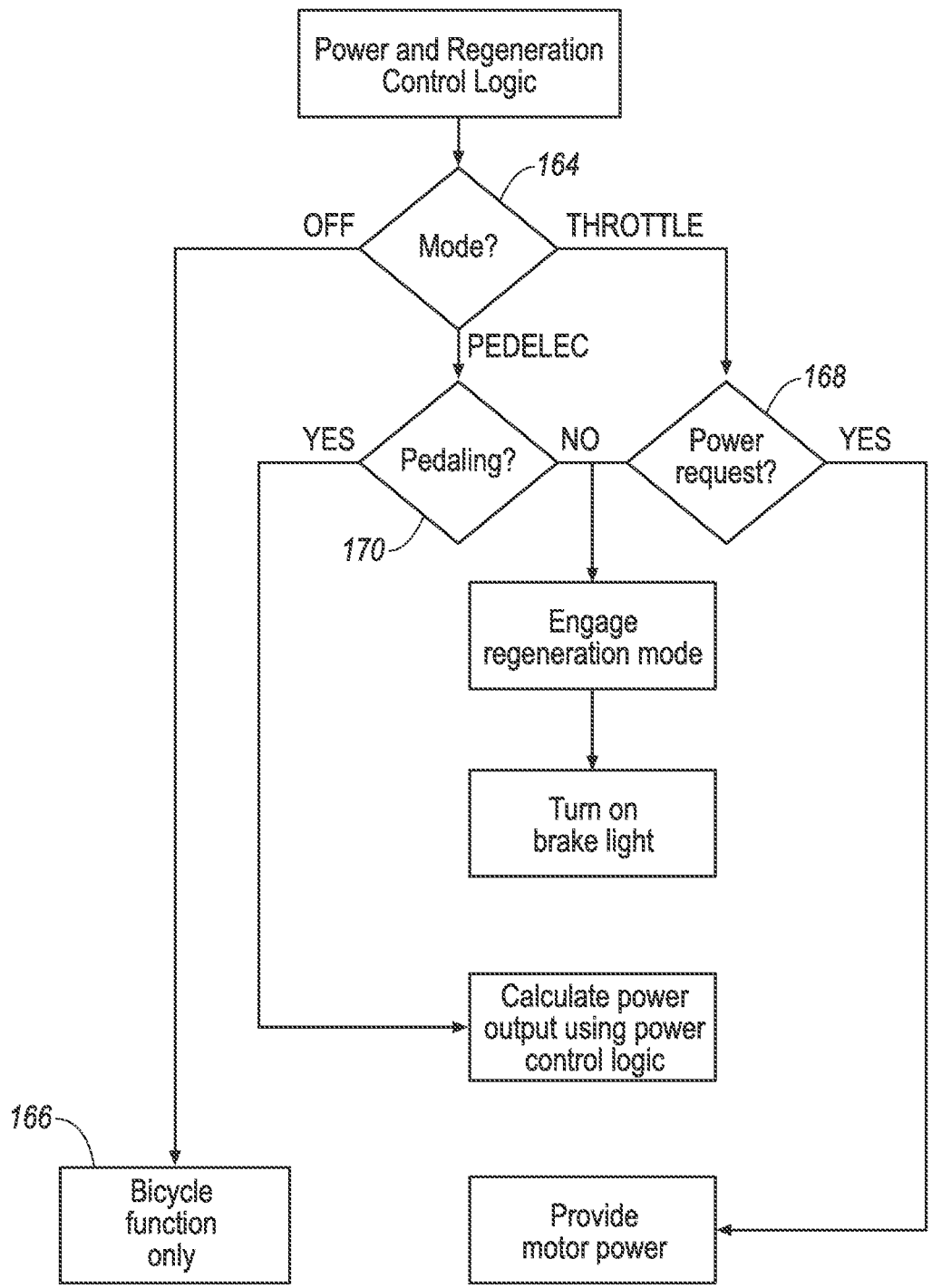
FIG. 23 is a block diagram of power and regeneration control logic.

With reference to FIG. 23, the computing device 28 may be programmed with a power regeneration control logic. As shown at block 164, the power regeneration control logic may have three modes. Specifically, the power regeneration control logic may be turned off, may be operated in a throttle mode, or may be operated in a pedal-assist mode. The pedal-assist mode may be referred to as pedelec or power-assist mode. The purpose of the pedal assist mode, for example, may be to comply with rules such as European Union directive 2002/24/EC and/or EN15194 for road-legal use of electric bicycles.

When the power regeneration control logic is turned off, the electric bicycle 10 may be propelled by manual input with the crank 56 and is not powered with the motor 142, as shown in block 166. In the throttle mode, the electric bicycle 10 may be propelled by the motor 142 and controlled independently of the manual input from the crank 56. As shown at block 168, when power is requested, i.e., with the input operated by the driver, the power regeneration control logic provides power to the motor 142. For example, the input may be variably operated to vary the power to the motor 142. As shown at block 168, if power is not requested, the power regeneration control logic operates in a regeneration mode. In the regeneration mode, the rear wheel 22 of the electric bicycle 10 slows and a brake light is activated.

When the power regeneration control logic is turned to pedal-assist mode, the electric bicycle 10 may be propelled by both the motor 142 and by manual input from the crank 56. As shown at block 170, only if the driver pedals the crank 56, can the electric bicycle 10 be propelled with the assistance of the motor 142 to complement the power delivered manually by the driver. The exact amount of power assistance is calculated by the computing device 28. When in the pedal-assist mode, when the crank 56 is not pedaled, the power regeneration control logic operates in a regeneration mode. In the regeneration mode, the rear wheel 22 of the electric bicycle 10 slows and the brake light is activated.

The motor 142 may be operated to smooth the delivery of power to the rear wheel 22. In other words, some drivers of the electric bicycle 10 may pedal the crank 56 harder/lighter at certain rotational angles based, for example, on the physical dynamics of the driver. For example, some drivers may provide a "deadspot" in power to the crank 56 as the rider's legs go over the top dead center of the crank 56 and provide a greater power at the downstroke.

Figure 22:
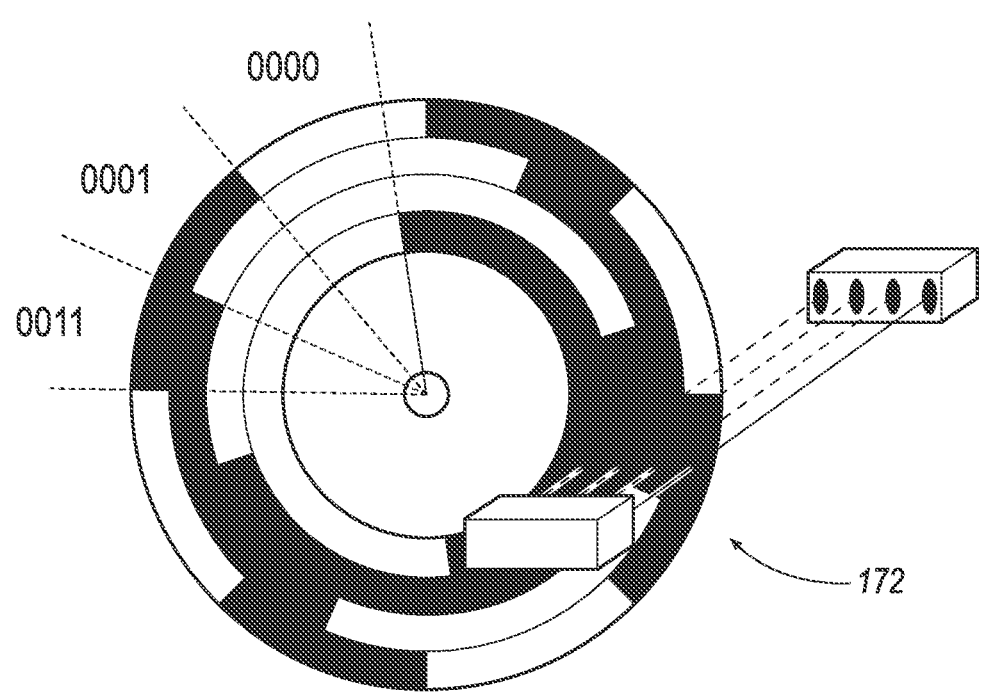
FIG. 22 is a schematic view of an encoder of the drive train.

As shown in FIGS. 19, 21, and 22, an encoder 172 may be fixed to the crank 56 to identify "deadspots" in the rotation of the crank 56. This identification of the "deadspots" may be used to operate the motor 142 in the "dead-spots" to smooth the travel of the electric bicycle 10.

Figure 24:
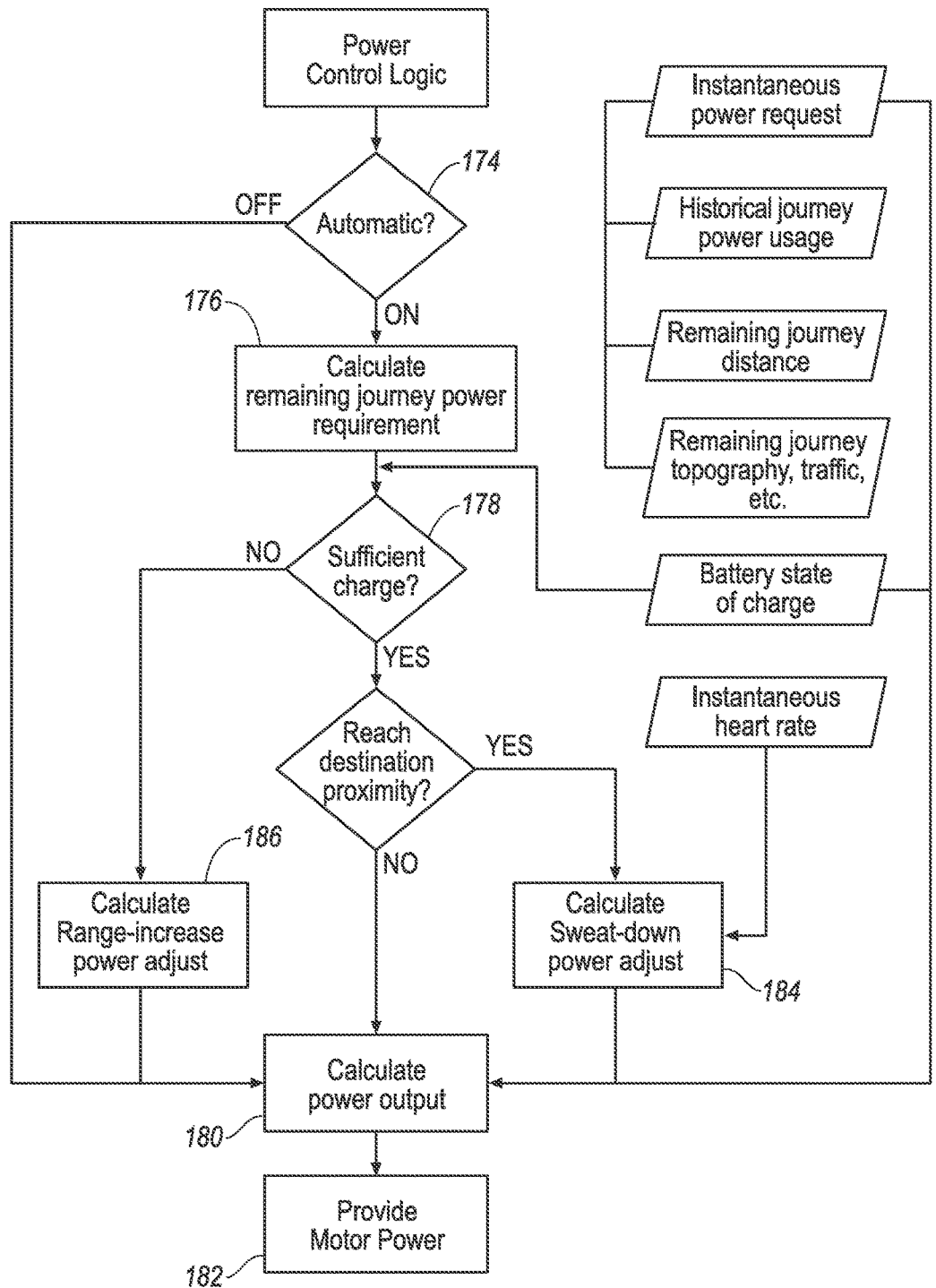
FIG. 24 is a block diagram of power control logic.
Figure 25:
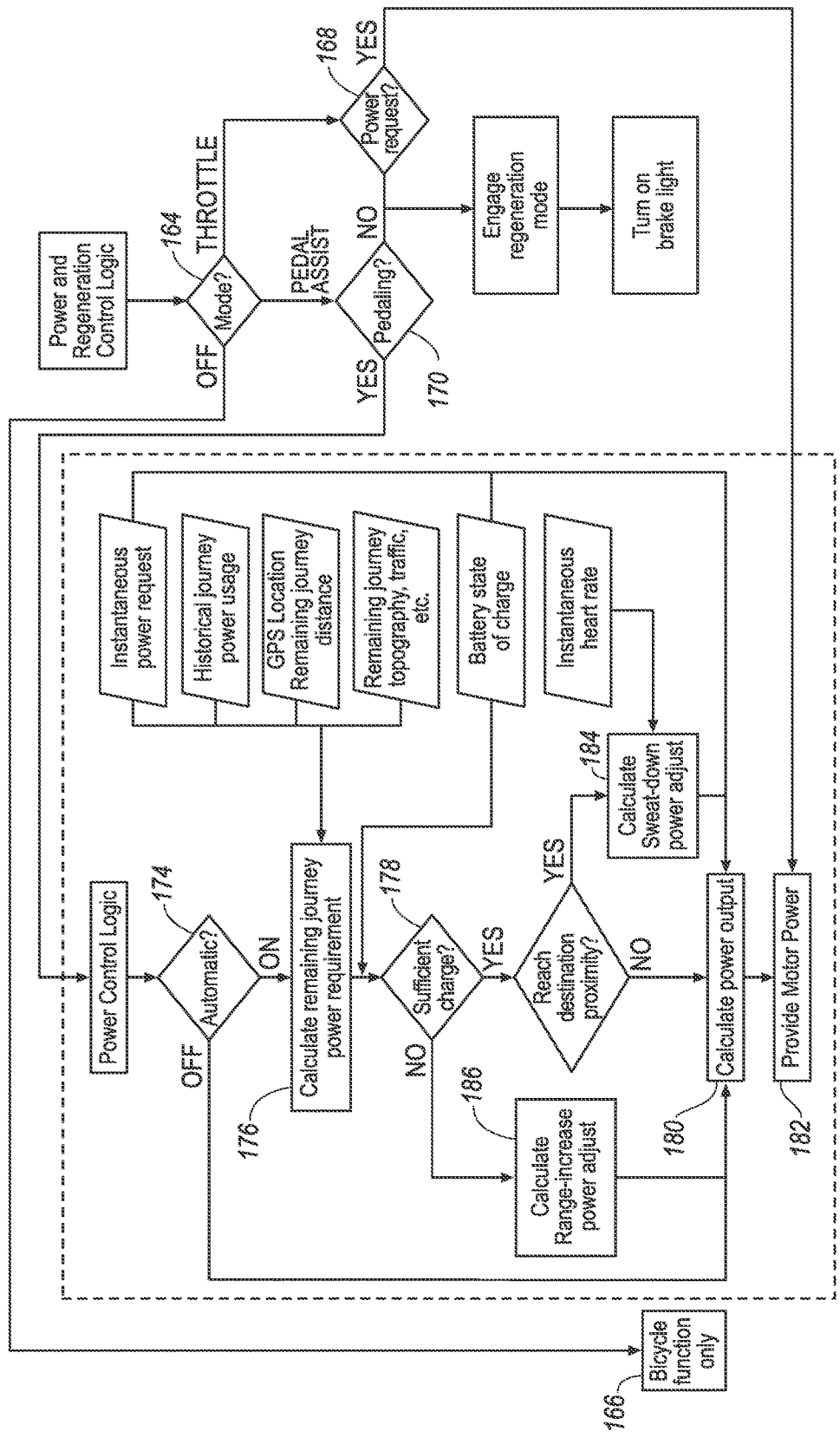
FIG. 25 is a block diagram of the power and regeneration control logic incorporating the power control logic.

With reference to FIGS. 24 and 25, a controller, e.g., the computing device 28, may be programmed with power control logic. The memory 29 of the computing device 28 may store instructions comprising programming to execute the power control logic, as set forth further below. The power control logic is shown in isolation in FIG. 24 and power control logic is shown incorporated into the power and regeneration control logic in FIG. 25. In other words, as shown in FIG. 25, if the power and regeneration control logic is in the pedal-assist mode, as shown in block 164, and the crank 56 is pedaled, then the power control logic is operated.

The power control logic may manage battery 26 life and may communicate the state of charge of the battery 26 on a user interface 218 of the vehicle and/or a mobile device 48 such as a cell phone, navigational unit, etc. Since cell voltage may drop under load (acceleration) and may recover when the load is removed, the actual state of the charge may be approximated with the use of an algorithm.

The power control logic may be based on instantaneous and/or continuous heart rate data of the driver. The computing device 28 of the bicycle 10, may be configured to receive the heart rate data. The memory 29 of the computing device 28, for example, may store instructions including programming to receive the heart rate of the driver. With reference to FIG. 28, a heart rate monitor 145, for example, may be in communication with the computing device 28 and may be configured to communicate to the computing device 28 a heart rate signal representing a heart rate of the driver to the controller, e.g., the computing device 28. The heart rate monitor 145 may, for example, include contact patches that measure the pulse of the driver. For example, the contact patches may be disposed on the handlebar 66 to measure the pulse of the driver when the driver grips the handlebar 66. Alternatively, or in addition, the heart rate monitor may be of any suitable form, e.g., a wristwatch, a chest strap, etc.

The heart rate monitor 145 may be used to allow for a "last-mile cool-down" when used with location data, such as GPS data. Specifically, the electric bicycle 10 may be programmed to provide increased assistance during the final stretch of the journey. This may help ensure that the driver does not arrive at the destination in a sub-optimal hygienic condition, e.g., sweaty.

The power control logic may be based on planned and/or continuous journey data. The journey distance may be communicated from a mobile device 48, such as a cell phone, navigational unit, etc., or when the electric bicycle 10 is docked to a mobile device 48 or vehicle 12. The power control logic may use journey data such as altitude, topography, road condition, lights, traffic, etc., to improve energy usage predictions. The power control logic may receive live updates during the journey. The electric bicycle 10 may be connected to the mobile device 48 in any suitable fashion such as USB, wireless (Bluetooth, NFC, etc.), etc.

The power control logic may use a global positioning system (GPS) module to provide maximum available assistance during the final stretch, e.g., the final planned mile, of the route. The memory 29 may store instructions including programming to receive a destination distance of the bicycle relative to a predetermined position, i.e., the distance between the bicycle 10 and the predetermined destination. The controller, e.g., the computing device 28, may be programmed to receive the destination distance of the bicycle 10 relative to the predetermined destination. For example, a location device may be configured to communicate to the controller the destination distance of the electric bicycle 10 relative to the predetermined destination. The location device may, for example, be the mobile device 48. The mobile device 48 may, for example, include a GPS receiver and may transmit GPS information to the computing device 28.

The computing device 28 may modify the power output of the battery 26 based on the destination distance to provide sufficient state of charge to reach the destination. The memory 29 may store instructions including programming to provide instructions to adjust power to the motor 142 based at least on the heart rate signal and the destination distance. The computing device 28, may be programmed to provide instruction, e.g., instruction directly to the motor 142, to adjust power to the motor 142 based at least on the heart rate signal and the destination distance. For example, the computing device 28 may be programmed to provide instruction to increase power to the motor 142 as the bicycle 10 nears the predetermined destination, e.g., when the destination distance is within a predetermined range, and the heart rate signal is above a predetermined level, the computing device 28. Values for the predetermined range and the predetermined level of the heart rate signal may be stored in the memory 29 of the computing device 28.

The computing device 28 may be programmed to provide instruction to adjust power to the motor 142 based on a charge level of the battery 26, in addition to the heart rate signal and the destination distance. The memory 29 may store instructions including programming to increase power to the motor 142 based at least on the heart rate signal and the destination distance. In other words, the computing device 28 may be programmed to provide instruction to increase power to the motor 142 when the destination distance is within the predetermined range, the heart rate signal is above the predetermined level, and the charge level of the battery 26 is above a predetermined level.

The power control logic matches motor 142 output to input settings, which may be a throttle mode or a pedal-assist mode. The input setting may be measured with a torque/position sensor. The power control logic measures the state of charge of the battery 26 and protects the battery 26 against over-charge, under-charge, excessive charge rates, and excessive discharge rates.

The user interface 218 and/or mobile device 48 may present the driver with options to engage the automatic power control logic setting or not (block 174 of FIG. 24). If the driver chooses not to use the automatic power control logic setting, then the power control logic fulfils a function of providing power to the motor 142 as per power request and available battery 26 power within pre-programmed parameters.

If the driver chooses to use the automatic power control logic setting, then the power control logic queries inputs to calculate the remaining journey power requirement. The power control logic then compares this power requirement to the actual power remaining in the battery 26. If there is insufficient charge in the battery 26 to reach the destination, the power control logic engages a program subroutine to reduce the power to the motor 142 appropriately to ensure an equal amount of power is distributed over the remaining journey, instead of running out of power before reaching the destination. If topographical data is available, then the control logic may conserve energy to accommodate for elevation changes in the final leg of the journey.

If, towards the end of the journey, the state of the battery 26 exceeds the predetermined level, e.g., the charge required to provide the energy for the remaining journey at power assistance supplied, i.e., discharge rate, then the power control logic may engage another subroutine that increases the power assist by the motor 142 towards the end of the journey to allow the driver's heart rate to drop and reach the destination with minimal breathlessness and sweatiness, e.g., ready for work in an office. The controller routine can also be set to force conservation of energy (reduce assistance) earlier in the journey if required in order to ensure the power increase can be available towards the end.

The computing device 28 may be programmed to progressively increase power to the motor 142 as the destination distance decreases. For example, the memory 29 may store instructions including programming to progressively increase power to the motor 142 as the destination distance decreases. This assists the driver in reaching the destination with minimal breathlessness and sweatiness. The computing device 28 may be programmed to, e.g. the memory 29 may store instructions including programming to, determine the amount of power increase and the rapidity of the progression of the power increase based at least on the destination distance, topography, traffic conditions, traffic light patterns, etc., as set forth further below.

The computing device 28 may be programmed to, e.g., the memory 29 may store instructions including programming to, determine a maximum cool down distance based at least on the charge level of the battery 26. The computing device 28 may provide instruction to increase power to the motor 142 when the destination distance is less than the maximum cool down distance, i.e., the motor 142 provides additional pedaling assistance to the driver when the bicycle 10 is in the occupant selected cool down distance. This helps ensure that the battery 26 has sufficient charge to reach the predetermined destination while reducing the heart rate of the driver.

The computing device 28 may be programmed to, e.g., the memory 29 may store instructions including programming to, calculate the maximum cool down distance based on several factors that may reduce the charge of the battery. For example, the computing device 28 may be programmed to determine the maximum cool down distance based at least on topography between the bicycle 10 and the predetermined destination, traffic conditions between the bicycle 10 and the predetermined destination, traffic light patterns between the bicycle 10 and the predetermined destination, etc. The mobile device 48, for example, may provide the topography, traffic conditions, traffic light patterns, etc., to the computing device 28. The computing device 28 may be programmed to receive at least one of topography, traffic conditions, and traffic light patterns communicated to the computing device 28 from the mobile device 48, e.g., a mobile phone. The mobile device 48 may have a program or application that accesses databases that include information such as topography, traffic conditions, traffic light patterns, etc., and may provide information to the computing device 28 based on the location of the bicycle 10 and a route to the predetermined destination.

The computing device 28 may be programmed to, e.g., the memory 29 may store instructions including programming to, receive an occupant selected cool down distance and to provide instruction to increase power to the motor 142 when the destination distance is less than the occupant selected cool down distance, i.e., the motor 142 provides additional pedaling assistance to the driver when the bicycle 10 is in the occupant selected cool down distance. The driver may, for example, input the occupant selected cool down distance into the mobile device 48 and the mobile device may communicate the occupant selected cool down distance to the computing device 28. The computing device 28 may be programmed to compare the occupant selected cool down distance with the maximum cool down distance.

If the occupant selected cool down distance is less than the maximum cool down distance calculated by the computing device 28, the computing device 28 may operate based on the occupant selected cool down distance. If the occupant selected cool down distance is greater than the maximum cool down distance, the computing device 28 may be programmed to override the occupant selected cool down distance. For example, in such a scenario, the computing device 28 may provide instruction to increase power to the motor 142 when the bicycle 10 is in the maximum cool down distance, instead of the occupant selected cool down distance. Alternatively, when the occupant selected cool down distance is greater than the maximum cool down distance, the computing device 28 may instruct the mobile device 48 to reject the entry of the occupant selected cool down distance and prompt the driver to select another occupant selected cool down distance. In this scenario, the computing device 28 may instruct the mobile device 48 to display the maximum cool down distance to assist the driver in choosing the occupant selected cool down distance to be less than the maximum cool down distance.

The computing device 28 may be programmed to, e.g., the memory 29 may store instructions including programming to, identify a baseline heart rate of the driver before operation of the bicycle 10 by the driver. For example, before operating the bicycle 10, the driver may contact the heart rate monitor 145 for a predetermined amount of time and the computing device 28 may receive the heart rate signal and calculate the baseline heart rate, e.g., the resting heart rate of the driver. The computing device 28 may be programmed to provide instructions to increase power to the motor 142 based at least on the heart rate signal relative to the baseline heart rate. For example, as the bicycle 10 approaches the predetermined destination, the computing device 28 may provide instructions to the motor 142 to increase pedaling assistance to lower the heart rate signal to the baseline heart rate. The computing device 28 may perform a feedback loop to continuously monitor the heart rate signal relative to the baseline heart rate.

As shown in FIGS. 24 and 25, an automatic mode of the power control logic may be turned on or off in block 174. When the automatic mode is turned off, the power control logic calculates the power output and rotates the gear 148 to drive the electric bicycle 10. When the automatic mode is turned on, the power control logic calculates the power required for the remaining journey, as shown in block 176. This calculation may be based on instantaneous power request, historical journey power usage, remaining journey distance, remaining journey topography, traffic, etc. When the power required for the remaining journey is calculated, the power control logic calculates whether the battery 26 has sufficient charge to satisfy the power for the remaining journey, as shown in block 178. This calculation is based on the state of charge of the battery 26.

If the charge of the battery 26 is sufficient, then the power control logic tracks when the electric bicycle 10 nears the destination within a predetermined distance. When the power control logic determines that the electric bicycle 10 is not within the predetermined distance of the destination, the power control logic calculates the power output to the motor 142, as shown in block 180, and provides power to the motor 142, as shown in block 182. When the power control logic determines that the electric bicycle 10 is within the predetermined distance of the destination, the power control logic calculates a sweat-down power adjust, as shown in block 184, e.g., to provide additional power to the motor 142 to allow the driver to cool down during the last leg of the trip. The sweat-down power adjust may be based on a measurement of the instantaneous heart rate of the driver. Based on the sweat-down power adjust, the power control logic calculates the power output and provides the power to the motor 142.

As shown in block 186, when the power control logic calculates that the charge of the battery 26 is not sufficient to reach the destination, the power control logic calculates range-increase power adjust. Based on this calculation, the power control logic calculates the power output and provides the power to the motor 142.

As shown in FIG. 28, the electric bicycle 10 may include a communication system 200. The communication system 200 is configured to simultaneously send and process data between the computing device 28 and the mobile device 48 and/or a user input device 202 of the vehicle 12. Specifically, the computing device 28 of the electric bicycle 10 may routinely perform status checks of one or more components/ systems of the electric bicycle 10 such as state of battery charge, range of travel, frame 14 unfold check, tire pressure, active safety systems, etc. These statuses may be displayed to the driver, e.g., before a journey begins, on the mobile device 48 or an instrument panel of the vehicle 12. The user input device 202 may, for example, include a multimedia system of the vehicle 12, including a processor, memory, a user interface 218, such as a graphical user interface and/or input buttons, etc.

As shown in FIG. 26, the communication system 200 may include the computing device 28 of the bicycle 10 and a connection 204. The processor 31 of the computing device 28 may be programmed to communicate with the user input device 202 of the vehicle 12 when the bicycle 10 is docked to the vehicle 12. The processor 31 may be programmed to also communicate with the mobile device 48, in addition to the user input device 202, when the bicycle 10 is undocked from the vehicle 12. In such a configuration, the processor 31 may be programmed to provide three-way communication between the user input device 202 of the vehicle, the computing device 28 of the bicycle 10, and the mobile device 48, i.e., may allow communication from any one of the of the user input device 202 of the vehicle, the computing device 28 of the bicycle 10, and the mobile device 48 to the other two.

Figures 26A, 26B:
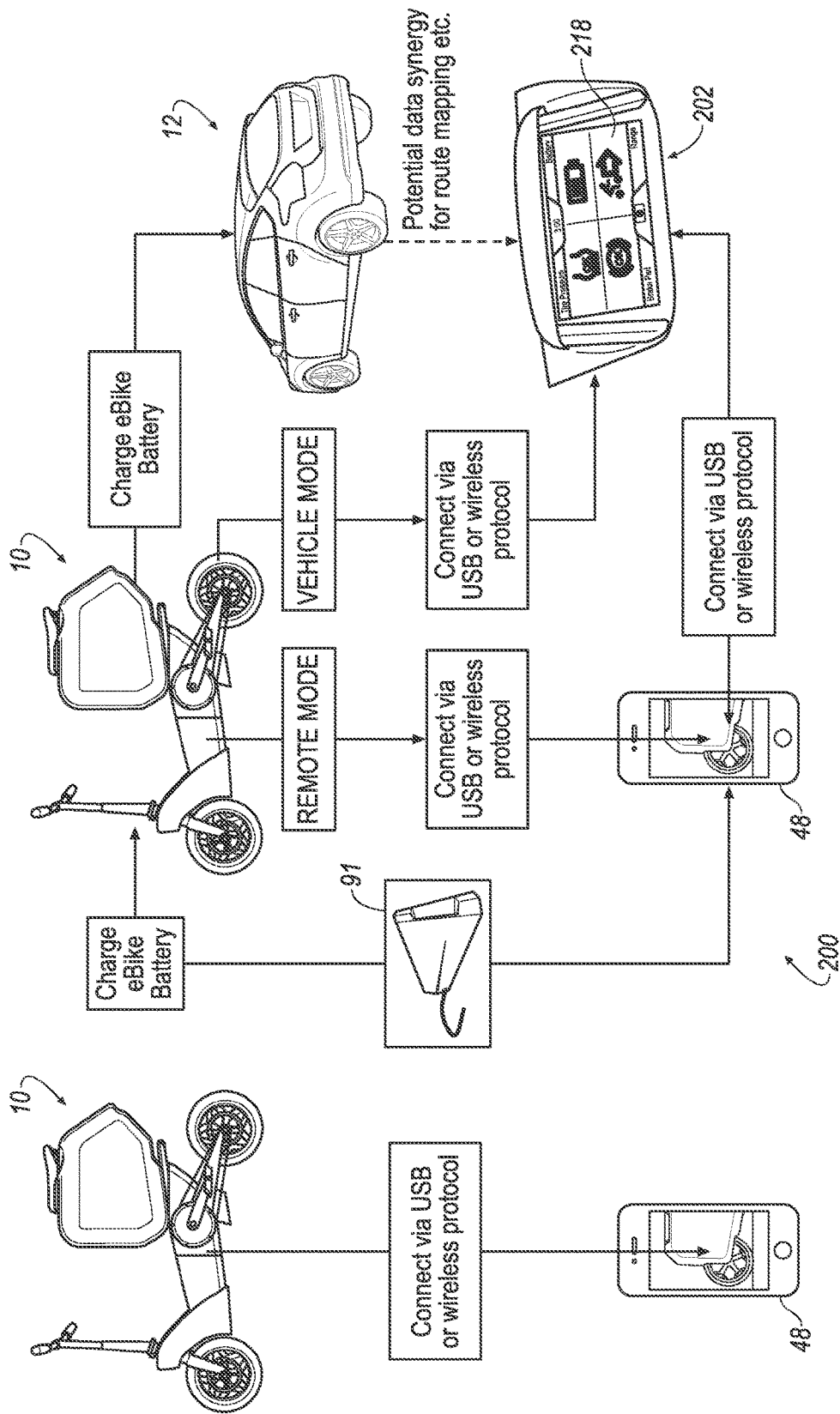
FIG. 26A is a schematic view of the electric bicycle being operated in a remote mode.
FIG. 26B is a schematic view of the electric bicycle being alternatively operated in a vehicle mode and the remote mode.
Figure 27:
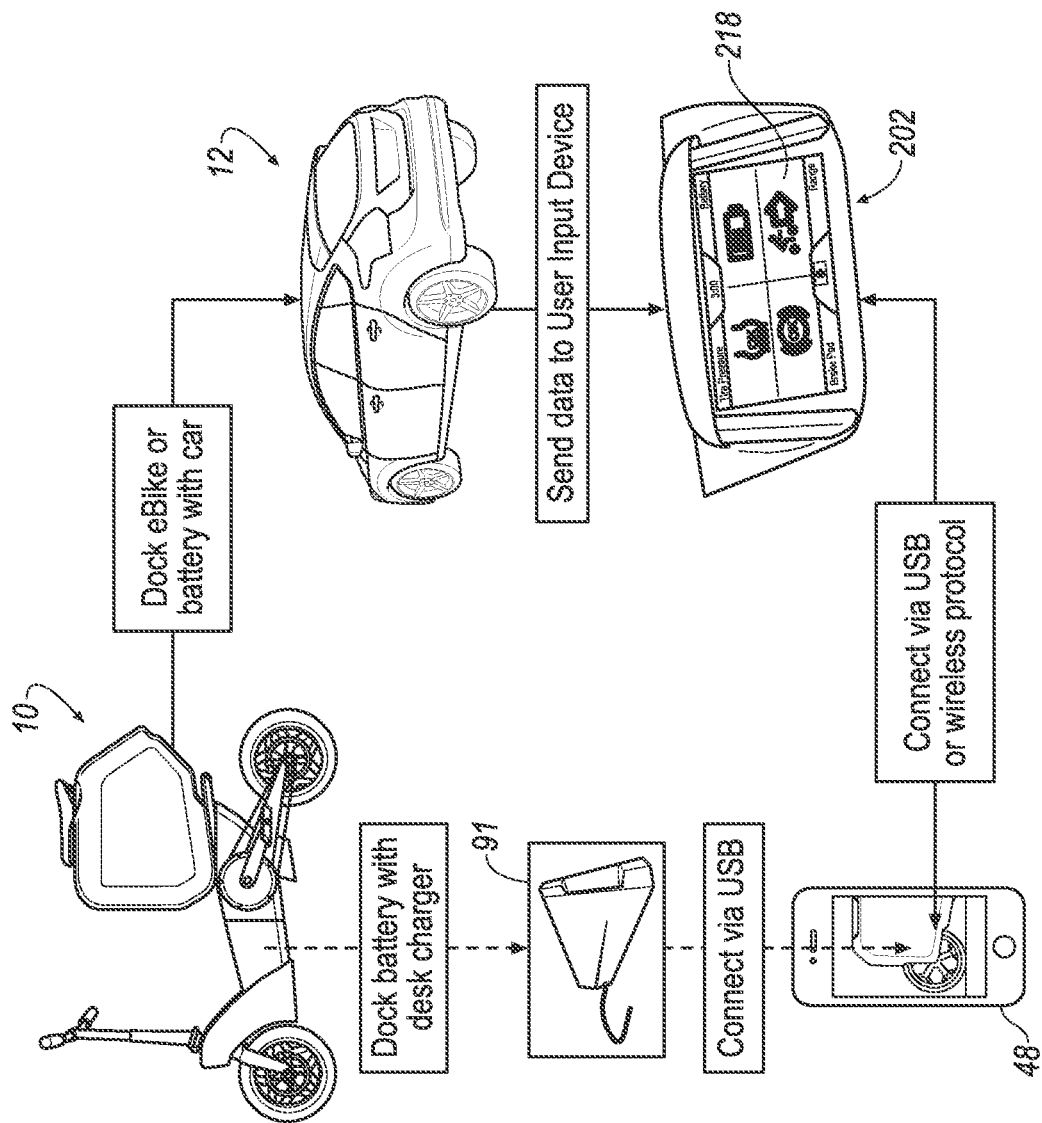
FIG. 27 is a schematic view of the electric bicycle being operated in a charge mode.

As shown in FIG. 26B, the communication system 200 may operate in a vehicle mode, in which the user input device 202 of the vehicle 12 is in communication with the computing device 28 and controls the status checks, or in a remote mode (also shown in FIG. 26A), in which the mobile device 48 controls the status checks. The communication system 200 may automatically switch between the vehicle mode and the remote mode when the electric bicycle 10 is removed from or entered into the vehicle 12. For example, the processor 31 may be programmed to automatically communicate with the user input device 202 of the vehicle 12 when the bicycle 10 is docked to the vehicle 12 and to automatically discontinue communication with the mobile device 48 when the bicycle 10 is docked to the vehicle 12. Alternatively, or in addition, the communication system 200 may be manually switched between the vehicle mode and the remote mode, e.g., by manual input from the driver to the user input device 202 of the vehicle 12 and/or through the mobile device 48. For example, the processor may be programmed to receive an instruction to establish communication with at least one of the user input device 202 of the vehicle and the mobile device 48, e.g., by manual input from the driver to the user input device 202 of the vehicle 12 and/or through the mobile device 48.

As shown in FIG. 28, the electric bicycle 10 includes a connection 204 between the communication system 200 and the user input device 202 of the vehicle 12 and/or between the mobile device 48. The connection 204 may be a wireless connection 204, e.g., through wireless protocol such as Bluetooth, or may be a wired connection 204, e.g., USB connection 204. The connection 204 may be in communication with the battery 26 for providing communication between the battery 26 and the user input device 202 and/or between the mobile device 48.

In the vehicle mode, the electric bicycle 10 may be connected to the vehicle 12 and to the mobile device 48. In other words, the computing device 28 may communicate directly with the user input device 202 and to the mobile device 48. This communication between the computing device 28 and the user input device 202 and/or the mobile device 48 may be wired and/or wireless. The vehicle 12 may send, receive, and/or link data from the electric bicycle 10 to the mobile device 48, as set forth below.

In the vehicle mode, the computing device 28 of the electric bicycle 10 may be in communication with the vehicle 12 through the connection 204 when the electric bicycle 10 is docked to the vehicle 12. For example, the electric bicycle 10 may be docked with the vehicle 12, as set forth below. When the electric bicycle 10 is docked, the computing device 28 of the electric bicycle 10 may communicate with the user input device 202 of the vehicle 12 through the connection 204. For example, the computing device 28 may communicate the status checks through the connection 204 to the user input device 202 of the vehicle 12. The user input device 202 may communicate with the computing device 28 through appropriate software. A vehicle manufacturer may either provide an open source programming interface for the bicycle computing device 28. The manufacturer may devise and upload their own application to the user input device 202 or the manufacturer may program the interface routine directly into their multimedia communications protocol of the user input device 202.

The user input device 202 may control the computing device 28 through the connection 204 when the communication system 200 is in the vehicle mode. The processor 31 may be programmed to communicate information from one of the user input device 202 and the mobile device 48 to the other of the user input device 202 and the mobile device 48 when the bicycle 10 is docked to the vehicle 12. The user input device 202 may mirror the communication from the computing device 28 to the mobile device 48 when the communication system 200 is in the vehicle mode. For example, the user input device 202 may communicate the information to be mirrored through a typical connection 204 with the mobile device 48 such as Bluetooth, USB, etc. The user input device 202 may merge data to the computing device 28 including parking information, congestion information, toll road information, weather information, topography information, etc. When in remote mode, the mobile device 48 may merge data to the computing device 28 including parking information, topography information, etc.

In the remote mode, the electric bicycle 10 may be connected to the mobile device 48, and in such a configuration, the mobile device 48 may be connected to the vehicle 12. In other words, the computing device 28 may communicate directly with the mobile device 48. The communication between the computing device 28 and the mobile device 48 may be wired and/or wireless. If the mobile device 48 is in the vehicle 12, then the mobile device 48 may also communicate with the mobile device and send, receive, and/or link data from the electric bicycle 10 to the user input device 202.

When the communication system 200 operates in the remote mode, as shown in FIGS. 26A and 26B, the mobile device 48 may be connected to the electric bicycle 10, e.g., through the connection 204. In the remote mode, the computing device 28 of the electric bicycle 10 may communicate with the mobile device 48 through the connection 204. For example, the computing device 28 may communicate the status checks through the connection 204 to the mobile device 48 of the vehicle 12. The mobile device 48 may control the computing device 28 through the connection 204 when the communication system 200 is in the remote mode. The mobile device 48 may mirror the communication from the computing device 28 to the user input device 202 when the communication system 200 is in the remote mode. For example, the mobile device 48 may communicate the information to be mirrored through a typical connection 204 with the user input device 202 such as Bluetooth, USB, etc.

As set forth above, the communication system 200 may be automatically switched between the vehicle mode and the remote mode. Control of the computing device 28 is passed from the user input device 202 to the mobile device 48 when the electric bicycle 10 is removed from the vehicle 12, and control of the computing device 28 is passed from the mobile device 48 to the user input device 202 when the electric bicycle 10 is entered into the vehicle 12.

The connection 204 may be configured to communicate with both the user input device 202 and the mobile device 48. The same connection 204 may be compatible with both the user input device 202 and the mobile device 48 and, thus, the same connection 204 may be used in both the vehicle mode and the remote mode, thereby reducing costs by using a single connection 204. The common connection 204 also ensures that any events or updates may be passed directly from the mobile device 48 to the vehicle 12 and/or from the vehicle 12 to the mobile device 48 when control of the computing device 28 is switched between the vehicle 12 and the mobile device 48.

As set forth above, the communication system 200 may include the computing device 28, including the processor 31 and the memory 29. The memory may store instructions comprising programming to detect when the bicycle 10 is docked to the vehicle 12 and detect when the bicycle 10 is undocked from the vehicle 12. The instructions comprise programming to communicate with the user input device 202 of the vehicle 12 when the bicycle 10 is docked to the vehicle 12 and communicate with the mobile device 48 when the bicycle 10 is undocked from the vehicle 12. As set forth above, the data may pertain to at least one of battery charge, travel range, frame unfold check, tire pressure, and active safety system.

The instructions may comprise programming to automatically switch communication with the computing device 28 from the user input device 202 of the vehicle 12 to the mobile device 48 when the bicycle 10 is undocked from the vehicle 12. Alternatively, or in addition, as set forth above, the instructions may include programming to manually switch communication with the computing device 28 from the user input device 202 of the vehicle 12 to the mobile device 48, e.g., by input to the mobile device 48 and or the user input device 202 of the vehicle 12.

Similarly, the instructions may comprise programming to automatically switch communication with the computing device 28 from the mobile device 48 to the user input device 202 of the vehicle 12 when the bicycle 10 is docked to the vehicle 12. Alternatively, or in addition, as set forth above, the instructions may include programming to manually switch communication with the computing device 28 from the mobile device 48 to the user input device 202 of the vehicle 12, e.g., by input to the mobile device 48 and or the user input device 202 of the vehicle 12.

The instructions may comprise programming to communicate data from one of the user input device 202 of the vehicle 12 and the mobile device 48 to the other of the user input device 202 and the mobile device 48 when the bicycle 10 is docked to the vehicle 12. In other words, as set forth above, when the communication system 200 is in the vehicle mode, data may be communicated between the mobile device 48 and the user input device 202 of the vehicle 12. The instructions may comprise programming to provide three-way communication between the user input device 202 of the vehicle 12, the computing device 28 of the bicycle 10, and the mobile device 48, i.e., may allow communication from any one of the of the user input device 202 of the vehicle, the computing device 28 of the bicycle 10, and the mobile device 48 to the other two.

Figure 30:
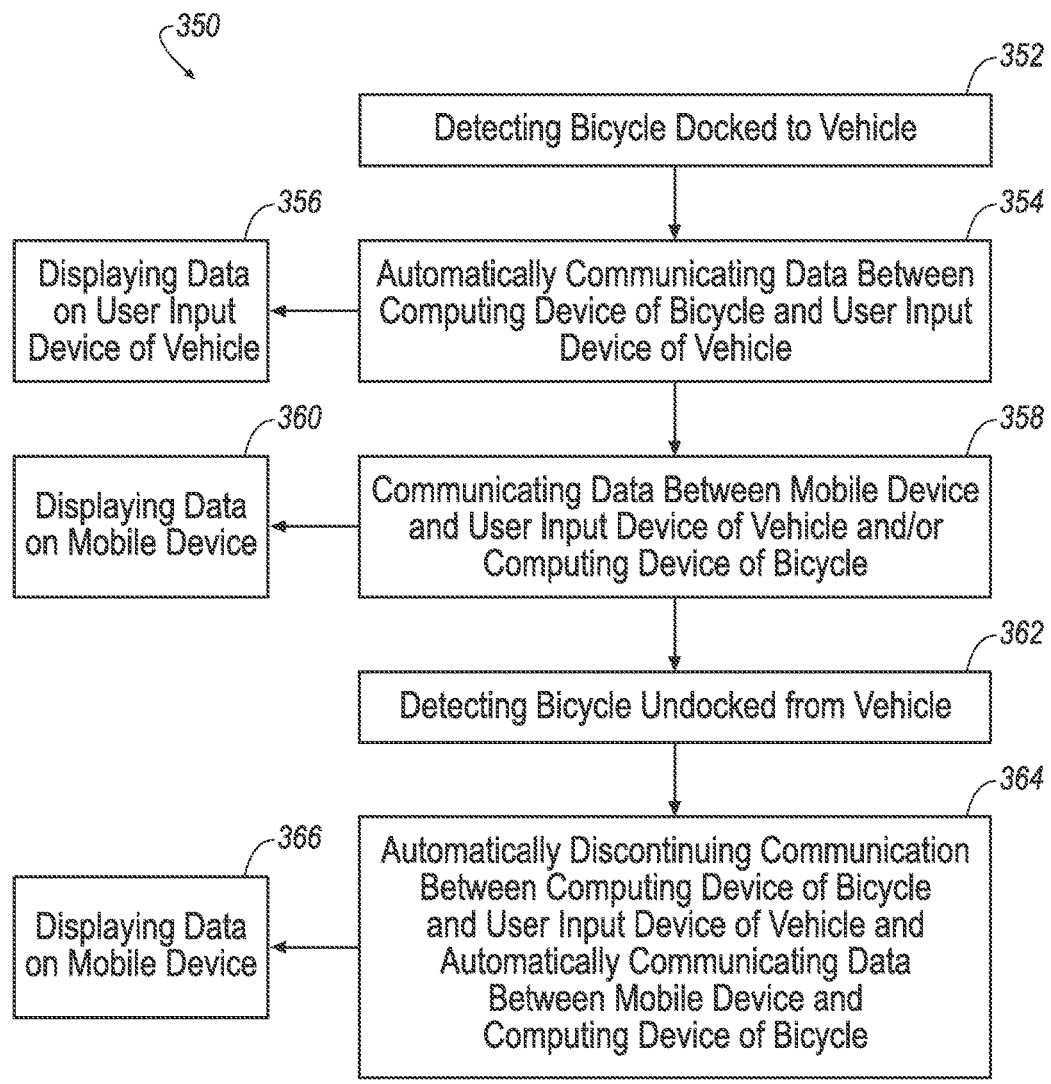
FIG. 30 is a block diagram of a method of operating a communication system.
Figure 31:
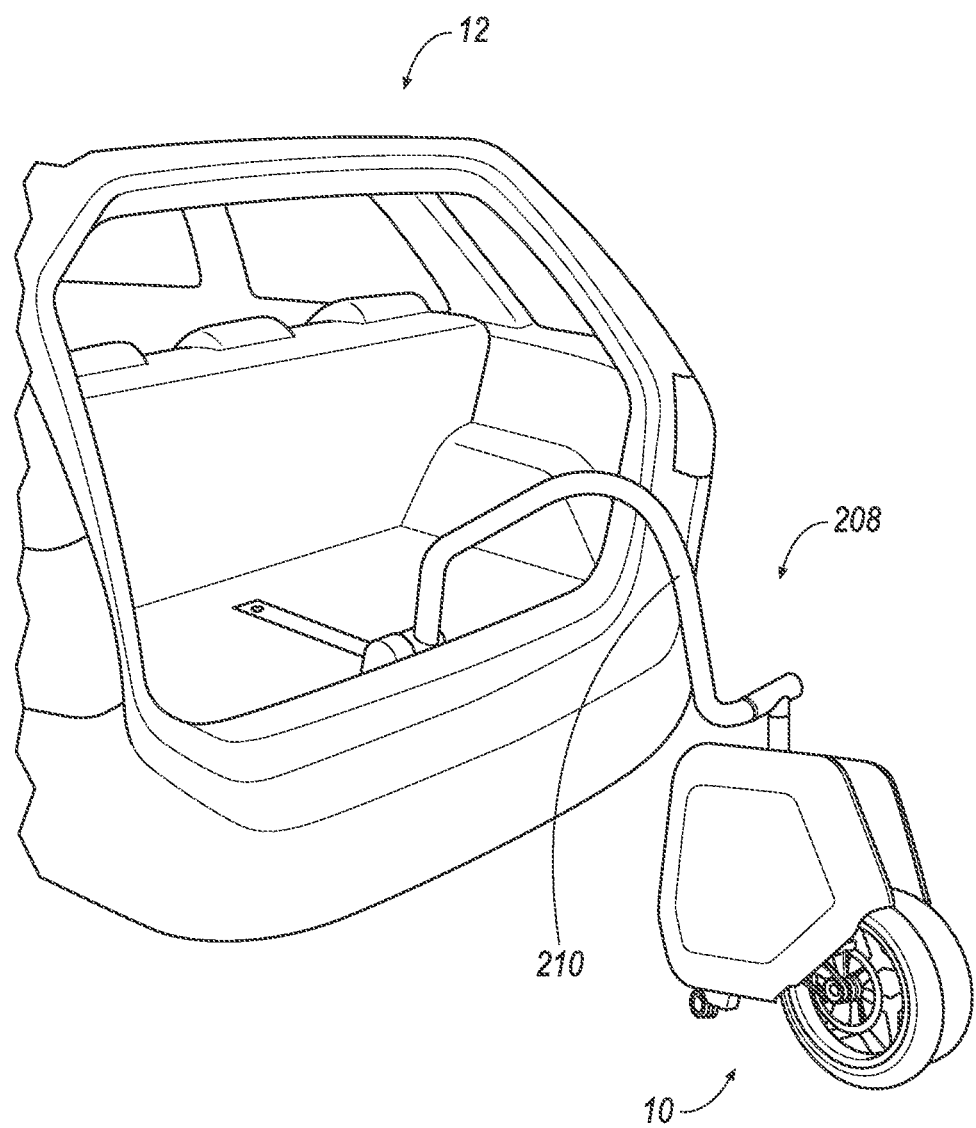
FIG. 31 is a perspective view of the docking system.

A method 350 of operating the communication system 200 is shown in FIG. 30. With reference to FIG. 30, the method includes detecting the bicycle 10 being docked to the vehicle 12, as shown in block 352.

As shown in block 354, the method 350 includes communicating data between the computing device 28 of the bicycle 10 and the user input device 202 of the vehicle 12, i.e., with the communication system 200 in vehicle mode. As set forth above, this communication may be automatic, as shown in FIG. 30. Alternatively, as set forth above, this communication may be initiated manually, e.g., by input to the user input device 202 and/or the mobile device 48. The method may include displaying the data on the user input device 202 of the vehicle 12, as shown in block 356.

While the communication system 200 is in vehicle mode, the method may include communicating data between the mobile device 48 and the user input device 202 of the vehicle 12 and/or the computing device 28 of the bicycle 10, as shown in block 358. The data may be displayed on the mobile device 48, as shown in block 360.

The method may include detecting the bicycle 10 being undocked from the vehicle 12, as shown in block 362. As shown in block 364, the method may include discontinuing communication between the computing device 28 of the bicycle 10 and the user input device 202 of the vehicle 12 and communicating data between the mobile device 48 and computing device 28 of the bicycle 10, i.e., with the communication system 200 in the remote mode. As set forth above, this communication, i.e., switching from the vehicle mode to the remote mode, may be automatic or may be manually initiated, e.g., with input to the mobile device 48 and/or the user input device 202. This data may be displayed on the mobile device 48, as shown in block 366. As shown in FIG. 30, the method may be restarted if the docking of the bicycle 10 to the vehicle 12 is detected again while the communication system is in the remote mode. The switching of the communication system 200 from the remote mode to the vehicle mode may be automatic when the docking of the bicycle 10 with the vehicle 12 is detected.

Figure 32:
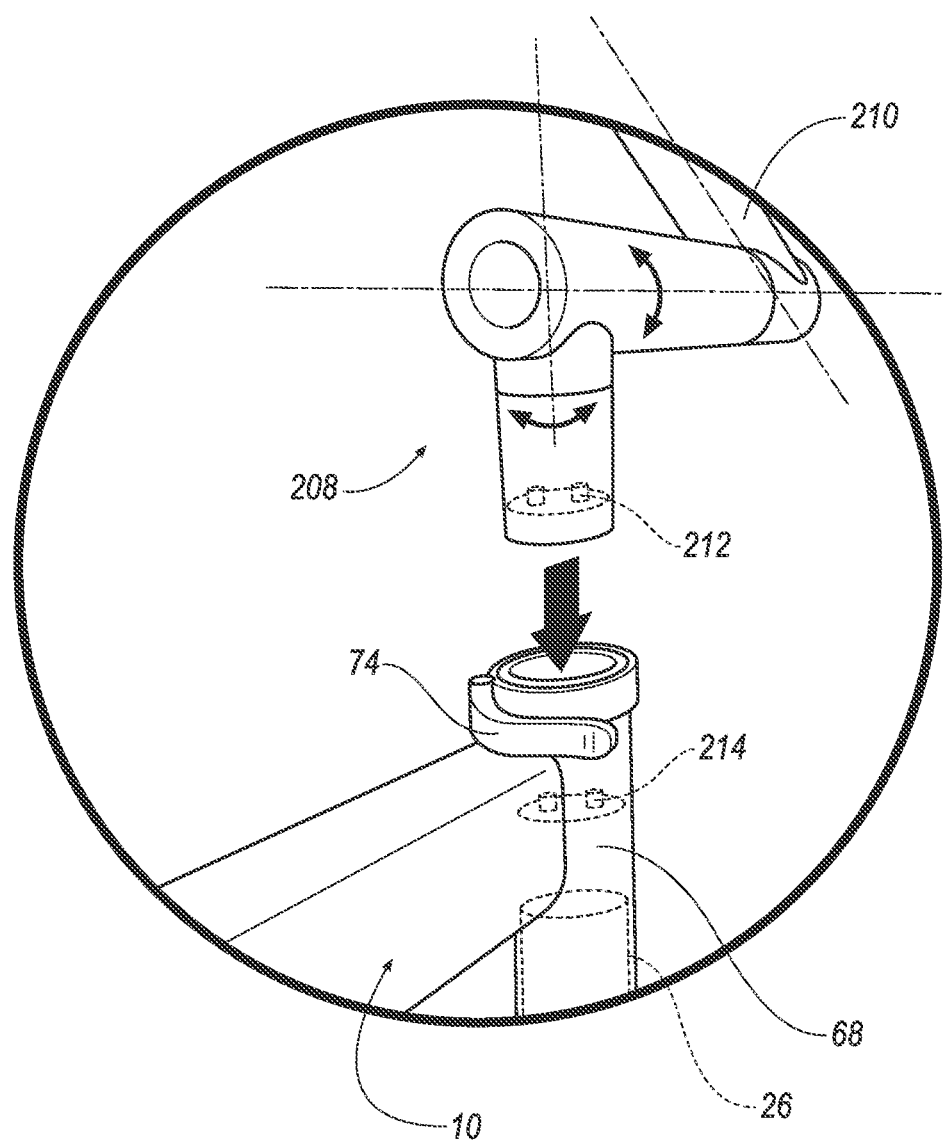
FIG. 32 is a magnified view of a portion of the docking system.
Figure 33:
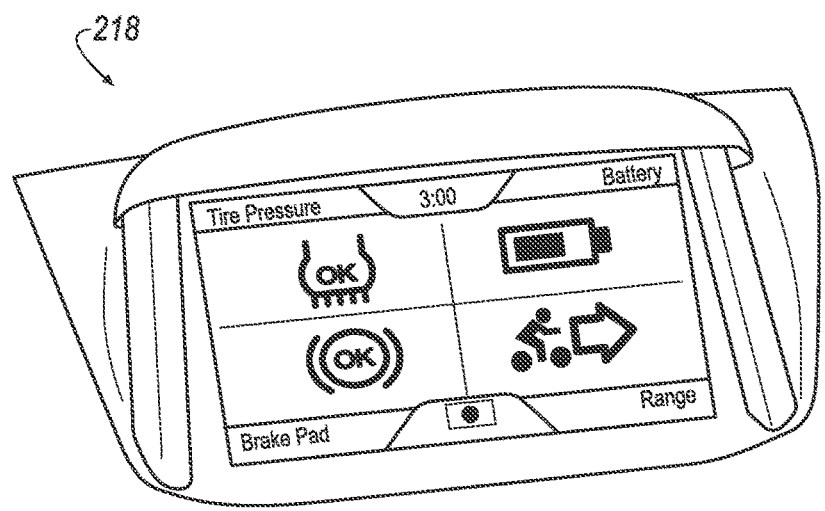
FIG. 33 is a perspective view of a user interface of the vehicle.

With reference to FIG. 29, when the electric bicycle 10 is docked with the vehicle 12, a power source of the vehicle 12, e.g., a battery 206, may charge the battery 26 of the electric bicycle 10. As one example, as shown in FIGS. 26B and 27, the vehicle 12 may include a docking system 208 having a lift arm 210 for connecting to and lifting the electric bicycle 10 into the vehicle 12. With reference to FIG. 32, the lift arm 210 may have electrical connections 212 in communication with the battery 206 of the vehicle 12. The electric connections 212 of the lift arm 210 may mate with electrical connections 214 of the electric bicycle 10, e.g., in the fork 68 or seat post 76 of the electric bicycle 10, to electrically connect the battery 206 of the vehicle 12 with the electric bicycle 10. The electrical connections 214 of the electric bicycle 10 may be in communication with the battery 26 of the electric bicycle 10.

The user input device 202 and/or the mobile device 48 of the vehicle 12 may be in communication with the electrical connection 212 of the lift arm 210 for monitoring and/or displaying the state of charge of the battery 26 of the electric bicycle 10. The user input device 202 and/or the mobile device 48 may be in communication with the computing device 28 of the electric bicycle 10 through the lift arm 210 to monitor and/or display tire pressure, state of charge of the battery 26, travel range, brake pad status, etc.

The docking system may be of any suitable type. For example, the docking system may be that which is disclosed on U.S. patent application Ser. No. 14/337,283 filed on Jul. 22, 2014 and entitled "Internal Vehicle Docking Arm and Storage," which is incorporated herein by reference.

Figure 34:
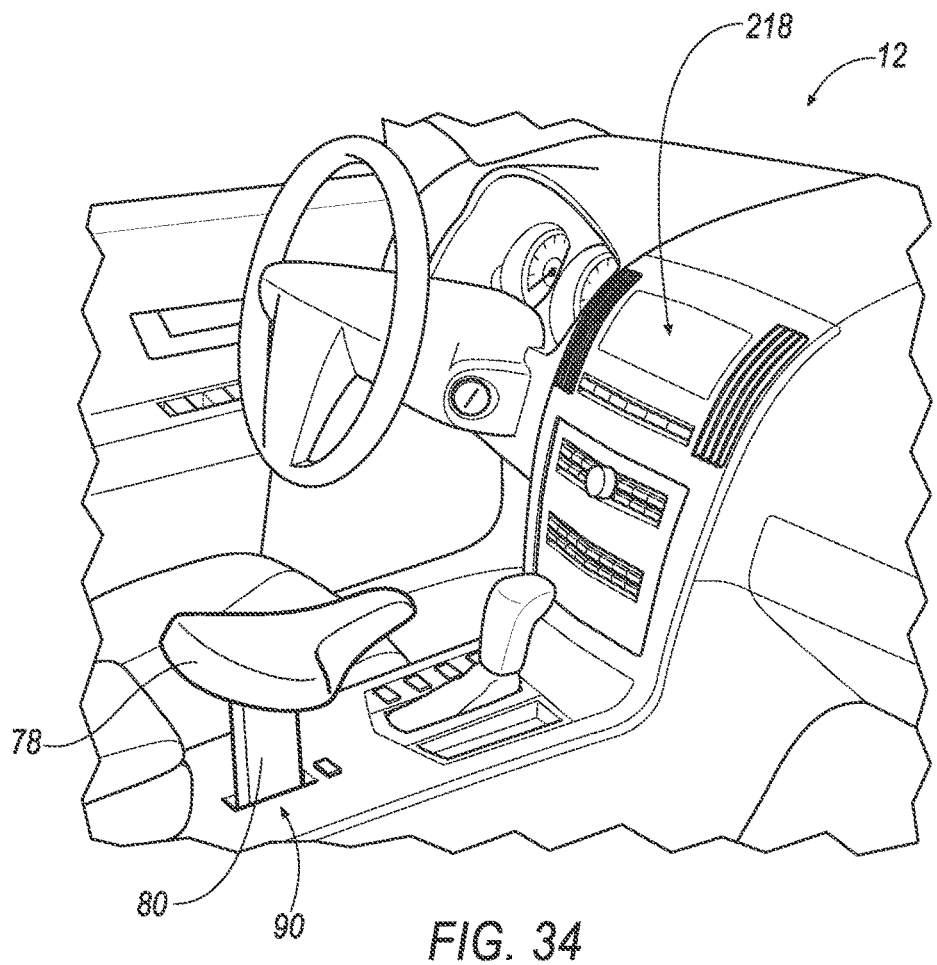
FIG. 34 is a perspective view of a portion of an interior of the vehicle.

As set forth above, the battery 26 may be supported in the seat tube 82 of the seat post 76 of the seat assembly 18, which may be removable from the post 80. With reference to FIG. 34, the vehicle 12 may include a vehicle charging console 90 for receiving the seat tube 82 of the seat post 76 to connect with and charge the battery 26. The vehicle charging console 90 may, for example, be located on the center console of the vehicle 12. The vehicle charging console 90 may be connected to a CAN bus of the vehicle 12. The CAN bus may monitor the state of charge of the battery 26 of the electric bicycle 10.

The battery 26 of the electric bicycle 10 may supply power to the vehicle 12 through the vehicle charging console 90. For example, in the event that the battery 206 of the vehicle 12 is dead, the battery 26 of the electric bicycle 10 may be engaged with the vehicle charging console 90 to power hazard lights, interior lights, automatic locks, automatic windows, etc. The battery 26 of the electric bicycle 10 may be used to jump-start the vehicle 12 and/or trickle charge the battery 206 of the vehicle 12.

The vehicle 12 may use navigational data, e.g., SATNAV overlays, to calculate the travel range based on the state of charge of the battery 26. The vehicle 12 may advise the driver, e.g., through the user input device 202, when the vehicle 12 is in sufficient range to park the vehicle 12 and reach the destination on the electric bicycle 10 with battery 26 power based on the state of charge of the battery 26.

Figure 35:
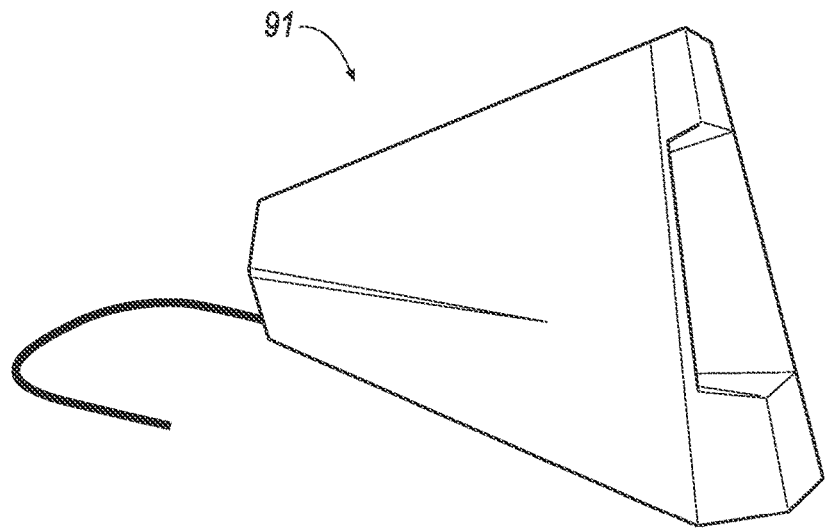
FIG. 35 is a perspective view of an external charging console.

The battery 26 may be charged with the use of an external charging console 91 (shown in FIGS. 26B, 27, and 35), e.g., a desk charger. The external charging console 91 may be powered, for example, through a wall electrical socket, through USB connection 204 on a personal computer or laptop computer, etc. For example, the external charging module may be configured to receive the seat tube 82 of the seat post 76 of the seat assembly 18. The external charging console 91 may include indicators, such as lights, that indicate the state of charge of the battery 26.

In the alternative to the vehicle mode, the computing device 28 of the electric bicycle 10 may be selectively connected and unconnected from the vehicle 12 and/or the mobile device 48, as shown in FIG. 27. In such a configuration, the computing device 28 and the battery 26 may be housed in the post 80 of the seat post 76. With continued reference to FIG. 27, the post 80, in combination with the rest of the electric bicycle 10 or separate from the rest of the electric bicycle 10, may be docked with the vehicle 12. For example, the post 80 may be removed from the rest of the electric bicycle 10 and docked to the vehicle charging console 90, as shown in FIG. 34. Alternatively, as shown in FIG. 27, the post 80 may be docked with the external charging device 91 (also shown in FIG. 35).

When connected to the vehicle charging console 90 or the external charging device 91, the battery 26 and/or the computing device 28 communicate with the vehicle charging console 90 and the external charging device 91, respectively. Specifically, when the pose 80 is docked with the vehicle charging console 90, data is sent to the user input device 202. The user input device 202 may overlay this data with a planned journey destination and provides information via the user interface 218 if there is enough charge, and allows the user to choose options, for example, to engage a sweat down mode, etc. This data is then mirrored to the mobile device 48 when the user leaves the vehicle 12. The system then remains in charge mode, despite being remote from the vehicle 12. The mobile device 48 still uses the last connection of the battery 28 with the vehicle 12 and extrapolated battery usage and all user selections. In line with the user input device 202 calculations and user selections, the mobile device 48 may then use the location capability (e.g., GPS) of the mobile device 48 to overlay with the pre-programmed journey (mirrored from the user input device 202 at exit) to instruct the user which power settings on the electric bicycle 10 should be used at what point in the journey. Similarly, at the return journey, if the battery 26 was docked and charged with the external charging device 91, then the external charging device 91 may be connected to the mobile device to update a range prediction for the correct control of the pre-programmed return journey.

Alternatively, in FIG. 27, the mobile device 48 may process all data. During a journey of the vehicle 12, the mobile device 48 receives the journey destination from the vehicle 12 and the electric bicycle 10 state of charge and health check. In such a configuration, all calculations may be performed on the mobile device 48.

Figure 36:
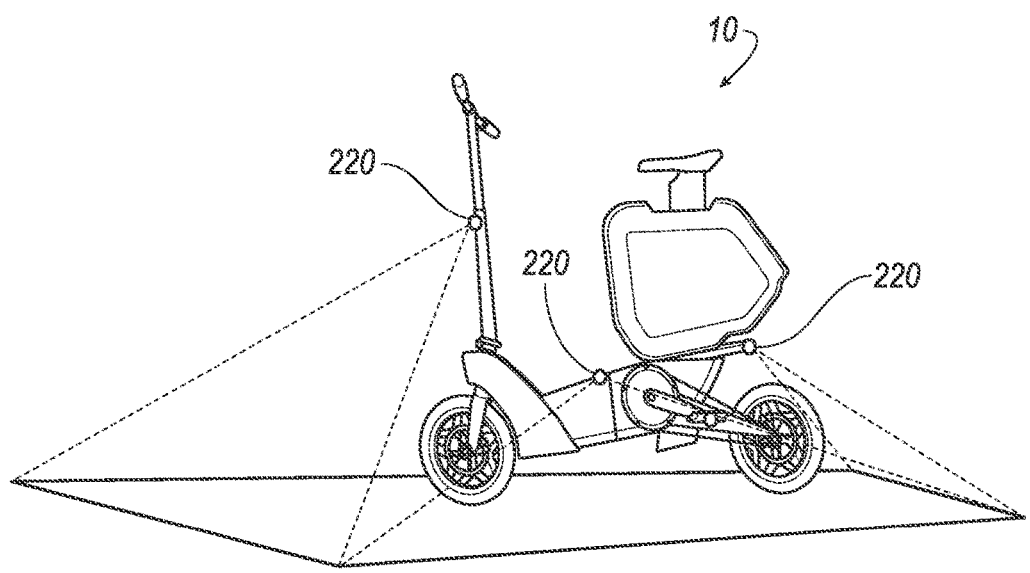
FIG. 36 is a perspective view of the electric bicycle including lights for illuminating a zone around the electric bicycle.

With reference to FIG. 36, the electric bicycle 10 may include lights 220 for illuminating a zone around the electric bicycle 10 on the driving surface. The lights 220 may be, for example, LED, such as 5 W LEDs, or lasers, such as 1 W slot lasers. The lights 220 may include four lights 220, i.e., one for each of the front left, front right, rear left, and rear right quadrants of the vehicle 12. The lights 220 may be orange and/or red. The lights 220 may be used during reduced visibility or at night.

The lights 220 may be used continuously, when turning, during a violent swerve, and/or during an emergency brake. The lights 220 may be used continuously during operation to identify a safety zone round the electric bicycle 10, e.g., indicating a zone that should not be crossed by other road users. This safety zone moves with the electric bicycle 10. The illuminated driving surface provides an increased surface area that is illuminated, which increases visibility. The illuminated driving surface may also illuminate imperfections in the driving surface.

The lights 220 may be used when turning to illuminate the zone to the side of the direction of turn. When turning, these lights 220 may blink and may be amber in color. The operation of the lights 220 during turning may be controlled with a switch on the handlebars, e.g., a rotary switch, or a separate on-off toggle switch. During a violent swerve and/or during an emergency brake, the lights 220 identifying the zone on the driving surface may strobe or change color.

Figure 37:
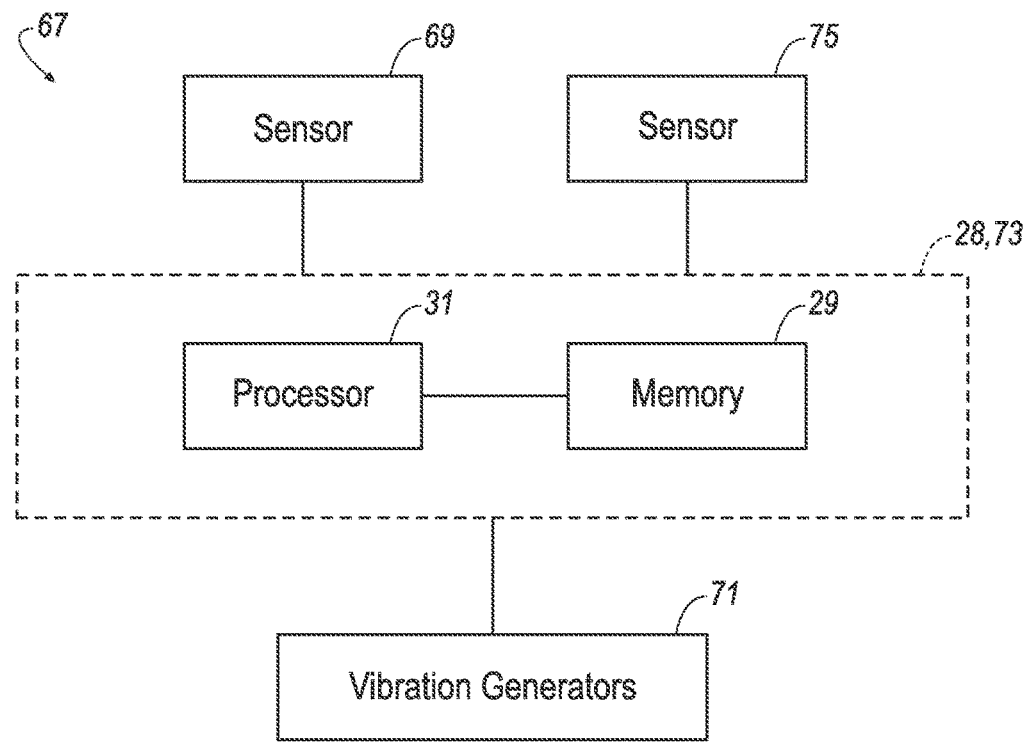
FIG. 37 is a schematic of a haptic feedback system.
Figure 39:
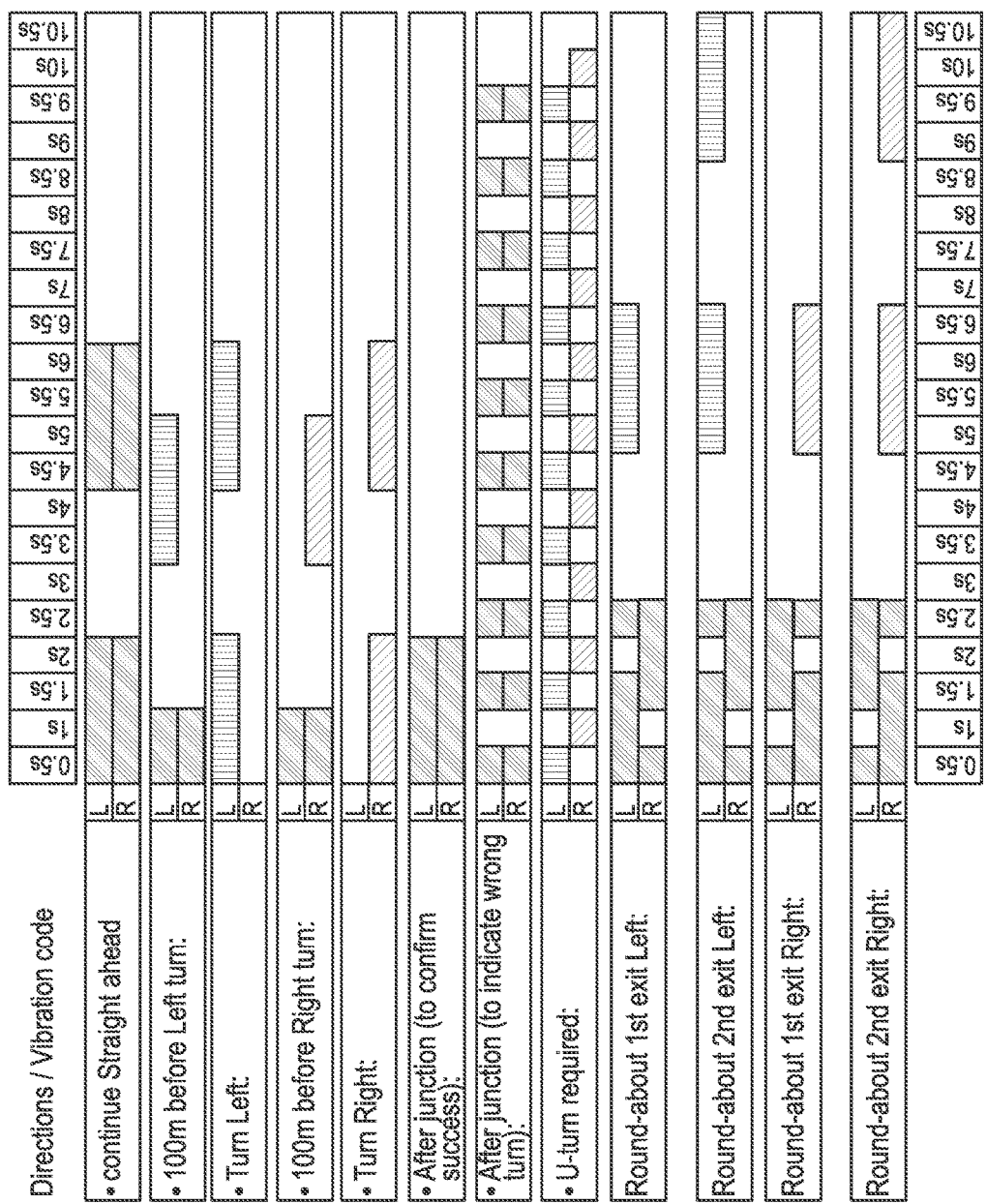
FIG. 39 is a graph showing initiation and duration of vibration for various conditions of vibration generators of handlebars of the electric bicycle.
Figure 40:
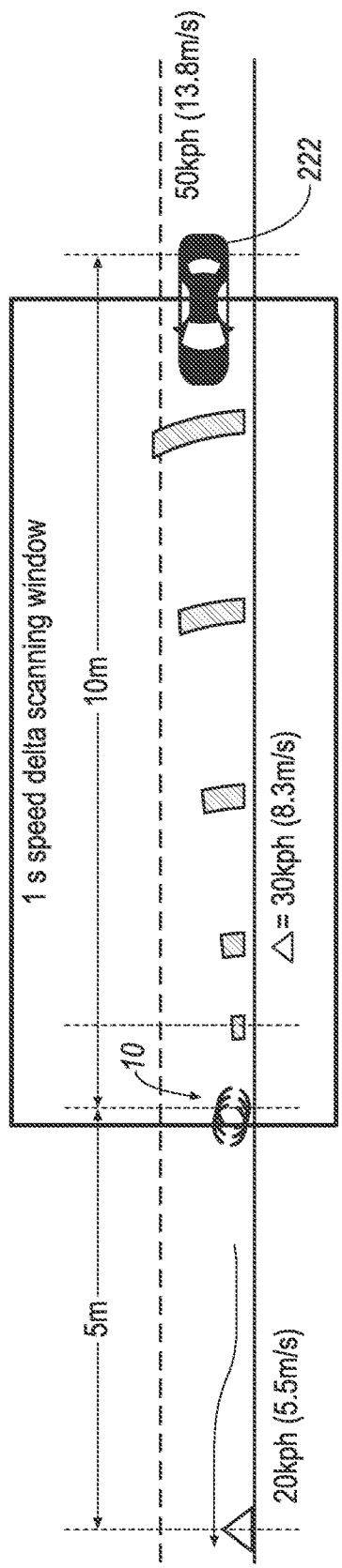
FIG. 40 is a schematic view of operation of a swerve assist system of the electric bicycle.

With reference to FIG. 37, the bicycle 10 may include a system 67 including a visual, audible, and/or haptic feedback device to provide warning to the occupant of the bicycle 10. In other words, with reference to FIG. 38, the system 67 may be a swerve assist system for identifying to the driver riding the electric bicycle 10 when an overcoming vehicle 222 is approaching, as shown in FIG. 40. It should be appreciated that the values provided in FIG. 39 are merely provided for example.

Figure 38:
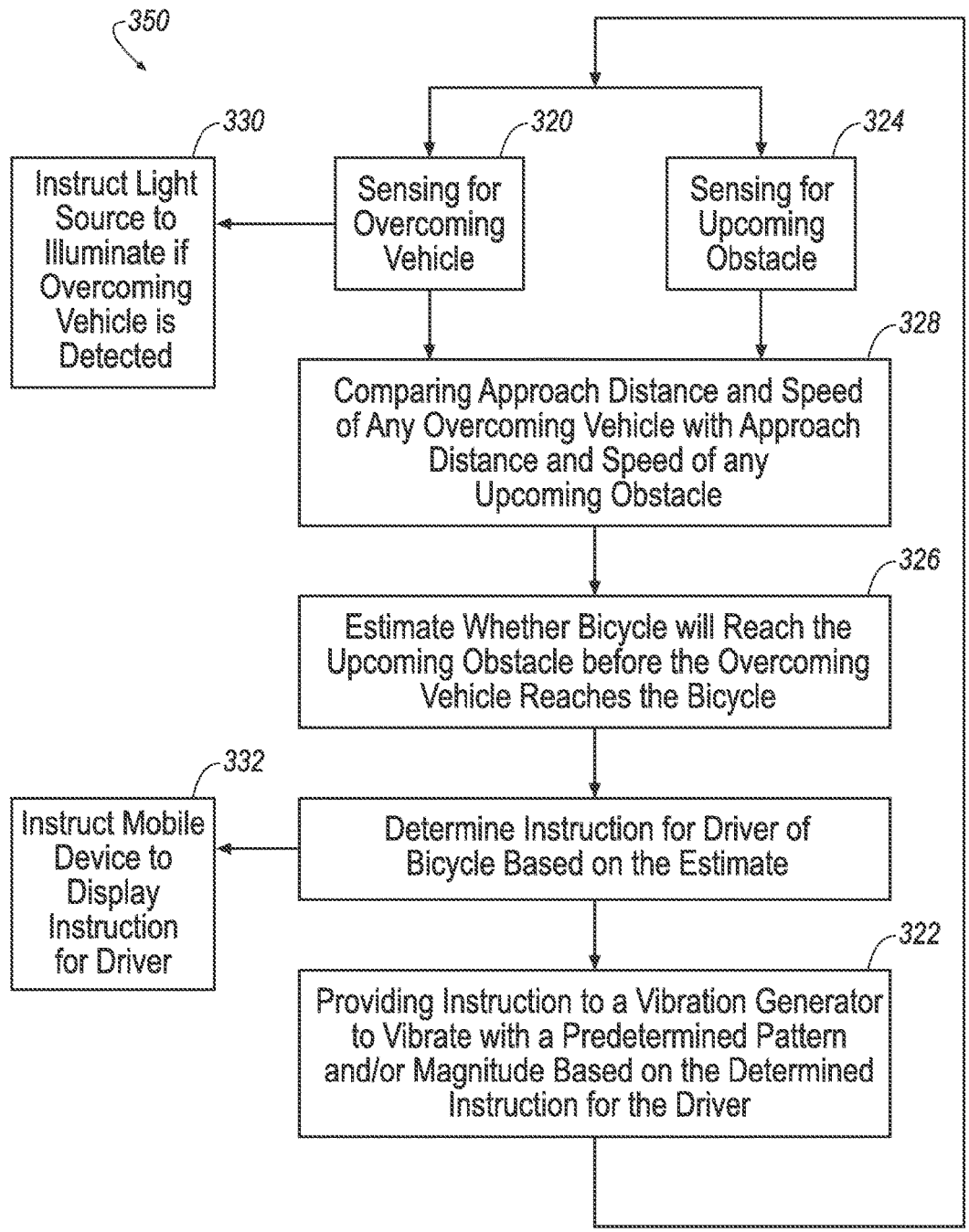
FIG. 38 is a block diagram of a method of operating the haptic feedback system.

With reference to FIG. 38, as set forth above, occupants may share a lane of a road with other vehicles 222, such as automobiles. The other vehicles 222 may travel faster than the occupant, thus forcing the occupant to ride on a side of the road to allow the other vehicles 222 to pass. However, the side of the road may include obstacles such as potholes, manhole covers, rubbish, other bicycles, walking pedestrians, etc. As such, the occupant may, at times, have to swerve from the side of the road into the middle of the road. The swerve assist system identifies when overcoming vehicles 222 are present and communicates the presence of the overcoming vehicle 222 to the driver to indicate to the driver that a collision with the overcoming vehicle 222 will occur if the driver swerves.

The handlebar 66, for example, may include vibration generators 71 for selectively vibrating to provide haptic direction to the driver. The vibration generators 71 may be supported by the handlebar 66. Specifically, one vibration generator 71 may be disposed in each of the left-hand side and the right-hand side of the handlebar 66 for providing vibration to the left hand and the right hand of the occupant, respectively. The operation of the vibration generators 71 allow the occupant to remain visually focused on the driving surface and traffic. The vibration generators 71 may be of any suitable type.

The system 67 may alone, or in combination other systems, scan ahead of the electric bicycle 10 to warn the driver of upcoming obstacles to aid the driver to preemptively adjust speed and/or take other evasive action. The system 67 may also calculate if swerving, braking, or collision is the safest option. The system 67 may inform the driver of the safest option and/or may initiate a response.

The system 67 may include one or more sensors to detect vehicles and/or other obstacles on the road. For example the system 67 may include a sensor 69 configured to sense an overcoming vehicle, e.g., a vehicle travelling at a pace faster than the bicycle 10 and passing the bicycle 10 from behind, as schematically shown in FIG. 40. The sensor 69 may face rearwardly to detect overcoming vehicles. The sensor 69 may be an ultrasonic sensor or any other suitable type of sensor. The sensor 69 may, for example, be supported by the frame 14 of the bicycle 10.

In addition, or in the alternative, the system 67 may include another sensor 75 configured to detect an upcoming obstacle, e.g., vehicles, potholes, manhole covers, rubbish, other bicycles, walking pedestrians, etc. The sensor 75 may face forwardly to detect the upcoming obstacle. The sensor 75 may be an ultrasonic sensor or any other suitable type of sensor. The sensor 75 may, for example, be supported by the frame 14 of the bicycle 10.

The system 67 may include a controller 73 configured to activate the vibration generators 71 when the sensor 69 detects an overcoming vehicle and/or when the sensor 75 detects an upcoming obstacle. The controller 73, for example, may be the computing device 28, as set forth further below. As set forth above, the computing device 28 may include the processor 31 and the memory 29. Alternatively, the controller 73 may be of any suitable type.

The controller, e.g., the computing device 28, may be programmed to instruct the vibration generator 71 to vibrate with at least one of a predetermined magnitude and a predetermined pattern when the computing device 28 estimates that the overcoming vehicle will reach the bicycle 10 before the bicycle 10 reaches the upcoming obstacle. The initiation and duration of vibration to each side of the handlebars 66 may be determined based on haptic navigation code. One example of the initiation and duration of vibration for various conditions is shown in FIG. 39.

Similarly, the controller, e.g., the computing device 28, may be programmed to estimate whether the bicycle 10 will reach the upcoming obstacle before the overcoming vehicle will reach the bicycle 10. The controller, e.g., the computing device 28, estimates based on a comparison of a distance and approach speed of the overcoming vehicle with the distance and approach speed of the upcoming obstacle. The controller, e.g., the computing device 28, may perform a feedback loop on the estimation.

Based on the speed of the electric bicycle 10 and the distance from the overcoming vehicle 222, the data processor applies an algorithm to determine whether the driver is clear to swerve or is not clear and must maintain position driving at the side of the road. Specifically, a signal processor algorithm may compare data from the sensors 69, 75 with pre-programmed scenarios and continuously outputs one of two signal states: "Yes" clear to swerve or "No" not clear to swerve. The signal states are communicated to the driver visually, e.g., an illuminated band around the handlebars, haptically, e.g., through vibration of the handlebars such as with the vibration generators set forth above, and/or audibly, e.g., beeping.

The controller, e.g., the computing device 28, may be programmed to calculate an instruction to perform one of swerving, braking, colliding with the upcoming obstacle, and colliding with the overcoming vehicle. Specifically, the controller, e.g., the computing device 28, may be programmed to instruct the vibration generator 71 to vibrate with at least one of a predetermined magnitude and a predetermined pattern to identify the instruction to perform one of swerving, braking, colliding with the upcoming obstacle, and colliding with the overcoming vehicle 222.

The vibration of the vibration generators 71 may be combined with visual instructions displayed on the mobile device 48. As set forth above, the mobile device 48 may be a mobile phone. Alternatively, the mobile device 48 may be of any suitable type. In addition to, or in the alternative to, a haptic warning, the controller, e.g., the computing device 28, may instruct the mobile device 48 to visually display the warning, e.g., with text, graphics, etc. The driver may select or remove the warning and may change the threshold for such warnings through a graphical user interface of the mobile device 48. Such warnings, for example, may include tire pressure, brake pad level, battery and/or motor temperature, incorrect latching when unfolding, drowsiness detection, etc.

In addition, or in the alternative, the mobile device 48 may receive incoming communication, e.g., a telephone call, text message, email, etc., may instruct the system 67 of the incoming communication. The controller of the system 67, e.g., the computing device 28, may be configured to receive the instruction from the mobile device 48 indicating the incoming communication and, in response, may be configured to instruct the vibration generators 71 to vibrate to alert the driver to the incoming communication.

In addition, or in the alternative, the mobile device 48 may provide navigation assistance on the graphical user interface of the mobile device 48. In such a configuration, the mobile device 48 may communicate data to the computing device 28 and the computing device 28 may, in turn, instruct the vibration generators 71 to vibrate to identify navigational directions, points of interest (e.g., charge points, coffee shops, etc.), etc.

The system 67 may include a light source, e.g., lights 220. The controller, e.g., the computing device 28, may be configured to illuminate the light source when the sensor 69 detects the overcoming vehicle 222. This illumination may alert the driver of the overcoming vehicle 222 of the presence of the bicycle 10. For example, the swerve assist system may be used to warn the overcoming vehicle 222 that the driver is about to be forced to swerve due to an upcoming obstacle. For example, a light, e.g., light 220, on the electric bicycle 10 may strobe, light up an area of the road that the driver must swerve into, etc. The electric bicycle 10 may sound an audible warning, such as a horn, to alert the overcoming vehicle 222.

The system 67 may be configured to provide pedaling instruction to the driver, e.g., pedaling cadence, through the vibration generators 71. For example, the controller, e.g., the computing device 28, may be configured to instruct the vibration generators 71 to vibrate slowly to indicate to the driver to slow pedaling and may vibrate quickly to indicate to the driver to quicken pedaling. For example, the computing device 28 may provide these instructions to slow or quicken the pedaling to keep a pace, keep a workout regimen, preserve battery life, etc.

The system 67 may provide security to the bicycle 10. For example, the system 67 may be configured to detect unauthorized use and, in response, the controller, e.g., the computing device 28, may be configured to instruct the vibration generators 71 to vibrate at an uncomfortable frequency to deter the unauthorized use. In addition, the system 67 may sound an alarm horn and/or may increase the drivetrain resistance.

With reference to FIG. 37, in the configuration where the controller of the system 67 is the computing device 28, the memory 29 of the computing device 28 may include instructions including programming to receive data from the sensor 69 indicating that an overcoming vehicle 222 is approaching the bicycle 10, as shown in block 320 of FIG. 38. As shown in block 322, the instructions may include programming to instruct the vibration generator 71 to vibrate when the sensor 69 detects the overcoming vehicle 222.

With reference to FIG. 38, as shown in block 324, the instructions may also include programming to receive data from the sensor 75 indicating that the bicycle is approaching an upcoming obstacle. As shown in block 326, the instructions include programming to estimate whether the bicycle 10 will reach the upcoming obstacle before the overcoming vehicle 222 will reach the bicycle 10. This estimate may be based on a comparison of a distance and approach speed of the overcoming vehicle 222 with the distance and approach speed of the upcoming obstacle, as shown in block 328. As shown in FIG. 37, the instructions may include programming to perform a feedback loop on the estimate, i.e., to repeatedly compare the distance and approach speed of the overcoming vehicle 222 with the distance and approach speed of the upcoming obstacle at a repeated time interval.

As shown in block 322, the instructions may include programming to instruct the vibration generator 71 to vibrate with at least one of a predetermined magnitude and a predetermined pattern when the controller, e.g., the computing device 28, estimates that the overcoming vehicle 222 will reach the bicycle 10 before the bicycle 10 reaches the upcoming obstacle. Specifically, the instructions may include programming to calculate an instruction to the driver to perform one of swerving, braking, colliding with the upcoming obstacle, and colliding with the overcoming vehicle 222. Specifically, the instructions may include programming to instruct the vibration generator 71 to vibrate with at least one of a predetermined magnitude and a predetermined pattern to identify the instruction to perform one of swerving, braking, colliding with the upcoming obstacle, and colliding with the overcoming vehicle 222. In other words, each instruction to the driver, e.g., swerve, brake, collide with upcoming obstacle, collide with overcoming vehicle 222, may be assigned a unique and predetermined vibration magnitude and/or pattern. The driver of the bicycle 10 may be familiarized with the unique and predetermined vibration magnitude and/or pattern, e.g., from an owner's manual, and may take the appropriate action based on the vibration.

As shown in block 330, the instructions may include programming to illuminate the light source, e.g., lights 220, when the sensor 69 detects the overcoming vehicle 222. For example the instructions may include programming to increase the intensity and/or blinking pace of the lights 220 as the overcoming vehicle 222 moves closer to the bicycle 10. As set forth above, the illumination may alert the driver of the overcoming vehicle 222 of the presence of the bicycle 10.

As shown in block 332, the instructions may include programming to communicate data to a mobile device. For example, as set forth above, visual instructions may be displayed on the mobile device 48, e.g., a mobile phone. Specifically, the instructions may include programming to instruct the mobile device 48 to visually display the warning, e.g., with text, graphics, etc. As set forth above, the driver may select or remove the warning and may change the threshold for such warnings through a graphical user interface of the mobile device 48.

The instructions may include programming to receive identification of incoming communication from the mobile device, e.g., a telephone call, text message, email, etc., and may instruct the vibration generators 71 to vibrate to alert the driver to the incoming communication.

In addition, or in the alternative, the instructions may include programming to receive navigational instructions from the mobile device 48. In such a configuration, the mobile device 48 may communicate data to the computing device 28 and the computing device 28 may include instructions that include programming to instruct the vibration generators 71 to vibrate to identify navigational directions, points of interest (e.g., charge points, coffee shops, etc.), etc.

The instructions may include programming to instruct the vibration generator to vibrate with at least one of a different frequency and a different duration when the sensor 69 detects the absence of an overcoming vehicle and the sensor 75 detects the absence of an upcoming obstacle. For example, in the absence of an overcoming vehicle and an upcoming obstacle, the instructions may include programming to provide pedaling instruction to the driver, e.g., pedaling cadence, through the vibration generators 71. For example, instructions may include programming to instruct the vibration generators 71 to vibrate relatively slowly to indicate to the driver to slow pedaling and may vibrate relatively quickly to indicate to the driver to quicken pedaling. For example, the computing device 28 may provide these instructions to slow or quicken the pedaling to keep a pace, keep a workout regimen, preserve battery life, etc.

The system 67 may provide security to the bicycle 10. For example, the instructions may include programming to receive an indication that the bicycle 10 is being used by an unauthorized user and may include programming to instruct the vibration generators 71 to vibrate at an uncomfortable frequency, e.g., relatively high frequency and magnitude, to deter the unauthorized use. In addition, the instructions may include programming to sound an alarm horn and/or may increase the drivetrain resistance.

Figure 41:
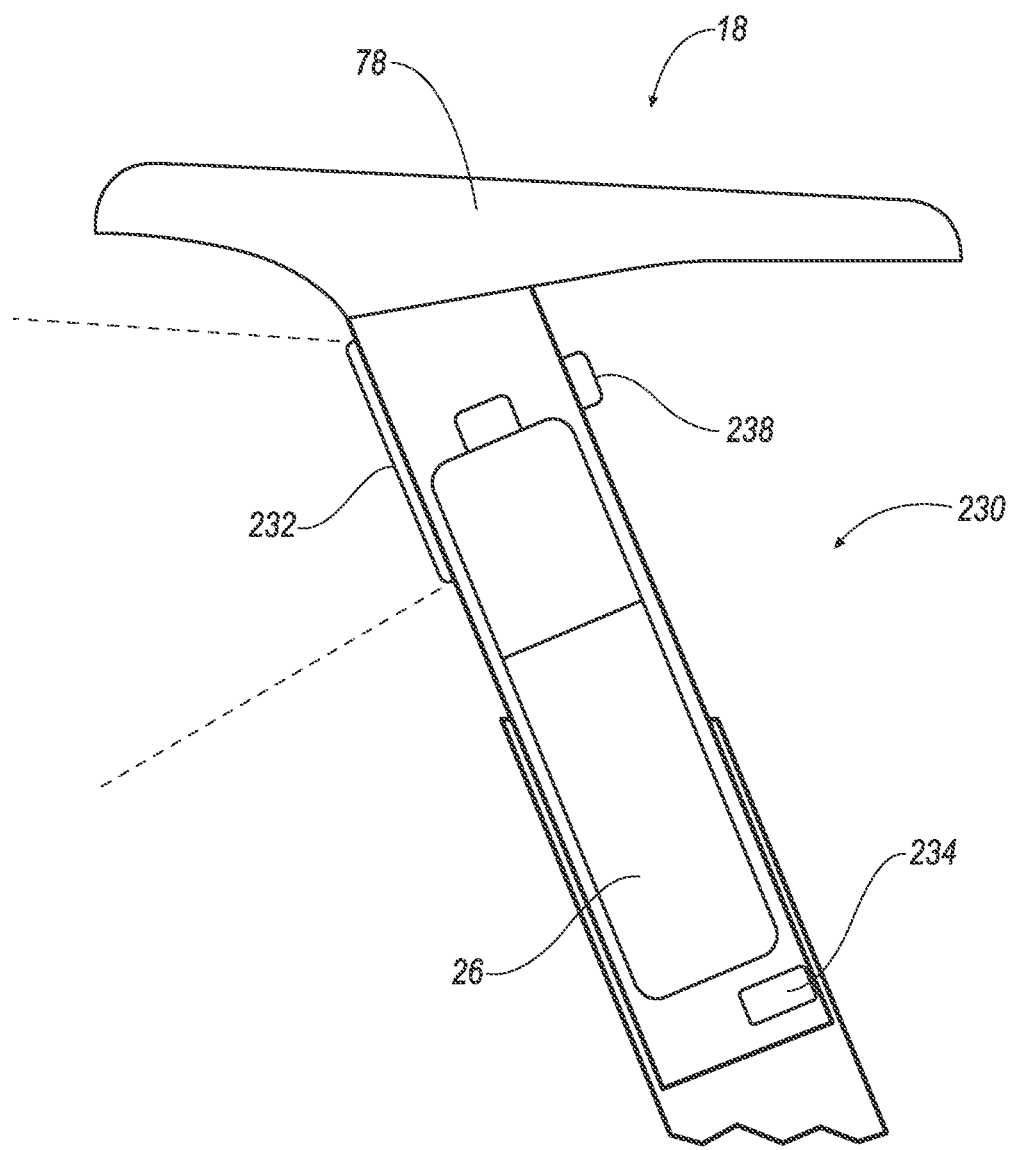
FIG. 41 is a cross-sectional view of an integrated flashlight of a seat assembly of the electric bicycle.
Figure 42:
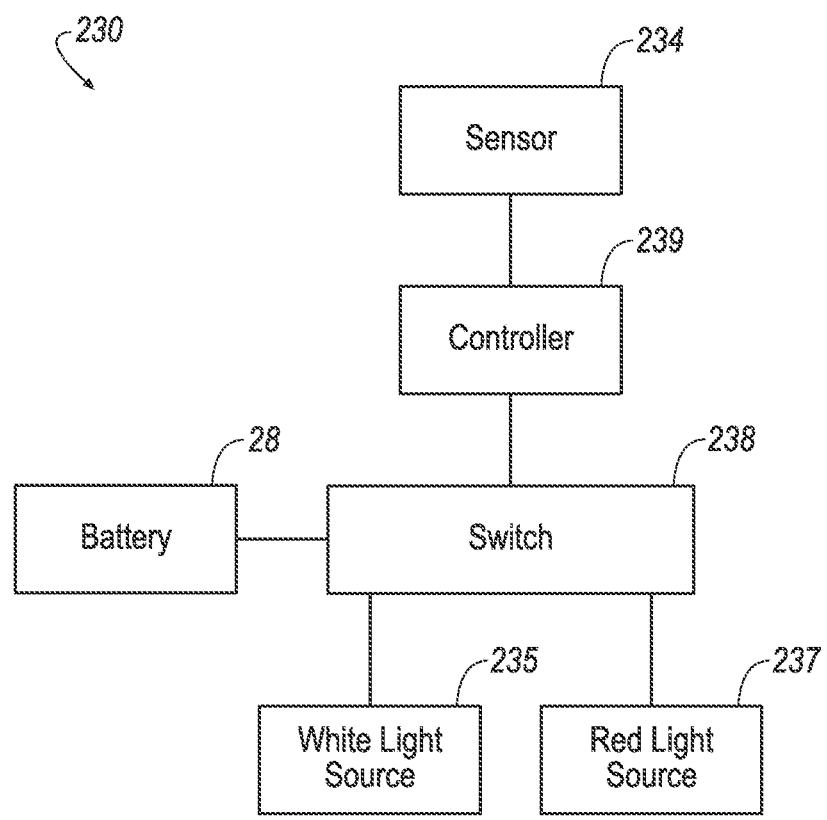
FIG. 42 is a schematic of a light system.

As set forth above, the post 80 of the seat post 76 of the seat assembly 18 may be removed from the seat tube 82. With reference to FIGS. 41 and 42, the post 76 may include an integrated light system 230 to provide light to the user when the post 80 of the seat post 76 is removed. The light system 230 may be used to provide illumination for folding/unfolding the frame 14, to provide security, to provide an emergency road light (i.e., to act as a flare), etc.

As set forth above, the battery 26 may be supported by the post 80. In such a configuration, the battery 26 may power the light system 230.

As shown in FIG. 42, the light system 230 may include a light source 232 supported by the post 76 and connected to a power source, e.g., the battery 26. The light source 232, for example, may be an LED strip having bi-color LEDs, e.g., red and white. In other words, the light source 232 may include a red light source 237 and a white light source 235, e.g., red and white LEDs. In such an example, the right light source 237 and the white light source 235 may be combined on a single dual color LED. Alternatively, the red light source 237 may be a red LED and the white light source 235 may be a separate white LED.

The light source 232 may be selectively illuminated when the post 80 is engaged with the seat tube 82 and when the post 80 is disengaged with the seat tube 82. For example, the white light source 235 may be selectively illuminated when the post 76 is disengaged with the seat tube 82 for use as a flashlight, and the red light source 237 may be selectively illuminated when the post 80 is engaged with the seat tube 82 for use as a brake light.

The light system 230 may include a sensor, e.g., an inductive proximity sensor 234, configured to detect engagement of the post 80 with the seat tube 82. For example, when the post 80 is inserted into the seat tube 82, the inductive proximity sensor 234 detects the post 80, e.g., the post 80 may be formed of aluminum or steel and the inductive proximity sensor 234 may detect the aluminum or steel. When the inductive proximity sensor 234 detects the post 80, circuit logic in the flashlight illuminates the red LEDs.

When the post 80 is engaged with the seat tube 82, the light 232 operates as a rear-facing brake light. In such a configuration, when the post 80 is engaged with the seat tube 82, the light source 232 may be in communication with the computing device 28, e.g., through wired or wireless communication. In such a configuration, the computing device 28 may illuminate the illuminated strip 264 in the same way as set forth above with respect to the brake light 143 and the illuminated strip 264 may be operated simultaneously with the brake light 143.

When the seat tube 82 is removed from the post 80, the inductive proximity sensor 234 fails to detect the post 80 and the circuit logic illuminates the white LEDs. With reference to FIGS. 41 and 42, the light system 230 may include a switch 238 that acts as an ON/OFF switch for connecting/disconnecting the battery 26 and the light source 235.

With reference to FIG. 42, the light system 230 may include a controller 239 in communication with the sensor 234. The controller 239 may be configured to provide power to the red light source 237 and prevent power to the white light source 235 when the sensor 234 detects engagement of the post 80 and the seat tube 82. The controller 239 may be configured to provide power to the white light source 235 and prevent power to the red light source 237 when the sensor 234 detects disengagement of the post 80 and the seat tube 82. In other words, the controller 239 may illuminate the white light source 235 and the red light source 237 by providing power to the light sources 235, 237.

The controller 239 may be, for example, a processor programmed to provide power to the red light source 237 and prevent power to the white light source 235 when the sensor 234 detects engagement of the post 80 with the tube 82. This processor may also be programmed to provide power to the white light source 235 and to prevent power to the red light source 237 when the sensor 234 detects disengagement of the post 80 and the tube 82. The switch 238 may be in communication with the controller 239, e.g., the processor, and may be operated by the driver to instruct the controller 239 to selectively power the white light source 235 when the post 80 is disengaged with the tube 82. The computing device 48, for example, may be in communication with the controller 239, e.g., the processor, and may provide instructions to the controller 239 to selectively power the red light source 237 when the post 80 is engaged with the tube 82. As set forth above, the computing device 28 may illuminate the illuminated strip 264 in the same way as set forth above with respect to the brake light 143 (as shown in FIG. 3) and the illuminated strip 264 may be operated simultaneously with the brake light 143.

Figure 43:
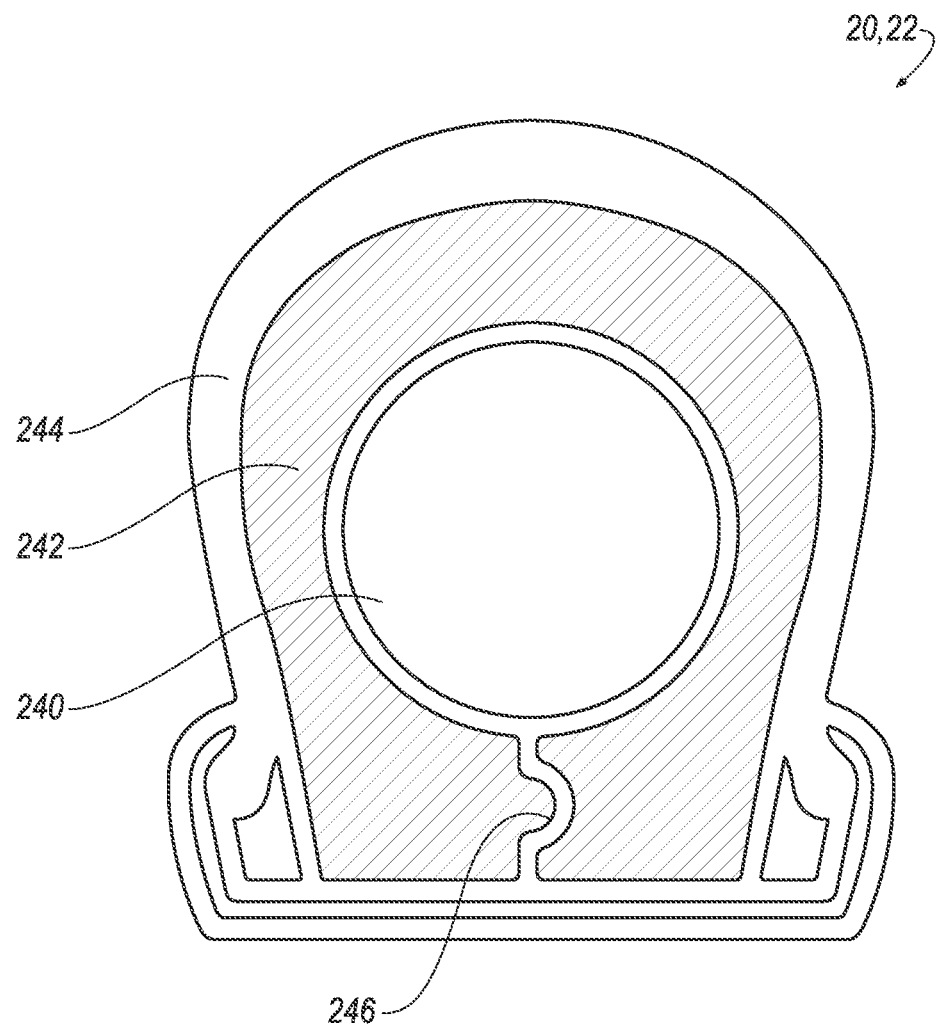
FIG. 43 is a cross-section of a wheel of the electric bicycle.

With reference to FIG. 43, the front wheel 20 and/or the rear wheel 22 may have a run-flat configuration. The wheel 20, 22 includes a smaller inner tube 240 pressurized with air, surrounded by a firm foam layer 242 which provides an added layer of protection in order to prevent damage to the inner tube 240. A tire 244, such as a rubber tire, is disposed about the foam layer 242. The foam layer 242 provides protection to the inner tube 240 inside it and the pressurized air within the tube 240 provides a degree of suspension to the driver. This tube 240, being filled with air, also reduces the weight of the wheel.

The wheel is puncture proof. For example, if a large nail, or similar object, passes through the entire foam layer 242 and punctures the internal inner tube 240, the foam layer 242 is designed to still be able to provide some degree of functionality to the user. This enables the user to continue the journey even if a puncture is sustained. This allows the driver to continue using the electric bicycle 10 until replacement/repair is available.

The foam layer 242 includes an interlocking feature 246. The interlocking feature 246 allows rigidity to be maintained even when the internal structure of the inner tube 240 is lost. This interlocking feature 246 may be a tongue and groove joint, or alternatively a joint such as a dovetail joint which will be able to provide support under the stresses experienced in a punctured condition.

The front wheel 20 and/or the rear wheel 22 may be mounted to the frame 14 with a nut 250. For example, the frame 14 may present a stud that receives the wheel and the nut is tightened onto the stud. The nut 250 may be locking wheel nut, i.e., a nut that is configured to be removed with a key. The vehicle 12 may also include a locking wheel nut and the locking wheel nut on the electric bicycle 10 and the locking wheel nut on the vehicle 12 may both be configured to be unlocked by the same key.

The front wheel 20 and the rear wheel 22 may, for example, be 12" wheels. This size enable a more compact folded form and allow for use of a smaller shell 36. The wheel 20, 22, for example, may be wide to provide better ride quality on rough roads as well as improving the overall appearance. The wheels 20, 22 may be styled to look like automotive alloy wheels. The wheels may be die cast or injection molded.

Figure 44:
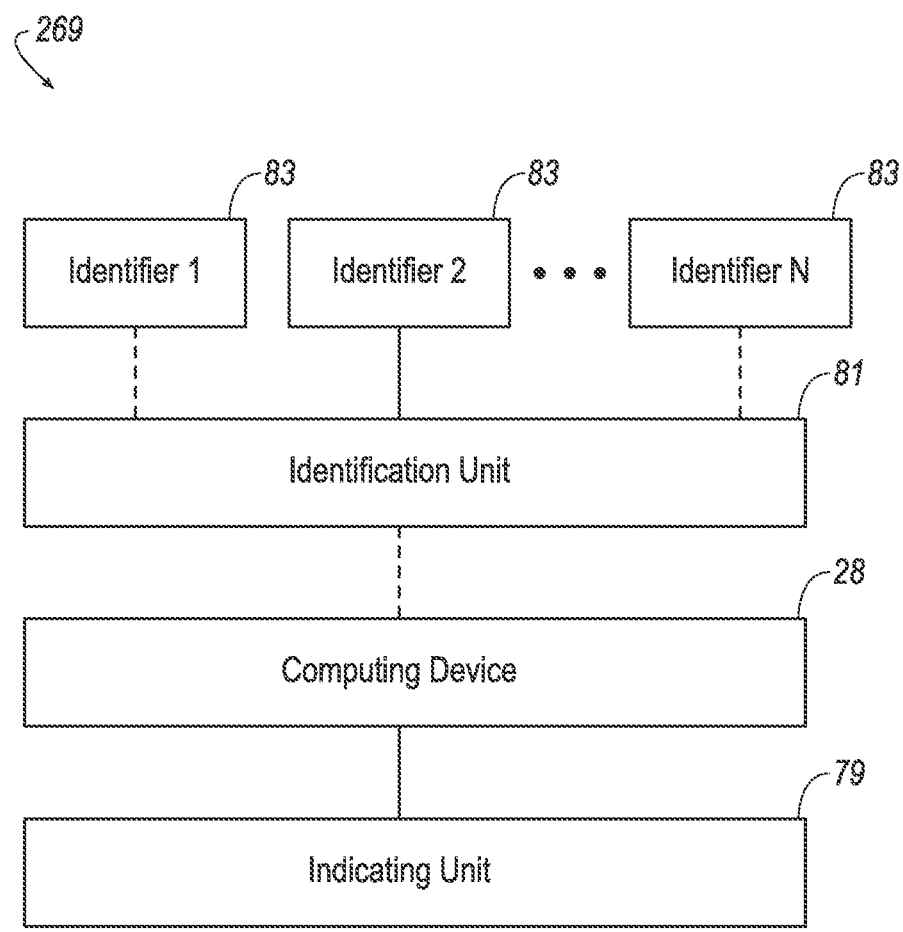
FIG. 44 is a schematic of a seat adjusting system.
Figure 46:
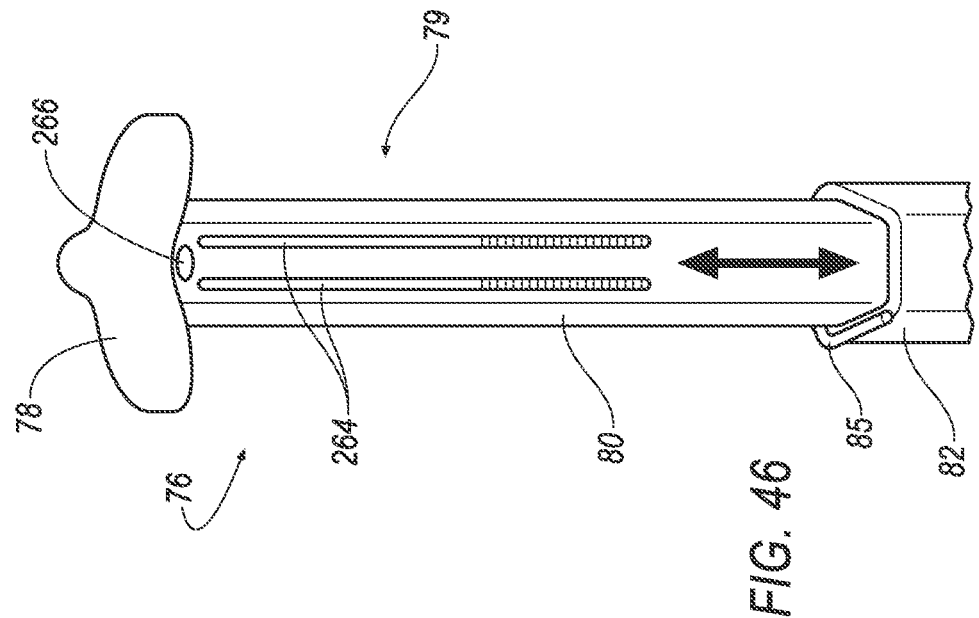
FIG. 46 is a perspective view of a second embodiment of the memory seat post.
Figure 45:
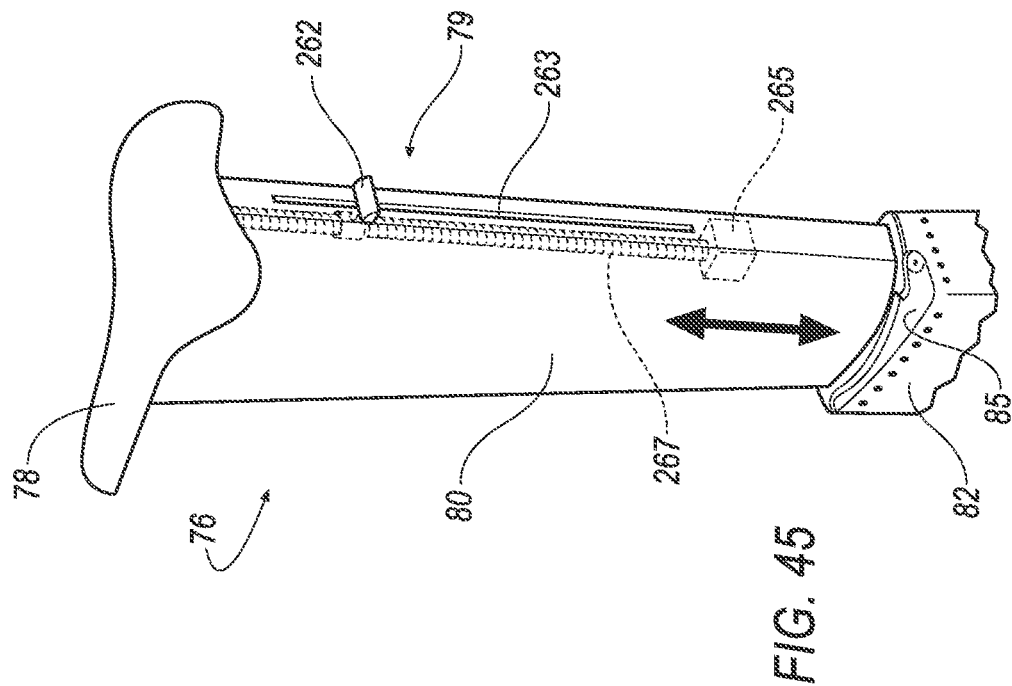
FIG. 45 is a perspective view of a first embodiment of a memory seat post.
Figure 48:
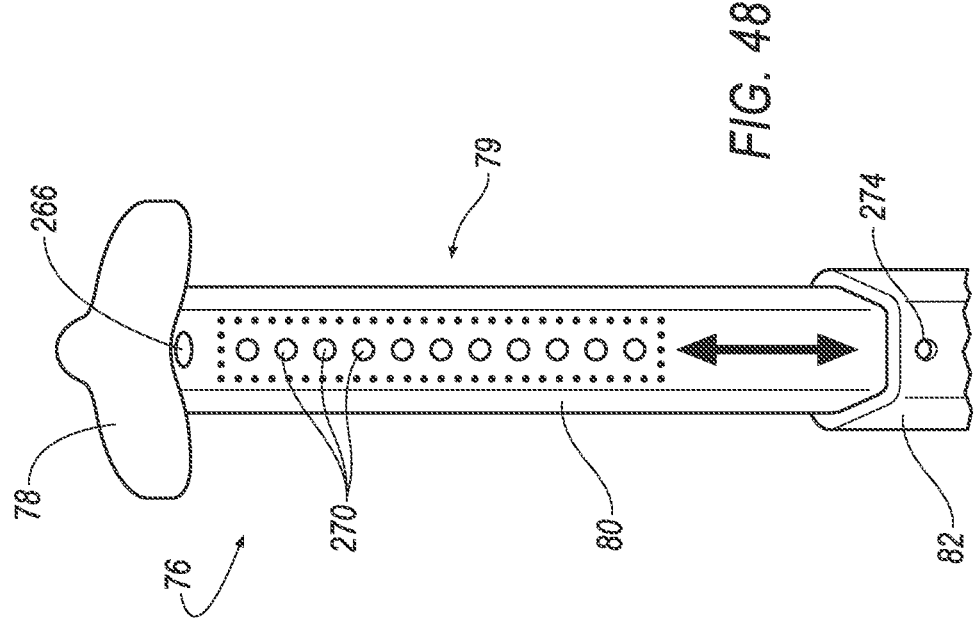
FIG. 48 is a perspective view of the third embodiment of the memory seat post.
Figure 47:
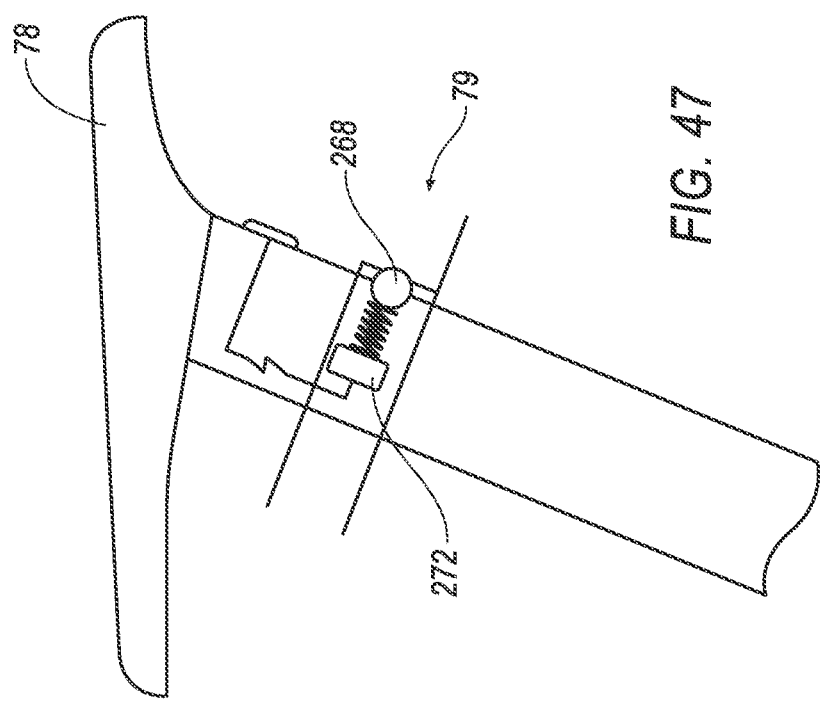
FIG. 47 is a schematic view of a third embodiment of the memory seat post.

With reference to FIGS. 44-48, the seat post 76 may be configured to remember a preferred height setting of the post 80 relative to the seat tube 82 for one or more drivers. A first embodiment of the memory seat post 76 is shown in FIG. 45, a second embodiment of the memory seat post 76 is shown in FIG. 46, and a third embodiment of the memory seat post 76 is shown in FIGS. 47-48.

With reference to FIGS. 44-48, the seat assembly 18 may include an indicating unit 79 configured to indicate a first position of the post 80 along the slot 84 (as shown in FIG. 1) for a first user and a second position of the post 80 along the slot 84 for a second user. An identification unit 81 is configured to identify the first user and the second user. The memory 29 of the computing device 28 may store instruction such that the processor 31 of the computing device 28 is programmed to instruct the indicating unit 79 to indicate the first position when the identification unit 81 identifies the first user and to instruct the indicating unit 79 to indicate the second position when the identification unit 81 identifies the second user. Although a first driver and a second driver are referenced herein, it should be appreciated that the memory 29 may store instruction such that the processor 31 of the computing device 28 is programmed to instruct the indicating unit 79 to indicate any suitable number of positions for any suitable number of users. For example, the bicycle 10 could be a rental and may save a position for each renter such that the position of the seat assembly 18 is automatically adjusted for repeat renters.

The identification unit 81 may be configured to sense a plurality of identifiers 83. Each identifier 83 may be unique to a different driver and may identify the driver to the identification unit 81. As shown in FIG. 44, the identification unit 81 may be configured to sense any suitable number of identifiers 83. The identification unit 81 may be supported in the seat assembly 18 or may be supported at any other suitable location of the bicycle 10. The identity of the users may be stored in the identifiers 83 and/or in the identification unit 81.

The identification unit 81 may be a proximity sensor configured to sense the identifier 83 within a predetermined range. The identifier 83 may be, for example, a mobile device 48 such as a cell phone, an electromagnetic identifier, e.g., an RFID chip, etc. In the configuration where the identifier 83 is a mobile device 48, the mobile device 48 may communicate with the identification unit 81 in any suitable manner, such a wireless protocol, e.g., near field communication, Bluetooth low energy, etc. Alternatively, the identification unit 81 may include may include an input interface, e.g., a touch screen, physical or virtual keypad, etc.

With reference to FIG. 44, a seat adjusting system 269 includes the computing device 28 in communication with the indicating unit 79 and the identification unit 81. The memory 29 of the computing device 28 may store instructions executable by the processor 31. The instructions may include programming to receive a signal from one of the identifiers 83 and to instruct the indicating unit 79 to indicate the position of the post 80 along the slot 84 for the driver identified by the identifier 83. For example, the instructions may include programming to instruct the indicating unit 79 to indicate the first position with the identification unit 81 identifies the first user and to instruct the indicating unit 79 to indicate the second position when the identification unit 81 identifies the second user.

With reference to FIG. 45, the indication unit 79 of the first embodiment of the memory seat post 76 may be a mechanical lock engaging the post 80 to the seat tube 82. Specifically, the first embodiment includes a step 262, e.g., a latch 262, adjustably connected to the post 80 and configured to position the post 80 relative to the seat tube 82. The step 262 may be fixed to the post 80 and may be shaped to catch the seat tube 82 to stop movement of the post 80 into the seat tube 82. The step 262 may be fixed to the post 80 in any suitable fashion. For example, the step 262 may be mechanically fixed to the post 80, magnetically fixed to the post 80, etc.

The indication unit 79 of the first embodiment may include a track 263 defined in one of the post 80 and the seat tube 82. The step 262 be slideably engaged with the track 263. The indication unit 81 may include a motor 265 engaged with the step 262 and configured to move the step 262 along the track 263. The motor 265 may be engaged with the step 262 in any suitable fashion, e.g., a threaded rod 267, a worm drive, rack and pinion, etc. The post 80 and/or the motor 265 is configured to track the position of the step 262 along the track 263, e.g. with Hall-effect sensors, encoders, etc., so that the motor 265 may move the step 262 to the appropriate position along the track 263 when instructed by the computing device 28.

The programming in the memory 29 may include programming to provide instruction to actuate the mechanical lock at the first position for the first driver when the identification unit 81 identifies the first driver and to actuate the mechanical lock at the second position when the identification unit 81 identifies the second driver. For example, the memory 29 may include programming to provide instruction to actuate the motor 265 to move the step 262 to the appropriate position along the track 263 when instructed by the computing device 28.

As shown in FIG. 45, a second mechanical lock 85 may engage the post 80 and seat tube 82. The second mechanical lock 85 may include a lever, as shown in FIG. 46, that is rotatable by the driver between an unlocked position, allowing the post 80 to move to any position allowed by the step 262, and a locked position, locking the post 80 relative to the seat tube 82. In other words, the step 262 may position the post 80 relative to the seat tube 82 and, when the driver sits on the saddle 78, the weight of the driver forces the step 262 against the seat tube 82. The second mechanical lock 85 locks the post and seat tube 82 in this relative position. The second mechanical lock 85 may be, for example, a compression lock supported by the post 80 and that compresses the seat tube 82 to lock the post 80 to the seat tube 82.

In the second embodiment of the memory seat post 76, as shown in FIG. 46, the indicating unit 79 includes an illuminated strip 264, i.e., a strip of light sources. The illuminated strip 264 may, for example, include at least one LED strip including a plurality of LED bulbs. The computing device 28 may provide instructions to illuminate at least a portion of the illuminated strip 264, e.g., a section of adjacent light sources. The appropriate illumination for each driver may be stored in the memory 29 of the computing device 28. Alternatively, the post 80 may include memory for recording a preferred height of the post 80 and identifying the preferred height on the illuminated strip 264.

The driver may align the illuminated portion of the illuminated strip 264 with an edge of the seat tube 82 to appropriately locate the post 80 and the seat tube 82. At least one of the post 80 and the seat tube 82 may include a mechanical lock 85 to lock the post 80 relative to the seat tube 82 when the post 80 is in the identified location along the slot 84. The mechanical lock 85 may include a lever, as shown in FIG. 46, that is rotatable by the driver between an unlocked position, allowing the post 80 to move relative to the seat tube 82, and a locked position, locking the post 80 relative to the seat tube 82. The mechanical lock 85 may be, for example, a compression lock supported by the post 80 and that compresses the seat tube 82 to lock the post 80 to the seat tube 82.

The programming in the memory 29 may include programming to provide instructions to illuminate at least one of the light sources to indicate the appropriate position of the post 80 relative to the slot 84 for a driver. For example, the memory 29 may include programming to illuminate at least one of the light sources to indicate the first position when the identification unit 81 identifies the first user and to illuminate at least one of the light sources to indicate the second position when the identification unit 81 identifies the second user.

A button 266 may be in communication with the computing device 28 when the post 80 is engaged with the seat tube 82, e.g., through wired or wireless connection. The computing device 28 may be programmed to store the preferred height in the memory 29 when the button 266 is depressed. For example, the computing device 28 may receive a signal from the button 266 when the button 266 is depressed and, in response, the memory 29 may store the height position of the post 80 relative to the seat tube 82. The computing device 28 may also correspond the height position relative to an identifier 83 detected by the identification unit 81. The height position of the post 80 relative to the seat tube 82 may be measured by any suitable device, e.g., a Hall-effect sensor, mechanical measurement device, etc., connected to the computing device 28. The computing device 28 may correspond the height position to the illumination of the illuminated strip 264 so that the illuminated strip 264 may identify the saved height position.

The illuminated strip 264 may be red and may act as a rearward facing brake light or tail light when the post 80 is engaged with the seat tube 82. In such a configuration, the computing device 28 may illuminate the illuminated strip 264 in the same way as set forth above with respect to the brake light 143. In such a configuration, the illuminated strip 264 may be operated simultaneously with the brake light 143.

With reference to FIGS. 47 and 48, in the third embodiment of the memory seat post 76 the indicating unit 79 may include a mechanical lock engaging the post 80 to the seat tube 82. Specifically, one of the post 80 and the seat tube 82 defines openings 270, e.g., recesses 270, and the other of the post 80 and the seat tube 82 supports a stopper 268, e.g., a ball bearing, configured to engage the openings 270. Specifically, as shown in FIG. 47, the post 80 may include the stopper 268 seated in one of the openings 270, respectively.

The indicating unit 79 of FIGS. 47 and 48 includes an actuator 272 disposed adjacent the stoppers 268 for extending/retracting the stopper 268 relative to the openings 270. The actuator 272 may be, for example, an electro-magnet and, in such a configuration, the stopper 268 may be biased toward an extended position by a spring 276. The electromagnet may work against the bias of the spring 276 to retract the stopper 268. The seat tube 282 defines a hole 274 for receiving one of the stopper 268 for locking the post 80 relative to the seat tube 282. Specifically, when a stopper 268 corresponding to a desired height is aligned with the hole 274, that stopper 268 may be engaged with hole 274. The actuator 272 may be in communication with the computing device 28 and the computing device 28 may provide instruction to the actuator 272 to extend/retract the stopper 268. With continued reference to FIGS. 47 and 48, the programming in the memory 29 may include programming to provide instruction to actuate the mechanical lock, e.g., the actuator 272, at the first position for the first driver when the identification unit 81 identifies the first driver and to actuate the mechanical lock, e.g., the actuator 272, at the second position when the identification unit 81 identifies the second driver. For example, the memory 29 may include programming to provide instruction to instruct the actuator 272 to engage the stopper 268 with the proper opening 270. The height position of the post 80 relative to the seat tube 82 may be measured by any suitable device, e.g., a Hall-effect sensor, mechanical measurement device, etc., connected to the computing device 28. The computing device 28 may correspond the height position to the actuation of the actuator 272 so that the actuator 272 may identify the saved height position.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

The invention claimed is:

1. A bicycle comprising:
a frame including first and second segments pivotable relative to each other between a folded position and an unfolded position, the first segment having a first face and the second segment having a second face facing the first face in the unfolded position;
a hinge between the first and second faces; and
a locking device extending through at least one of the first and second faces;
wherein the locking device is a U-shaped locking member; and
wherein the U-shaped locking member is disposed between the first and second faces when the first and second segments are in the unfolded position.

2. The bicycle as set forth in claim 1 wherein the first and second segments define a cavity between the faces and wherein the U-shaped locking member is disposed in the cavity.

3. The bicycle as set forth in claim 1 wherein the first face defines two sockets configured to receive the U-shaped locking member when the first and second segments are in the unfolded position.

4. The bicycle as set forth in claim 3 wherein the second face defines a socket and wherein one of the sockets of the first face and the socket of the second face are configured to receive the U-shaped locking member when the first and second segments are in the folded position.

5. The bicycle as set forth in claim 4 wherein at least one of the first and second segments includes a lock that releasably locks the U-shaped locking member in the sockets.

6. The bicycle as set forth in claim 1 wherein the locking device is a flexible cable extendable from and retractable into one of the first and second faces.

7. The bicycle as set forth in claim 1 further comprising a proximity sensor configured to sense an identifier and to lock the locking system when the identifier is moved beyond a predetermined distance and to unlock the locking system when the identifier is moved within the predetermined distance.

8. The bicycle as set forth in claim 1 further comprising a shell enclosing at least a portion of the first segment and at least a portion of the second segment when the first and second segments are in the folded position.

9. The bicycle as set forth in claim 8 wherein the shell is removable from the frame.

10. An electric bicycle comprising:
a frame including first and second segments pivotable relative to each other between a folded position and an unfolded position, the first segment having a first face and the second segment having a second face facing the first face in the unfolded position;
a hinge between the first and second faces;
a charging unit supported by at least one of the first and second faces; and
a battery in communication with the charging unit.

11. The electric bicycle as set forth in claim 10 wherein the charging unit is a power socket.

12. The electric bicycle as set forth in claim 11 wherein the at least one of the first and second faces defines locking sockets disposed on opposite sides of the power socket.

13. The electric bicycle as set forth in claim 12 further comprising at least one of a U-shaped locking member and a flexible cable engageable with the locking sockets.

14. The electric bicycle as set forth in claim 13 wherein the locking member is configured to engage a charging plug.

15. The electric bicycle as set forth in claim 13 wherein the locking member is configured to engage the locking sockets when the first and second segments are in the unfolded position.

16. The electric bicycle as set forth in claim 13 wherein the first and second segments define a cavity between the faces when the first and second segments are in the folded position and wherein the locking member is disposed in the cavity.

17. The electric bicycle as set forth in claim 13 wherein at least one of the first and second segments includes a lock that releasably locks the locking member in the locking sockets.

18. The electric bicycle as set forth in claim 10 further comprising a locking member configured to engage a charging plug and releasably lock the charging plug to the charging unit.

19. A bicycle comprising:
a frame including first and second segments pivotable relative to each other between a folded position and an unfolded position, the first segment having a first face and the second segment having a second face facing the first face in the unfolded position;
a hinge between the first and second faces; and
a locking device extending through at least one of the first and second faces;
wherein the locking device is a U-shaped locking member;
wherein the first face defines two sockets configured to receive the U-shaped locking member when the first and second segments are in the unfolded position.

20. A bicycle comprising:
a frame including first and second segments pivotable relative to each other between a folded position and an unfolded position, the first segment having a first face and the second segment having a second face facing the first face in the unfolded position;
a hinge between the first and second faces; and
a locking device extending through at least one of the first and second faces;
wherein the locking device is a flexible cable extendable from and retractable into one of the first and second faces.

* * * * *